US010886516B2

(12) United States Patent
Sundaresan et al.

(10) Patent No.: US 10,886,516 B2
(45) Date of Patent: Jan. 5, 2021

(54) ACTIVE MEMBRANE WITH CONTROLLED ION-TRANSPORT

(71) Applicant: Ohio State Innovation Foundation, Columbus, OH (US)

(72) Inventors: Vishnu Baba Sundaresan, Columbus, OH (US); Vinithra Venugopal, Columbus, OH (US); Robert Northcutt, Columbus, OH (US); Travis Hery, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 15/760,095

(22) PCT Filed: Sep. 14, 2016

(86) PCT No.: PCT/US2016/051787
§ 371 (c)(1),
(2) Date: Mar. 14, 2018

(87) PCT Pub. No.: WO2017/048879
PCT Pub. Date: Mar. 23, 2017

(65) Prior Publication Data
US 2018/0254463 A1 Sep. 6, 2018

Related U.S. Application Data

(60) Provisional application No. 62/219,062, filed on Sep. 15, 2015.

(51) Int. Cl.
*H01M 2/16* (2006.01)
*H01M 8/1053* (2016.01)
(Continued)

(52) U.S. Cl.
CPC .......... *H01M 2/1686* (2013.01); *H01G 11/18* (2013.01); *H01G 11/52* (2013.01);
(Continued)

(58) Field of Classification Search
CPC ............. H01M 2/1686; H01M 10/425; H01M 2/1653; H01M 10/486; H01M 10/0565;
(Continued)

(56) References Cited

U.S. PATENT DOCUMENTS 3,116,170 A  12/1963 Williams et al.
4,859,305 A  8/1989 Schneider et al.
(Continued)

OTHER PUBLICATIONS

International Search Report and Written Opinion regarding Application No. PCT/US16/51787 (11 pages).
(Continued)

*Primary Examiner* — Wojciech Haske
(74) *Attorney, Agent, or Firm* — Meunier Carlin & Curfman LLC

(57) ABSTRACT

A membrane is provided that includes a membrane substrate defining a plurality of pores to allow ion transport therethrough; an ion-doped conductive polymer disposed on a surface of the membrane substrate; and a conductive material disposed between the membrane substrate and the ion-doped conductive polymer. The membrane may have an areal density from about 0.01 Coulombs per $cm^2$ ($C/cm^2$) to about 100 $C/cm^2$. Such membranes provide for controlled bidirectional ion transport therethrough and may be used in electrochemical cells that includes such membranes as part of (or the entirety of) the separator. Such separators may be used to control charge transfer through the electrochemical cell and/or reversibly stop charge transfer therethrough to prevent thermal runaway.

17 Claims, 53 Drawing Sheets

(51) Int. Cl.
*H01G 11/18* (2013.01)
*H01G 11/52* (2013.01)
*H01M 10/0565* (2010.01)
*H01M 10/42* (2006.01)
*H01M 10/48* (2006.01)
*H01M 8/18* (2006.01)
*H01G 11/74* (2013.01)

(52) U.S. Cl.
CPC ....... *H01M 2/1653* (2013.01); *H01M 8/1053* (2013.01); *H01M 10/0565* (2013.01); *H01M 10/425* (2013.01); *H01M 10/4235* (2013.01); *H01M 10/486* (2013.01); *H01G 11/74* (2013.01); *H01M 8/188* (2013.01); *H01M 2010/4271* (2013.01); *H01M 2300/0082* (2013.01); *H01M 2300/0091* (2013.01); *H01M 2300/0094* (2013.01); *Y02E 60/50* (2013.01)

(58) Field of Classification Search
CPC ........... H01M 10/4235; H01M 8/1053; H01M 2010/4271; H01M 2300/0091; H01M 2300/0082; H01M 8/188; H01M 2300/0094; H01G 11/18; H01G 11/52; H01G 11/74; Y02E 60/528
See application file for complete search history.

(56) References Cited

U.S. PATENT DOCUMENTS

| | | |
|---|---|---|
| 5,744,262 A | 4/1998 | Cheng et al. |
| 5,812,367 A | 9/1998 | Kudoh et al. |
| 8,119,273 B1 | 2/2012 | Gerald, II et al. |
| 8,465,632 B2 | 6/2013 | Shirvanian |
| 2002/0102465 A1 | 8/2002 | Chen et al. |
| 2011/0091789 A1 | 4/2011 | Mofakhami et al. |

OTHER PUBLICATIONS

Northcutt et al.; Phospholipid Vesicles as soft templates for electropolymerization of nanstructured polypyrrole membranes with long range order; Jun. 26, 2014; 13 pages.

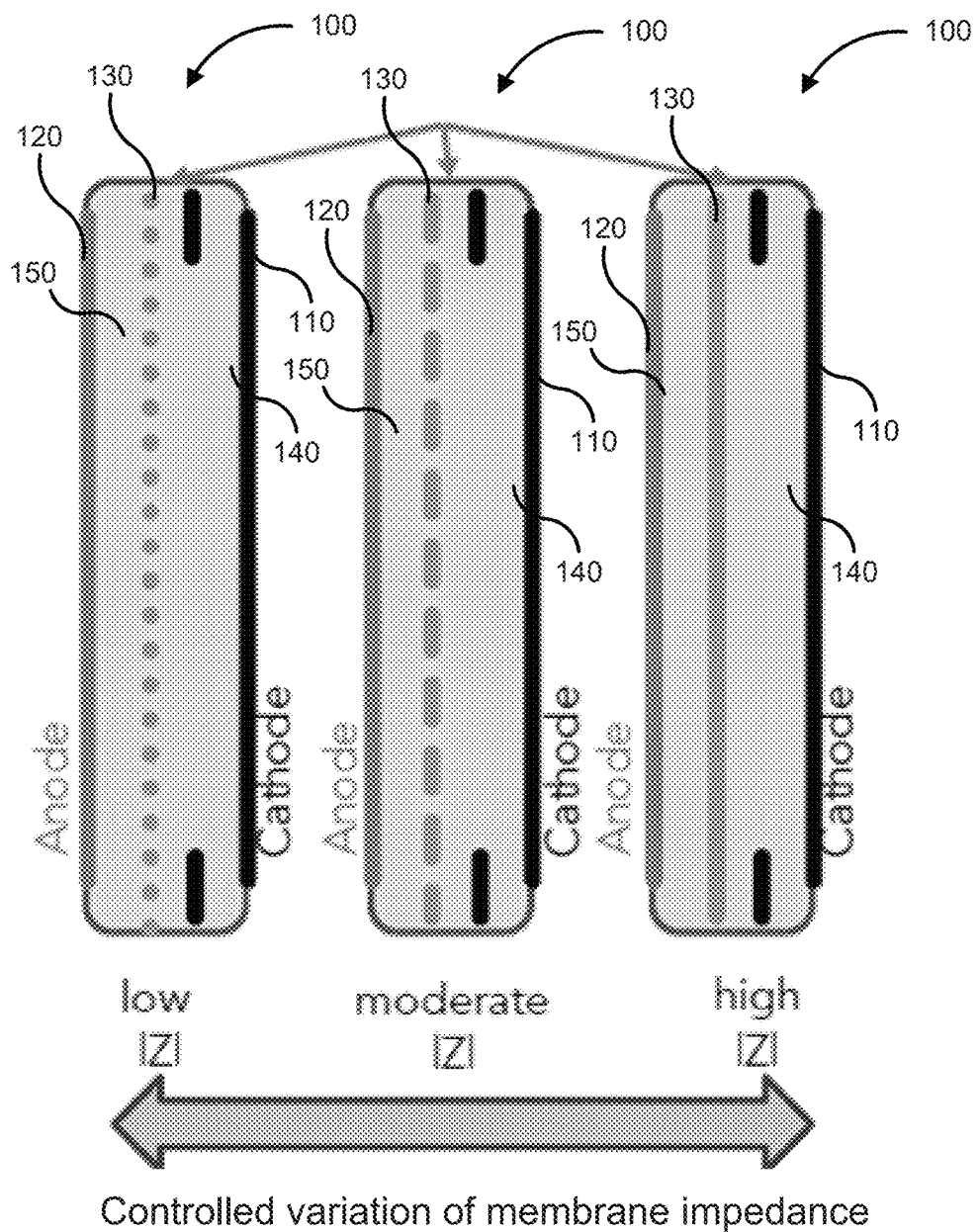

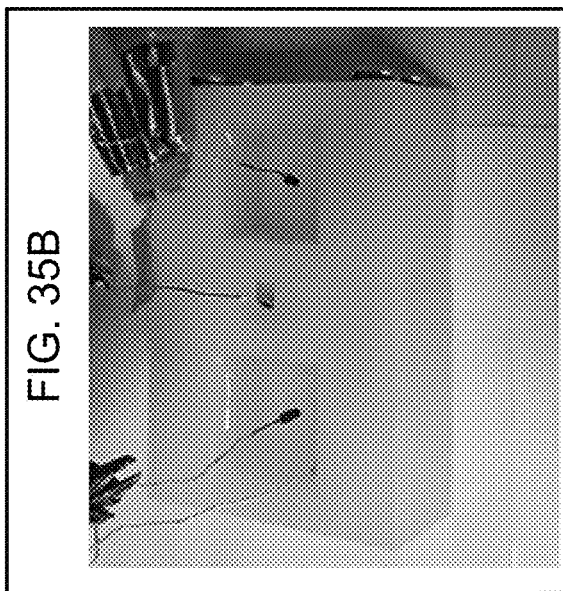
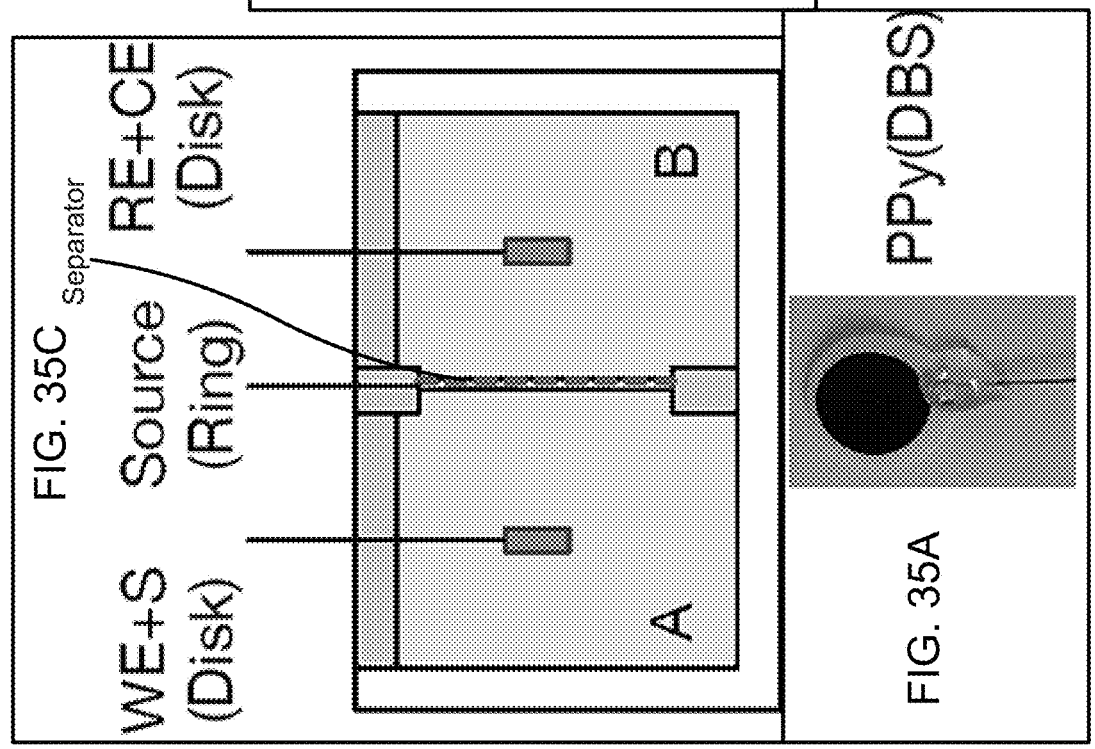

ACTIVE MEMBRANE WITH CONTROLLED ION-TRANSPORT

CROSS-REFERENCE TO RELATED APPLICATIONS

This application is a national phase application under 35 U.S.C. § 371 of International Application No. PCT/US2016/051787, filed Sep. 14, 2016, which in turn claims priority under 35 U.S.C. 119(e) to U.S. Provisional Patent Application No. 62/219,062, filed Sep. 15, 2015, the entire disclosures of each of which are hereby incorporated by reference for any and all purposes.

STATEMENT REGARDING GOVERNMENT SUPPORT

This invention was made with government support under grant numbers CMMI1322134 and CMMI1325114 awarded by the National Science Foundation. The government has certain rights in the invention.

FIELD

The present disclosure relates to systems and methods of preparing porous membranes with controllable impedance for controlling ion transport therethrough.

BACKGROUND

Membranes are used in a wide variety of applications to provide selective transfer of ions or molecules therethrough. Such applications include, for example, osmosis, filtration (e.g., liquid or gas filtration), gas separation, sensors (e.g., Nernstian membranes used in potentiometric sensors, selective ion, chemical or biomolecule transport membranes, biofouling protection membranes), drug delivery (e.g., selectively expandable membrane assemblies for other therapeutic applications) and energy storage devices (e.g., as separators in electrochemical cells such as those used in batteries and super-capacitors).

In electrochemical cells such as batteries or super-capacitors, the membrane or separator is positioned between an anode and a cathode of the electrochemical cell. The membrane or separator allows ion transport through the separator while keeping the anode and the cathode electrically separated from each other to prevent short circuits. Thermal runaway is the most undesirable failure mode of electrochemical cells, particularly for Li-ion batteries. Thermal runaway includes uncontrollable ion transport through the membrane and extreme rise in temperature, potentially leading to fires or the explosion of the electrochemical cell.

Application of Li-ion batteries in automotive drivetrains and auxiliary power units in aerospace applications requires failsafe mechanisms that ensure safe and reliable operation, and specifically prevention of thermal runaway. The most critical component of a battery that ensures safety is the membrane or separator. Generally, separators used in batteries include multilayer separators. During increased temperature events such as thermal runaway, the component layer of the separator with the lowest melting point loses its integrity first and melts, filling the pores of the separator, and shuts down ion transport and subsequently electron flow between the electrodes. This shutdown, while preventing thermal runaway, irreversibly damages and blocks the membrane separator, rendering the battery unusable.

SUMMARY

Electric vehicles, powered by Li-ion batteries, are limited by a short driving range, long recharge time, and capacity fade that is not present in fossil fuel-powered alternatives. Alternatives to Li-ion batteries, such as supercapacitors and redox flow batteries (each with comparably high specific power and rapid recharge/refill) have poor energy density due to self-discharge. The present technology provides, among other things, membranes that regulate bidirectional ion transport across the membrane as a function of the membrane redox state and may be applicable as a separator in supercapacitors and redox flow batteries. Such membranes/separators of the present technology allow for the design of a new category of rechargeable/refillable energy storage devices that have high energy density and specific power while overcoming common limitations of electric vehicles.

Thus, in an aspect, a membrane is provided that includes a membrane substrate defining a plurality of pores to allow ion transport therethrough; an ion-doped conductive polymer disposed on a surface of the membrane substrate; and a conductive material disposed between the membrane substrate and the ion-doped conductive polymer. The membrane of any embodiment herein may have an areal density from about 0.01 Coulombs per $cm^2$ ($C/cm^2$) to about 100 $C/cm^2$.

Other aspects and embodiments described herein relate generally to systems and methods of forming and using the membrane, e.g., for providing controlled ion transport therethrough. In particular embodiments, various systems and methods described herein include a separator for use in electrochemical cells that includes an ion-doped conductive polymer disposed on a porous membrane substrate, and has a tunable or controllable impedance to control a quantity of ions that can flow therethrough. The separator can be used to control charge transfer through the electrochemical cell, reversibly stop charge transfer therethrough to prevent thermal runaway and/or predict concentration of an electrolyte included in the electrochemical cell as a health parameter of the electrochemical cell or battery.

In some embodiments, an energy storage device comprises a positive current collector. A cathode is positioned on the positive current collector. The energy storage device also includes a negative current collector and an anode positioned on the negative current collector. A separator is positioned between the anode and cathode. The separator comprises a membrane substrate defining a plurality of pores to allow ion transport therethrough. An ion-doped conductive polymer is disposed on the surface of the membrane substrate. A controller is communicatively coupled to the separator. The controller is configured to apply at least one of an oxidizing or reducing voltage across the separator to cause a change in an impedance of the ion-doped conductive polymer. The change in impedance is configured to control a quantity of ions transferable through the separator.

In some embodiments, a method of forming a membrane comprises providing a membrane substrate. A conductive material is deposited on the membrane separator. An ion-doped conductive polymer is disposed on the surface of the conductive material. The ion-doped conductive polymer is formulated to have a change in at least one of a porosity and impedance of the ion-doped conductive polymer in response to at least one of a reducing or an oxidizing voltage applied across the membrane. The at least one of a change in porosity and impedance is configured to control a quantity of ions transferable through the membrane.

In some embodiments, a method of preventing thermal runaway in an electrochemical cell which includes at least an anode, a cathode and a separator which includes a membrane substrate coated with an anion-doped conductive polymer positioned therebetween comprises detecting at least one of a temperature of the electrochemical cell or a current across the separator. The separator has an initial impedance to allow an initial quantity of cations to pass therethrough. If at least one of the temperature exceeds a predetermined temperature threshold and the current increases a predetermined current threshold, a predetermined reducing or oxidizing voltage is applied across the cation-doped conductive polymer. The predetermined reducing or oxidizing voltage causes the initial impedance to increase to a first impedance. The first impedance allows a first quantity of cations or anions to pass through the separator. The first quantity of cations is less than the initial quantity of cations or anions. The predetermined reducing or oxidizing voltage is maintained until the at least one of the temperature drops below the predetermined temperature threshold and the current drops below the predetermined current threshold.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 2 is an illustration of the electrochemical cell of FIG. 1A which includes a separator having an ion-doped conductive polymer (CP) thereon, the porosity and impedance of the ion-doped CP is controllable by applying a reducing or oxidizing voltage across the separator.

FIG. 35A is an optical image of a separator that can be used for controlling ion transport therethrough and includes a membrane substrate coated with a gold and a PPy(DBS) CP to form a PPy(DBS) separator; FIG. 35B is an optical image of an experimental setup that includes a source, a drain and the PPy(DBS) separator positioned therebetween for demonstrating control of ion transport through the PPy (DBS) separator and FIG. 35C is a schematic illustration thereof.

FIG. 39 (bottom left) is a plot of corresponding initial peak-to-peak (PTP) current and FIG. 39 (bottom right) is a plot of final PTP current representing a transmembrane current through the PPy(DBS) separator during an initial stabilization phase and ion-transport controlling phase, respectively of the various PPy(DBS) separators.

FIG. 40 (bottom left) is a plot of corresponding initial peak-to-peak (PTP) current and FIG. 40 (bottom right) is a plot of final PTP current representing a transmembrane current through the PPy(DBS) separator during an initial stabilization phase and ion-transport controlling phase, respectively of the various PPy(DBS) separators.

FIG. 48A illustrates the implementation in an energy storage device using double layer electrodes (similar to supercapacitor) or liquid electrodes (similar to RFB) kept separated by the membrane. A control circuitry is connected to the membrane to regulate the ionic impedance and ion transport between the electrodes. FIG. 48B illustrates the membrane in FIG. 48A, where PPy(DBS) is formed over a porous substrate and spans the pores. Electrical potential applied across the thickness of the PPy(DBS) using a counter electrode and the conductive layer between PPy(DBS) and porous substrate varies the redox state of PPy(DBS). FIG. 48C is an illustrative representation of the membrane in its oxidized, OFF, state and in its reduced, ON, state. In the oxidized state, transmembrane impedance is high and there is minimal current across PPy(DBS). In the reduced state, cation ingress into PPy(DBS) enables ion transport across the membrane via hopping through dopant sites in PPy(DBS).

FIGS. 49A-B illustrate that a membrane of the present technology (PPY(DBS) on PCTE) is attached as the disk working electrode where Ag/AgCl pelles are attached to a bioptentiostat as the ring working and counter/reference electrodes, according to the working examples.

FIG. 50A provides a CV plot of the PPy(DBS) polymer in various concentrations of Li$^+$ at 50 mV/s. FIG. 50B provides the typical transmembrane current (IAC) in aqueous 500 mM Li$^+$ for membrane potential ($V_m$) in 100 mV steps and ±100 mV transmembrane potential (VAC). For oxidizing $V_m$, IAC≈0, and reducing $V_m$, IAC is dependent on ionic concentration and VAC. FIG. 50C provides the ionic redox transistor characteristics for various concentrations of Li$^+$ compared to reduced and oxidized regions of the CV plots (FIGS. 50A and 50B). The membrane is ON when reduced, OFF when oxidized, and partially ON in between. FIG. 50D provides the ionic redox transistor characteristics for various polymer thickness (indicated by areal densities) in aqueous 100 mM Na$^+$. Transmembrane current in OFF state decreases with increasing areal density, and current in ON state is asymptotic to unimpeded pore. FIG. 50E provides the ionic redox transistor characteristics for various areal densities and transmembrane potentials in aqueous 100 mM Na$^+$, where it is observed transmembrane current increases linearly with transmembrane potential and decreases with increasing areal density.

FIG. 51A provides the amplification factor (β) as a function of Li+ concentration. The amplification factor is small below 200 mM and increases linearly between 200 mM and 1000 mM. FIG. 51B provides the amplification factor as a function of areal density in aqueous 100 mM Na$^+$. For increasing areal density, the amplification factor increases below and decreases above 0.4 C cm$^{-2}$. FIG. 51C provides the ionic conductivity of PPy(DBS) in the fully oxidized and reduced states as a function of Li$^+$ concentration. FIG. 51D provides the Li$^+$ ion turnover across the polymer per DBS filament as a function of Li$^+$ concentration. The ion transport concentration dependence follows Michaelis-Menten kinetics and asymptotically approaches a Li$^+$ turnover of 738 per second. Legend denoting "Reduced" and "Oxidized" provided in FIG. 51C is the same as for FIG. 51D.

FIG. 52A provides a CV plot of PPy(DBS) membrane in aqueous 500 mM Li$^+$ at 50 mV s$^{-1}$. FIG. 52B provides the ionic redox transistor characteristics in the reducing and oxidizing direction with the corresponding points delineated in FIG. 52A. FIG. 52C provides an electrical circuit schematic of a membrane of the present technology in a bicameral device to regulate current to an LED, according to the experiment. FIG. 52D provides a demonstration of the membrane potential (Vm) as a switch in the circuit, where the photographs illustrate the LED is OFF for oxidizing potential and turns ON for reducing potential.

Figure 1A:
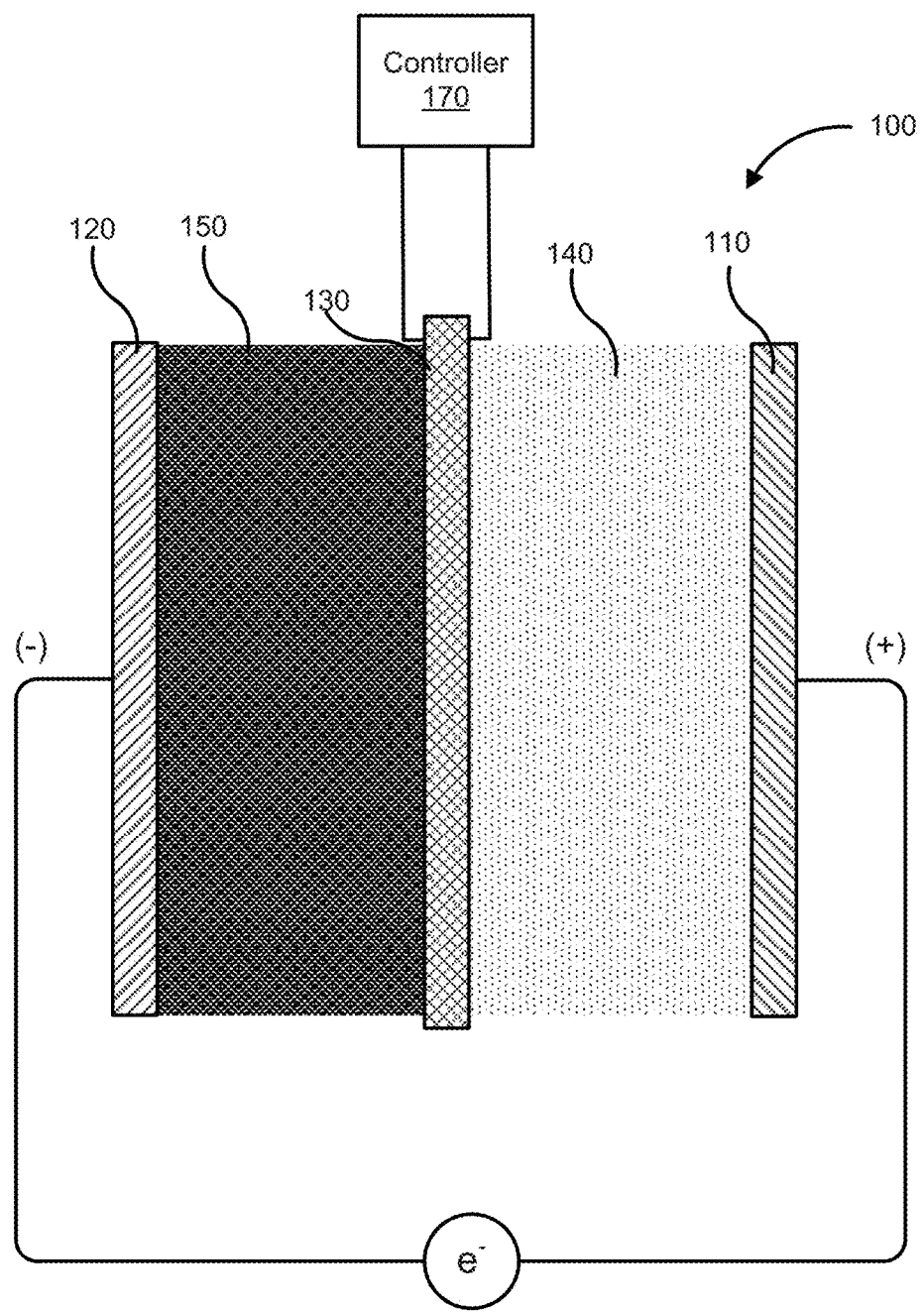
FIG. 1A is a schematic illustration of an energy storage device, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" and "approximately" will be understood by persons of ordinary skill in the art and will vary to some extent depending upon the context in which it is used. If there are uses of the term which are not clear to persons of ordinary skill in the art, given the context in which it is used, the term "about" and "approximately" will mean plus or minus 10% of the particular term, e.g., about 250 μm would include 225 μm to 275 μm, about 1,000 μm would include 900 μm to 1,100 μm.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Generally, reference to a certain element such as hydrogen or H is meant to include all isotopes of that element. For example, if an R group is defined to include hydrogen or H, it also includes deuterium and tritium. Compounds comprising radioisotopes such as tritium, $^{14}$C, $^{32}$P, and $^{35}$S are thus within the scope of the present technology. Procedures for inserting such labels into the compounds of the present technology will be readily apparent to those skilled in the art based on the disclosure herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Embodiments described herein relate generally to systems and methods of forming and using a membrane for providing controlled ion transport therethrough. In particular embodiments, systems and methods described herein include a separator for use in electrochemical cells that includes an ion-doped conductive polymer disposed on a membrane substrate, and has a tunable or controllable impedance to control a quantity of ions that can flow therethrough. The separator can be used to control charge transfer through the electrochemical cell, reversibly stop charge transfer therethrough to prevent thermal runaway and/or predict concentration of an electrolyte included in the electrochemical cell as a health parameter of the electrochemical cell or battery.

Various embodiments of the systems and methods described herein for actively tuning a pore size of an ion-transport membrane may provide benefits including, for example: (1) using the ion-transport membrane as a separator in one or more electrochemical cells included in an energy storage device to control an ion-transport between the anode and cathode of the electrochemical cell; (2) preventing thermal runaway by selectively preventing ion-transport through the ion-transport membrane which is completely reversible once the thermal runaway conditions have subsided or dissipated; (3) preventing permanent damage to the electrochemical cell so that the electrochemical cell or otherwise a battery or super-capacitor formed therefrom is still usable after thermal runaway conditions are eliminated; (4) allowing health monitoring of the electrochemical cell, for example of health an electrolyte included therein by monitoring ion-transport through the ion-transport membrane; (5) allowing manufacturing using cheap roll-to-roll manufacturing processes which is compatible with conventional membrane manufacturing systems and methods, thereby having no significant impact on the manufacturing cost of electrochemical cells or energy storage devices therefrom; and (6) providing applications in a variety of different fields including sensing (including bio-sensing), osmosis, filtration, gas separation and targeted drug delivery, to name a few.

Notably, bidirectional ion transport is an essential function of biological ion channels in cell membranes. While other synthetic analogues of biological ion transporters use nanoscale electrostatic interactions to demonstrate ionic rectification and transistor like function, ion transport in these synthetic analogues is unidirectional, and its physics of operation does not allow controlled bidirectional transport using a control signal. Further, these nanofluidic ionic devices are not suitable for implementation in, e.g., an energy storage device. In contrast, the present technology provides membranes with programmable bidirectional ion transport.

Thus, in an aspect, a membrane is provided that includes a membrane substrate defining a plurality of pores to allow ion transport therethrough; an ion-doped conductive polymer disposed on a surface of the membrane substrate; and a conductive material disposed between the membrane substrate and the ion-doped conductive polymer. The membrane substrate may be flat and/or disc-like with a front surface, a back surface, and a periphery. The conductive material is then disposed on the front surface, and the ion-doped conductive polymer disposed over the conductive material. Thus, the membrane may have a membrane material layer, a conductive material layer, and an ion-doped conductive polymer layer in this listed arrangement. The membrane of any embodiment herein may have an areal density from about 0.01 Coulombs per cm$^2$ (C/cm$^2$) to about 100 C/cm$^2$. The membrane may therefore have an areal density of about 0.01 C/cm$^2$, about 0.02 C/cm$^2$, about 0.03 C/cm$^2$, about 0.04 C/cm$^2$, about 0.05 C/cm$^2$, about 0.06 C/cm$^2$, about 0.07 C/cm$^2$, about 0.08 C/cm$^2$, about 0.09 C/cm$^2$, about 0.1 C/cm$^2$, about 0.15 C/cm$^2$, about 0.2 C/cm$^2$, about 0.25 C/cm$^2$, about 0.3 C/cm$^2$, about 0.35 C/cm$^2$, about 0.4 C/cm$^2$, about 0.45 C/cm$^2$, about 0.5 C/cm$^2$, about 0.6 C/cm$^2$, about 0.7 C/cm$^2$, about 0.8 C/cm$^2$, about 0.9 C/cm$^2$, about 1 C/cm$^2$, about 5 C/cm$^2$, about 10 C/cm$^2$, about 15 C/cm$^2$, about 20 C/cm$^2$, about 25 C/cm$^2$, about 30 C/cm$^2$, about 35 C/cm$^2$, about 40 C/cm$^2$, about 45 C/cm$^2$, about 50 C/cm$^2$, about 55 C/cm$^2$, about 60 C/cm$^2$, about 70 C/cm$^2$, about 80 C/cm$^2$, about 90 C/cm$^2$, about 100 C/cm$^2$, or any range including and/or between any two of these values. Such membranes of the present technology may be termed "separators" or "smart membrane separators" when included as part of (or the entirety of) a separator in an electrochemical cell or energy storage device, or also termed "ion-doped conductive polymer membrane" and "ion-doped conductive polymer separator" as descriptive terms to distinguish the present technology from conventional membranes and separators, however each of these terms is substitutable with the other in the present disclosure.

The ion-doped conductive polymer may include a plurality of ions and a conductive polymer. The mole ratio of the ions to monomeric units of the conductive polymer may be from about 1:100 (i.e., 1 mole of ions to 100 moles of monomer making up the conductive polymer) to about 5:1. Thus, the mole ratio may be about 1:100, about 1:75, about 1:50, about 1:25, about 1:10, about 1:9, about 1:8, about 1:7, about 1:6, about 1:5, about 1:4, about 1:3, about 1:2, about 1:1, about 2:1, about 3:1, about 4:1, about 5:1, or any range including and/or between any two of these values. The conductive polymer may include any one or more types of conductive polymers discussed herein, including but not limited to polypyrole, poly(3,4-ethylenedioxythiophene), polyacteylene, polyaniline, poly(p-phenylene vinylene), poly(fluorenes), polyphenylenes, polypyrenes, polyazulenes, polynaphthalenes, polycarbazoles, polyindoles, polyazepines, poly(thiophenes) poly(p-phenylene sulfide), polyfuran, or a combination of any two or more thereof. A monomeric unit of, for example, polypyrole is pyrole; a monomeric unit of polyacetylene is acetylene. The plurality of ions may include anions or cations as described herein. For example, the plurality of ions may include dodecylbenzenesuflonate, polystyrene sulfonate, p-toluene sulfonate, Cl—, F—, I—, SO42-, or a mixture of any two or more thereof; the plurality of ions may include Na$^+$, K$^+$, Ca$^{2+}$, Mg$^{2+}$, Li$^+$, or a mixture of any two or more thereof. As an example, the ion-doped conductive polymer may include dodecylbenzenesuflonate doped polypyrole.

The conductive material of any embodiment herein may include a Group IIIA metal, Group IB metal, Group IIB metal, Group IIIB metal, Group IVB metal, Group VB metal, Group VIB metal, Group VIIB metal, Group VIIIB metal, graphite, carbon powder, pyrolytic carbon, carbon black, carbon fibers, carbon microfibers, carbon nanotubes, single walled carbon nanotubes, multi walled carbon nanotubes, fullerene carbons, graphene, or a combination of any two or more thereof. For example, the conductive material may include copper, silver, gold, copper, nickel, palladium, platinum, manganese, molybdenum, tungsten, iron, cobalt, rhodium, zinc, aluminum, or a combination of any two or more thereof. A layer of conductive material may have a thickness from about 0.1 nanometers (nm) to about 100 nm; the conductive material in the membrane may have a thickness of about 0.1 nm, about 0.2 nm, about 0.3 nm, about 0.4 nm, about 0.5 nm, about 0.6 nm, about 0.7 nm, about 0.8 nm, about 0.9 nm, about 1 nm, about 2 nm, about 3 nm, about 4 nm, about 5 nm, about 6 nm, about 7 nm, about 8 nm, about 9 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, or any range including and/or between any two of these values.

The membrane substrate of any embodiment herein may define a plurality of pores with a number average diameter from 10 nm to 10 microns (μm). Thus, the number average diameter of the plurality of pores in the membrane substrate may be about 10 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 μm, about 2 μm, about 3 μm, about 4 μm, about 5 μm, about 6 μm, about 7 μm, about 8 μm, about 9 μm, about 10 μm, or any range including and/or between any two of these values. The membrane substrate may further have a thickness (e.g., between the front and back surface of the membrane substrate) between about 10 nm to about 750 μm. Thus, the thickness of the membrane substrate may be about 10 nm, about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 1 µm, about 10 µm, about 20 µm, about 30 µm, about 40 µm, about 50 µm, about 75 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, or any range including and/or between any two of these values.

The membrane of any embodiment herein may further include at least one electrical lead disposed on the surface of the membrane bearing the ion-doped conductive polymer. Each electrical lead may be in contact with the conductive material and/or the ion-doped conductive polymer. Electrical leads may each independently include any conductive material known in the art, such as a Group IIIA metal, Group IB metal, Group IIB metal, Group IIIB metal, Group IVB metal, Group VB metal, Group VIB metal, Group VIIB metal, Group VIIIB metal, graphite, carbon powder, pyrolytic carbon, carbon black, carbon fibers, carbon microfibers, carbon nanotubes, single walled carbon nanotubes, multi walled carbon nanotubes, fullerene carbons, graphene, or a combination of any two or more thereof. For example, each electrical lead may independently include copper, silver, gold, copper, nickel, palladium, platinum, manganese, molybdenum, tungsten, iron, cobalt, rhodium, zinc, aluminum, or a combination of any two or more thereof.

In a related aspect, an electrochemical cell is provided that includes an anode; a cathode; a separator positioned between the anode and cathode, where the separator includes a membrane of any embodiment of the present technology; and an electrolyte. The electrochemical cell may be configured as one or more of a redox flow battery, a supercapacitor, a lithium ion battery, a sodium ion battery, a magnesium ion battery, a sensor, and a bio-sensor. For example, the electrolyte may include a biological fluid. Biological fluids include, but are not limited to, blood, lymph, and/or cytosol. The electrolyte may include any electrolyte described herein, where examples particularly suited for use in e.g., a redox flow battery, a supercapacitor, a lithium ion battery, a sodium ion battery, and/or a magnesium ion battery, include but are not limited to ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, or a combination of any two or more thereof.

The electrolyte may include a lithium salt, a sodium salt, a potassium salt, a magnesium salt, a calcium salt, or mixtures of any two or more thereof. The electrolyte may include $LiClO_4$, $LiPF_6$, $LiBF_4$, lithium(trifluoromethylsulfonyl)imide, lithium bis(perfluoroethylsulfonyl)imide, lithium bis(oxalato)borate, or a mixture of any two or more thereof.

The electrochemical cell may include two electrical leads communicatively coupled to the membrane and to a controller. One of the electrical leads may include the conductive material of the membrane. Such controllers are described more fully herein and in the working examples, and based on the description herein are readily ascertainable by a person of skill in the art. For example, the controller may include a potentiostat or a bipotentiostat. The controller may further be communicatively coupled to the anode and the cathode of the electrochemical cell. The controller of any embodiment herein may be configured to apply at least one of an oxidizing or reducing voltage across the membrane to cause a change in an impedance of the membrane.

The present technology is further described in reference to the figures. It will be readily understood that the aspects and embodiments of the present disclosure as illustrated in the figures may be arranged, substituted, combined, and designed in a wide variety of different configurations, all of which are explicitly contemplated and made part of this disclosure.

FIG. 1A is a schematic illustration of an energy storage device 100 that includes an electrochemical cell for storing electrical energy. The electrochemical cell includes a positive current collector 110, a negative current collector 120, a cathode 140 positioned on the positive current collector 110, an anode 150 positioned on the negative current collector 120 and a separator 130 positioned between the cathode 140 and the anode 150. The energy storage device 100 also includes a controller 170 communicatively coupled to the separator 130 and configured to control the impedance of the separator 130 to control an ion-transport (e.g., $Li^+$) therethrough, as described in further detail herein. In various embodiments, the electrochemical cell 100 can include a Li-ion electrochemical cell so that Li ion is transported through the separator 130 between the cathode 140 and the anode 150.

The positive current collector 110 and the negative current collector 120 can be any current collectors that are electronically conductive and are electrochemically inactive under the operation conditions of the electrochemical cell. In various embodiments, the positive and negative current collectors include copper, aluminum, titanium, and/or alloys thereof for the negative current collector and aluminum for the positive current collector 110, in the form of sheets or mesh, or any combination of any two or more thereof. Current collector materials can be selected to be stable at the operating potentials of the cathode 140 and the anode 150 of the electrochemical cell 100. For example, in non-aqueous lithium (Li) systems, the positive current collector 110 can include aluminum, or aluminum coated with conductive material that does not electrochemically dissolve at operating potentials with respect to $Li/Li^+$. Such materials include platinum, gold, nickel, conductive metal oxides such as vanadium oxide, and carbon. The negative current collector 120 can include copper or other metals that do not form alloys or intermetallic compounds with lithium, carbon, and/or coatings comprising such materials disposed on another conductive material.

The cathode 140 can include an active material and a conductive material. In some embodiments, active materials for the cathode 140 can include a Li bearing compound. For example, the Li bearing compound can include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, $Li(Ni, Co, Al)O_2$ (known as "NCA") and $Li(Ni, Mn, Co)O_2$ (known as "NMC"). Other families of exemplary cathode 140 electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM''_y(XD_4)_z$, $(A_{1-a}M''_a)_xM'_y(DXD_4)z(A_{1-a}M''_a)_xM'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIB, VIIIB, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the cathode 140 in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials.

In some embodiments, the cathode 140 can include a non-lithium system. Suitable positive active materials for use in the cathode 140 in such systems can include solid compounds such as those used in NiMH (Nickel-Metal Hydride) or Nickel Cadmium (NiCd) batteries. Still other positive electrode compounds for Li storage include those used in carbon monofluoride batteries, generally referred to as CFx, or metal fluoride compounds having approximate stoichiometry $MF_2$ or $MF_3$ where M comprises, for example, Fe, Bi, Ni, Co, Ti, or V.

In some embodiments, the working ion includes $Li^+$, $Na^+$, $K^+$, or $Mg^{2+}$. In some embodiments, the semi-solid ion-storing redox composition includes a solid including an ion-storage compound. In some embodiments, the ion is proton or hydroxyl ion and the ion storage compound includes those used in a nickel-cadmium or nickel metal hydride battery. In some embodiments, the ion is lithium and the ion storage compound is selected from the group consisting of metal fluorides such as $CuF_2$, $FeF_2$, $FeF_3$, $BiF_3$, $CoF_2$, and $NiF_2$. In some embodiments, the ion is lithium and the ion storage compound is selected from the group consisting of metal oxides such as CoO, $Co_3O_4$, NiO, CuO, MnO.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05. In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1−a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIB, VIIIB, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1−a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, IB, IIB, IIIB, IVB, VB, and VIB metal, D is at least one of oxygen, nitrogen, carbon, or a halogen.

The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys, or combination of two or more thereof.

The anode 150 can include a carbonaceous material such as, e.g., graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination of any two or more thereof. In various embodiments, the anode 150 can include a high capacity anode that includes high capacity active materials, e.g., silicon, bismuth, boron, gallium, indium, zinc, tin, antimony, aluminum, titanium oxide, molybdenum, germanium, manganese, niobium, vanadium, tantalum, iron, copper, chromium, nickel, cobalt, zirconium, yttrium, molybdenum oxide, germanium oxide, silicon oxide, silicon carbide, any other high capacity materials or alloys thereof, or any other combination of any two or more thereof.

An electrolyte can be disposed within the electrochemical cell of the energy storage device 100 to provide a conducting medium for ion transport between the cathode 140 and the anode 150. The electrolyte can include, for example a Li-ion battery electrolyte including a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents can include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These non-aqueous solvents are typically used as multicomponent mixtures, into which a salt is dissolved to provide ionic conductivity. Such salts include, but are not limited to, lithium salts, sodium salts, potassium salts, magnesium salts, calcium salts, or mixtures of any two or more thereof. Exemplary lithium salts to, e.g., provide lithium conductivity, include $LiClO_4$, $LiPF_6$, lithium (trifluoromethylsulfonyl)imide ("LiTFSI"), lithium bis(perfluoroethylsulfonyl)imide ("LiBETI"), lithium bis(oxalato) borate ("LiBOB"), and the like.

Figure 1B:
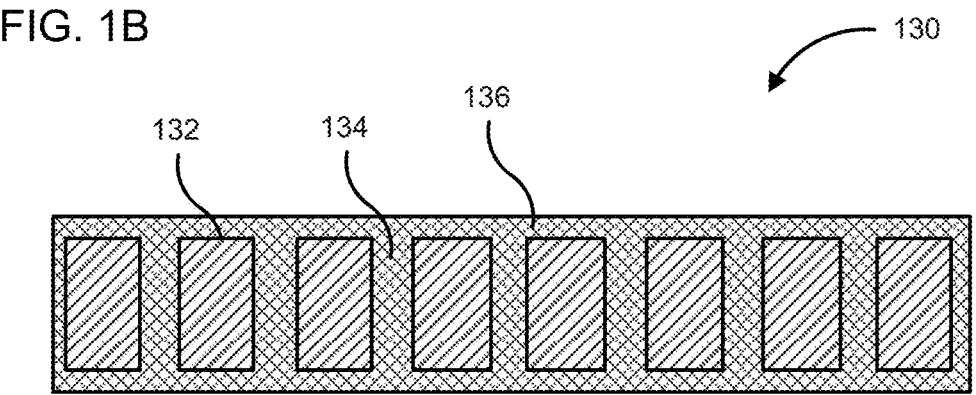
FIG. 1B is a cross-section view of a separator included in the energy storage device of FIG. 1A.

As described before, the separator 130 is positioned between the cathode 140 and the anode 150 and is configured to have an adjustable impedance to control the quantity of ions that can be transported therethrough or otherwise a transmembrane current across the separator 130. FIG. 1B is a side cross-section view of one embodiment of the separator 130. The separator 130 includes a membrane substrate 132 defining a plurality of pores 134 to allow ion transport therethrough (e.g., transport of cations such as $Li^+$, $Na^+$, $K^+$, etc.) The plurality of pores 134 can include micro (e.g., having a size range in the order of 1 microns to 10 microns) or nanopores (e.g., having a size in the range of 10 nm to 900 nm). The membrane substrate 132 can be formed from any suitable material, for example PCTE, polyethylene oxide, nonwoven fibers (cotton, nylon, polyesters, glass), polymer films (polyethylene, polypropylene, poly (tetrafluoroethylene), polyvinyl chloride, naturally occurring substances (rubber, asbestos, wood) or any other suitable material.

In some embodiments, an ion-doped conductive polymer (CP) 136 (e.g., an anion doped CP) is deposited on the membrane substrate so that the ion-doped CP spans across the pores 134 of the membrane substrate 132, as shown in FIG. 1B. The ion-doped CP 136 undergoes changes in density and transmembrane ionic conductance in response to a reducing or oxidizing voltage applied across the separator 130 and more specifically, the ion-doped CP 136 (e.g., an anion doped CP). FIG. 2 shows an illustration of the energy storage device of FIG. 1A showing the change in ionic conductance and density and corresponding change in impedance therethrough. Application of a reducing or oxidizing signal causes the CP to swell, decreasing the density of the CP and adding "hopping sites" in which an ion (e.g., cations or anions) can more easily transverse the membrane, resulting in an overall decrease in impedance. The removal of this signal causes an increase in density of the CP and causes the CP to reject nearby ions due to electrostatic forces. This effectively blocks transport through the membrane by significantly increasing impedance and reducing ion transport (e.g., $Li^+$) through the separator 130, for example to trace levels.

For example, in some embodiments, the ion-doped CP 136 includes an anion-doped CP 136. The anion-doped CP 136 undergoes changes in density and transmembrane ionic conductance in response to a reducing voltage applied across the separator 130 and more specifically, the anion-doped CP, as shown in FIG. 2. Application of a reducing signal causes the CP to swell, decreasing the density of the CP and adding "hopping sites" in which an ion (e.g., cations or anions) can more easily transverse the membrane, resulting in an overall decrease in impedance. The removal of this signal causes an increase in density of the CP and causes the CP to reject nearby cations due to electrostatic forces, thereby effectively blocking transport of cations therethrough.

Figure 1C:
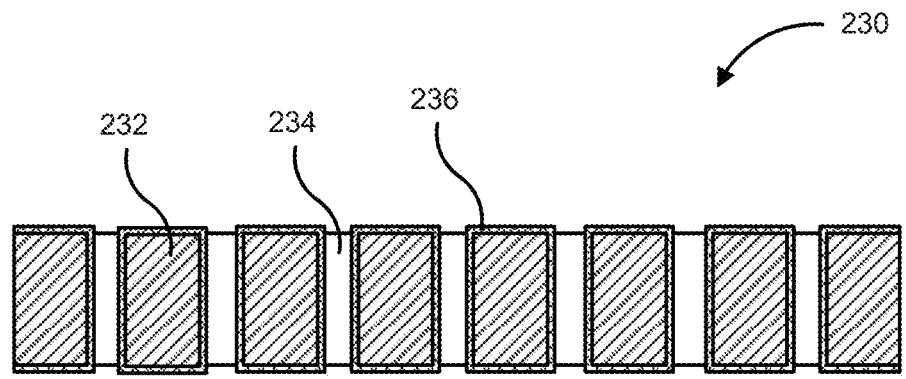
FIG. 1C is a cross-section view of another embodiment of a separator that can be included in the energy storage device of FIG. 1A.

FIG. 1C shows a side cross-section of another embodiment of a separator 230 that can be included in the energy storage device 100. The separator 230 includes a membrane substrate (e.g., the membrane substrate 132) defining a plurality of pores 234 therethrough. An ion-doped conductive polymer (CP) 236 (e.g., the ion-doped CP 136) is deposited on the membrane substrate so that the ion-doped CP 236 covers sidewalls of the pores 234 of the membrane substrate 232. The ion-doped CP 236 is formulated to have a change in a porosity and/or an impedance (Z) of the ion-doped CP 236 in response to a reducing or oxidizing voltage applied across the separator 230 and more specifically, the ion-doped CP 236 Application of a reducing voltage or an oxidizing voltage can cause the ion-doped CP 236 to swell or increase in thickness, for example due to an influx of ions into the ion-doped CP. This effectively blocking the pores 234, thereby significantly increasing the impedance and reduce ion transport (e.g., $Li^+$) through the separator 230, for example to trace levels. For example, the ion-doped CP 236 can include an anion-doped CP 236. Application of a reducing voltage on the anion-doped CP can cause the anion-doped CP to swell or experience an increase in impedance, as described above effectively blocking the pores 234, thereby preventing ion transfer therethrough.

In some embodiments, the ion-doped CP 136 can be electroneutral at a resting potential (e.g., no potential applied thereacross) i.e., has a net zero charge to allow unimpeded ion transfer therethrough. Application of the oxidizing or reducing voltage can cause a net positive or negative charge to develop in the ion-doped CP 136, thereby causing volumetric expansion of the ion-doped CP membrane CP 136 blocking the pores 134, increasing the impedance of the ion-doped CP 136, developing a net positive or negative charge, or a combination thereof to prevent the ions (e.g., $Li^+$) to pass therethrough. The increase in impedance is reversible so that the ion-doped CP 136 can return to its initial configuration allowing the ions to once again pass unimpeded therethrough.

While not shown in FIG. 1B, in some embodiments, a conductive material, for example a metal such as gold, platinum, copper, or any other suitable conductive material can be positioned between the membrane substrate 132 and the ion-doped CP 136. For example, the conductive material can deposited on the membrane substrate 132 (e.g. evaporated on the membrane substrate 132) and the ion-doped CP 136 can be deposited on the conductive material. The conductive material may serve as an electrical lead to allow deposition (e.g., electrochemical deposition) and/or allow communicative coupling of the controller 170 to the ion-doped CP 136.

The ion-doped CP 136 can be deposited on the membrane substrate 132 using any suitable method. For example, monomers of a conducting polymer suspended in a solution including the doping ion can be electropolymerized and/or electroplated on the membrane substrate 132, for example on the conductive material deposited on the membrane substrate 132. In some embodiments, the ion-doped CP 136 can be printed (e.g., screen printed or ink jet deposited), spin coated, spray coated, evaporated, vapor deposited, or chemically deposited on the membrane substrate. Any suitable conducting polymer can be used such, for example, polypyrole (PPy), poly(3,4-ethylenedioxythiophene) (PEDOT), polyacteylene, polyaniline, poly(p-phenylene vinylene), poly(fluorenes), polyphenylenes, polypyrenes, polyazulenes, polynaphthalenes, polycarbazoles, polyindoles, polyazepines, poly(thiophenes) poly(p-phenylene sulfide), polyfuran, combinations of two or more thereof, or any other suitable conducting polymer.

The conducting polymer can be doped with an anion and/or cation based on specific intended operational parameters, thereby forming the ion-doped CP 136. For example, the doping ion can include an anion, for example dodecylbenzenesuflonate, polystyrene sulfonate, p-toluene sulfonate (TsO$^-$), chloride (Cl$^-$), fluoride (F$^-$), iodide (I$^-$), sulfate (SO$_4^{2-}$) or any other suitable anion, or a cation, for example, Na$^+$, K$^+$, Ca$^{2+}$, Li$^+$, Mg$^{2+}$, or any other suitable cation. In particular embodiments, the separator 130 includes an anion-doped CP 136 configured to control the cationic flow (e.g., flow of Li$^+$ ions) thereacross.

For example, the ion-doped CP 136 or 236 can include an anion-doped CP, for example PPy(DBS) CP. In embodiments shown in FIG. 1B, in which the PPy(DBS) CP 136 spans the pores 134 of the membrane substrate 132, the PPy(DBS) CP 136 can experience an influx of cations to the redox sites of the CP on application of a reducing voltage to reduce the PPy(DBS) CP. The influx of cations (e.g., K$^+$ or Li$^+$ or Na$^+$) causes the PPy(DBS) CP 136 to decrease in density and provides a chain of cations at the redox sites transversely across the membrane. Upon reducing (e.g., at reduction potential within the range of –0.45 V to –0.8 V) these chains acts as "hopping sites" in which a cation can more easily transverse the membrane. This decreases the impedance of the PPy(DBS) CP 136. On switching to an oxidation potential (e.g., in the range of –0.4 V to –0.1 V), the cations are expelled from the PPy(DBS) CP 136, thereby eliminating the chain "hopping sites" transversely across the separator 130. In this manner, the impedance of the PPy (DBS) CP 136 is increased back to its initial value eliminating the flow of cations therethrough also to its initial value.

In embodiments such as those shown in FIG. 1C in which the ion-doped CP 236 includes a PPy(DBS) CP and covers the sidewalls of the pores 234 of the membrane substrate 232, the PPy(DBS) CP 236 can experience an extensional strain (e.g., up to about 45%) on application of a reducing voltage to reduce the PPy(DBS) CP 236. The extensional strain causes the PPy(DBS) CP 236 to swell or volumetrically expand effectively closing the pores 134. The reduction occurs in the presence of cations (e.g., K$^+$ or Li$^+$ or Na$^+$) present in the electrolyte included in the energy storage device 100. Upon reducing (e.g., at reduction potential within the range of –0.45 V to –0.8 V) cations ingress into the PPy(DBS) CP 236 and lead to volumetric expansion. This increases the impedance of the PPy(DBS) CP 236 and reduces the quantity of cations that can pass through the separator 230, until eventually, the flow of cations is almost completely blocked (e.g., flow of ions reduced to less than 5% of the flow of ions passing through the PPy(DBS) CP 236 before application of the reducing voltage). On switching to an oxidation potential (e.g., in the range of –0.4 V to –0.1 V), the cations are expelled from the PPy(DBS) CP, 236 thereby causing a shrinkage in the size of the PPy(DBS) CP 236 until the PPy(DBS) deposited on the membrane substrate 232 returns to its initial size. In this manner, the impedance of the PPy(DBS) CP 236 is reduced backed to its initial value returning the flow of cations therethrough also to its initial value.

Figure 3:
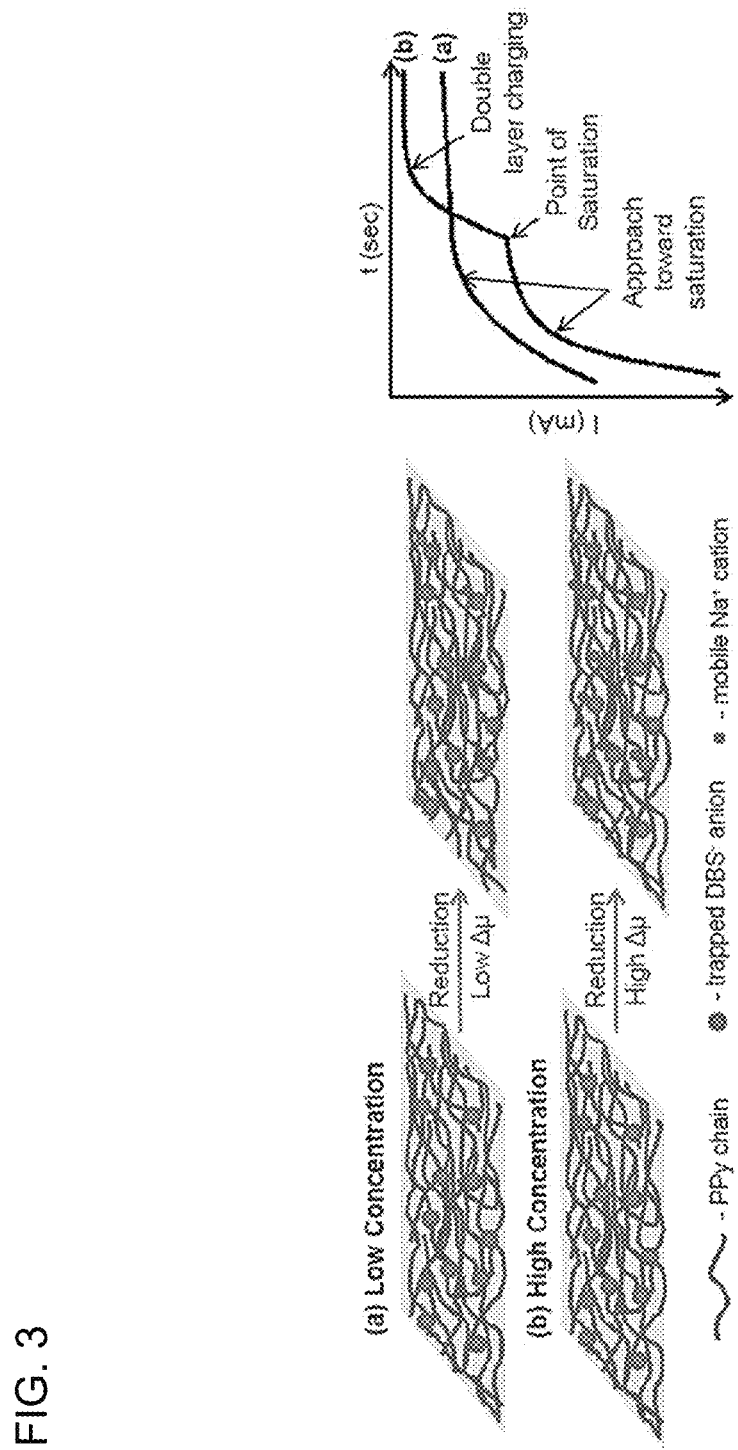
FIG. 3 is a schematic depicting an ion-doped conductive polymer that includes a PPy(DBS) having partially and fully occupied redox sites upon reduction (left), and corresponding qualitative chronoamperograms showing current response for an applied step reduction voltage (right).

FIG. 3 is an illustration depicting an ion-doped conductive polymer that includes a PPy(DBS) having partially and fully occupied redox sites upon reduction (left), and corresponding qualitative chronoamperograms showing current response for an applied step reduction voltage (right). The following section describes the mechanics of ion-transport across a PPy(DBS) CP included in the separator 130 which is representative of any ion-doped CP 136 which can be included in the separator 130.

The ingress of ions into PPy(DBS) matrix is driven by two factors; (a) the driving force for the ions—represented by chemical potential; and (b) the ability of the CP to store the ingressing ions—defined by the number of redox sites in the polymer. The driving force for ion ingress is the electrochemical potential ($\Delta\mu_{Na}+$) described as the sum total of potentials due to: (1) the applied electrical field; and (2) the concentration gradient of cations between the electrolyte and the polymer.

The electrochemical potential for PPy(DBS) exchanging sodium ions with NaCl electrolyte during reduction is depicted in Equation 1, $$\Delta\mu_{Na} += R\Theta\ln\left(\frac{y^{NaCl}_{Na^+}}{y^o_{Na^+}}\right) + z_e FV \tag{1}$$

where, R is the gas constant, $\Theta$ is the ambient temperature, $y^{NaCl}_{Na^+}$ is the mole fraction of Na$^+$ in NaCl solution, $y^o_{Na^+}$ is the residual Na$^+$ mole fraction in PPy(DBS) (as a result of polymerization using NaDBS), $z_e$ is the charge associated with an electron, F is the Faraday constant and V is the applied voltage (reduction potential). At a constant applied voltage, the increase in electrolyte concentration will result in an increased rate of cation influx into the polymer matrix.

The total number of ions moving into the polymer bulk is limited by the number of redox sites in the matrix that are capable of ion storage, and their accessibility to the ingressing ions. For PPy(DBS), every polymeric repeat unit consists of three pyrrole monomers and a bulky anionic dopant (dodecylbenzenesulfonate (DBS)) molecule serves as a redox site which can be occupied by a single mobile cation. Following complete occupation of accessible redox sites by ingressing ions, additional ion influx cannot be accommodated by the CP.

The total number of redox sites formed during polymerization, $N_r$, can be calculated through Equation 2, $$N_r = \frac{Q_p}{(\eta_p - \eta_c)F} \quad (2)$$

The total number of redox sites formed during polymerization, $N_r$, can be calculated through Equation 2, where $Q_p$, $\eta_p$, $\eta_c$, and F represent total charge accumulation during electropolymerization, electrons produced during polymerization, electrons consumed during polymerization, and the Faraday constant. It is expected that increasing the polymerization charge (or the mass of the polymer) would increase the number of redox sites. However, with the incorporation of additional polymer during electropolymerization, the thickness of the polymer builds, which subsequently decreases the accessibility of redox sites buried deep within the polymer matrix. In an ideal case, every redox site in the polymer can be expected to be occupied, indicating 100% filling efficiency. This phenomenon would be observed in an atomically thin CP membrane. But, in a more realistic scenario, material and structural properties limit the redox site accessibility as would be observed at mesoscale thicknesses.

As shown in FIG. 3, at low electrolyte concentrations (low $\Delta\mu$), rate of ion ingress occurs slower compared to higher concentrations and subsequently the accessible redox sites are only partially occupied by ingressing cations within a certain time 't'. Thus, the chronoamperometric response will show a single time constant representing the saturation kinetics of accessible redox sites in the PPy (DBS) CP for that particular electrochemical gradient. At high electrolyte concentrations (high $\Delta\mu$), rate of ion ingress is faster than at low concentrations and the accessible redox sites get rapidly filled with ingressing cations within the same time T. At the point of complete saturation of accessible redox sites, the current response presents an inflection (or 'shoulder'). At concentrations above which the inflection is first observed in the chronoamperometric response, the current data has two time constants. As seen in the previous scenario, the first time constant represents the saturation kinetics of accessible redox sites. Once the accessible redox sites are filled, a second time constant associated with the establishment and maintenance of the electrical double layer is observed.

In this manner, the separator 130 can be used to dynamically control the impedance of the separator 130 and thereby, the transport of ions therethrough. This ability can be used to prevent thermal runaway in the energy storage device 100 (e.g., a battery or super-capacitor). As described before, thermal runaway can be cause a large quantity of ions crossing the separator 130. When such a condition is detected, the ion-doped CP 136 (e.g., PPy(DBS)) included in the separator 130 can be reduced or oxidized to increase the impedance and blocking the flow of ions thereacross.

In various embodiments, the controller 170 is communicatively coupled to the ion-doped CP 136. The controller 170 is configured to apply an oxidizing or reducing voltage across the separator 130 to cause a change in an impedance of the ion-doped CP 136. The change in impedance is configured to control a quantity of ions transferred through the separator 130. Expanding further, the controller 170 can be configured to interpret a temperature of the energy storage device 100, for example via a temperature sensor (not shown) communicatively coupled to the controller 170. Alternatively or in addition, the controller 170 can also be configured to measure a current across the separator 130. The temperature of the energy storage device 100 and/or the current across the separator 130 can be indicative of the health of the energy storage device 100 and more, particularly an onset of thermal runaway. For example, if the temperature exceeds a predetermined temperature threshold and/or the current exceeds a predetermined current threshold, this can indicate the onset of thermal runaway.

The controller 170 can include a processor, a memory or other computer readable medium, a sensor and a transceiver. In various embodiments, the controller 170 can include the computing device 630 shown in FIG. 47. In various embodiments, the sensor includes an electrical sensor configured to receive and interpret a temperature signal from the temperature sensor and/or a current signal across the separator 130. The sensor can communicate the detected signal to the processor 170.

The processor can include a microprocessor, programmable logic controller (PLC) chip, an ASIC chip, or any other suitable processor. The processor is in communication with the memory and configured to execute instructions, algorithms, commands or otherwise programs stored in the memory. The memory can include any of the memory and/or storage components discussed herein. For example, the memory may include RAM and/or cache of processor. The memory may also include one or more storage devices (e.g., hard drives, flash drives, computer readable media, etc.) either local or remote to the controller 170. The memory is configured to store look up tables, algorithms or instructions.

For example, the memory may include a temperature determination module configured to interpret the temperature of the energy storage device 100 and compare the temperature to a predetermined temperature threshold. If the temperature exceeds the predetermined temperature threshold, the temperature determination module can determine that thermal runaway is about to happen. The memory may also include a current determination module configured to interpret the current across the separator 130 and compare the current to a predetermined temperature threshold. If the current exceeds the predetermined current threshold, the current determination module also determines that thermal runaway is about to happen.

The controller 170 also includes a transceiver configured to generate an oxidizing or reducing voltage signal which is communicated to the separator 130 to reduce or oxidize the ion-doped CP 136 deposited thereon. For example, the ion-doped CP 136 includes a PPy(DBS) CP and the controller 170 instructs the transceiver (e.g., a potentiostat) to apply a reducing or oxidizing voltage on the PPy(DBS) CP causing the PPy(DBS) CP to expand or contract and reduce ionic conductivity, depending on device configuration and effectively block the flow of cations (e.g., $Li^+$) across the separator 130, thereby preventing thermal runaway. The controller 170 can continue monitoring the temperature of the energy storage device 100 and/or the current across the separator 130 while maintaining the reducing or oxidizing voltage across the separator 130. Once the temperature falls below the predetermined temperature threshold and/or the current falls below the predetermined current threshold, the controller 170 can instruct the transceiver to either remove the voltage or apply a predetermined or reducing oxidizing voltage to oxidize or reduce the PPy(DBS) CP. The reducing or oxidizing voltage is maintained until the quantity of ion transported across the separator 130 returns to those expected during normal operating conditions. Thus, the separator 130 prevents thermal runaway while preventing permanent damage to the energy storage device 100

In some embodiments, the controller 170 can be configured to control the quantity of ions transported across the ion-doped CP 136 during normal operation, for example to control a charge or discharge rate of the energy storage device 136. For example, during charging, the controller 170 can apply a voltage across the ion-doped CP 136 to increase or decrease its impedance and prevent or allow ion transfer across the separator 130, for example to facilitate faster charging. In some embodiments, the controller 170 can also be configured to increase the impedance and prevent ion transfer across the separator 130 once the charge in the energy storage device 100 drops below a predetermined charge threshold so as to prevent complete discharge of the energy storage device 100.

Figure 4:
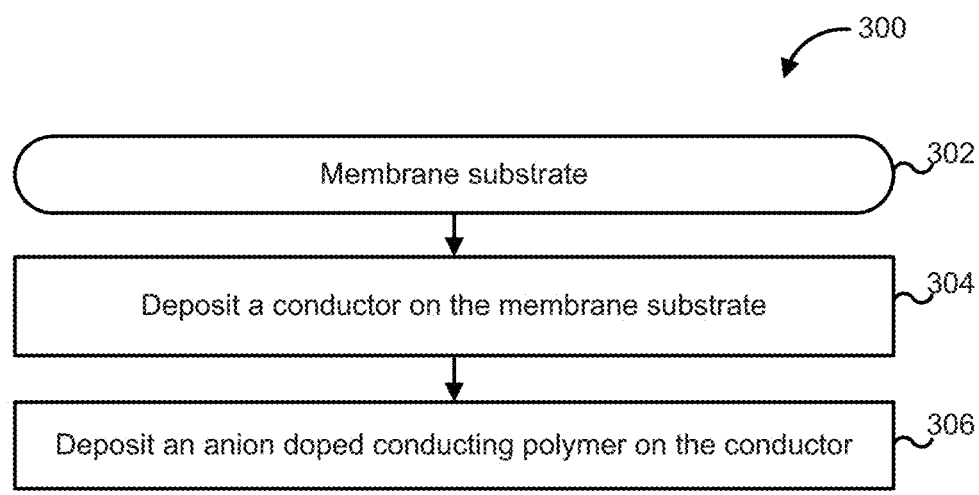
FIG. 4 is a schematic flow diagram of an embodiment of a method for forming a membrane that has a tunable transmembrane conductance so that a charge transport across the membrane can be controlled by applying a reducing or oxidizing voltage across the membrane.

FIG. 4 is a schematic flow diagram of an example method 300 for forming a membrane which can control the quantity of ions that can be transported across the membrane. For example, the membrane can include a separator (e.g., the separator 130) for use in an electrochemical cell, for example one or more electrochemical cells included in an energy storage device (e.g., the energy storage device 100) such as a battery or a super-capacitor.

The method 300 includes providing a membrane substrate at 302. The membrane substrate can include, for example the membrane substrate 132 described herein and can be formed from any suitable material, for example, PCTE or any other membrane substrate material described herein. The membrane substrate is microporous or nanoporous to allow a quantity of ions to pass therethrough. A conductive material is deposited on the substrate at 304. For example, a metal such as a gold, platinum, copper or any other conductive material can be deposited on the membrane substrate, for example evaporated thereon.

An ion-doped CP is deposited on the conductive material at 306. For example, the ion-doped CP 136 (e.g., PPy(DBS)) or any other ion-doped CP 136 is deposited on the conductive material, for example electropolymerized and/or electroplated on the conductive material, roll printed, screen printed, inkjet printed, spray coated, spin coated, evaporated, vapor deposited or self-assembled (e.g., via ionic or covalent linking) on the conductive material.

The ion-doped CP is formulated to have a change in a porosity and/or impedance in response to a reducing or an oxidizing voltage applied across the membrane. The change in porosity and/or impedance is configured to control a quantity of ions transferred through the membrane. For example, the ion-doped CP can include PPy(DBS), which can be reversibly reduced by selectively applying a predetermined reducing voltage (e.g., in the range of −0.45 V to −0.8 V) and volumetrically expand to restrict or otherwise substantially block flow of ions therethrough. A predetermined oxidation potential (e.g., in the range of −0.4 V to 0.1 V) is selectively applied to return the PPy(DBS) to its initial volume, thereby removing the restriction on the cations (e.g., $Li^+$, $Na^+$, $K^+$, or any other cation) to flow through the membrane. The membrane formed using the method 300 can be used to prevent thermal runaway, control charging/discharging rate of an energy storage device and/or allow health monitoring of an electrolyte included in the energy storage device as a described herein.

Figure 5:
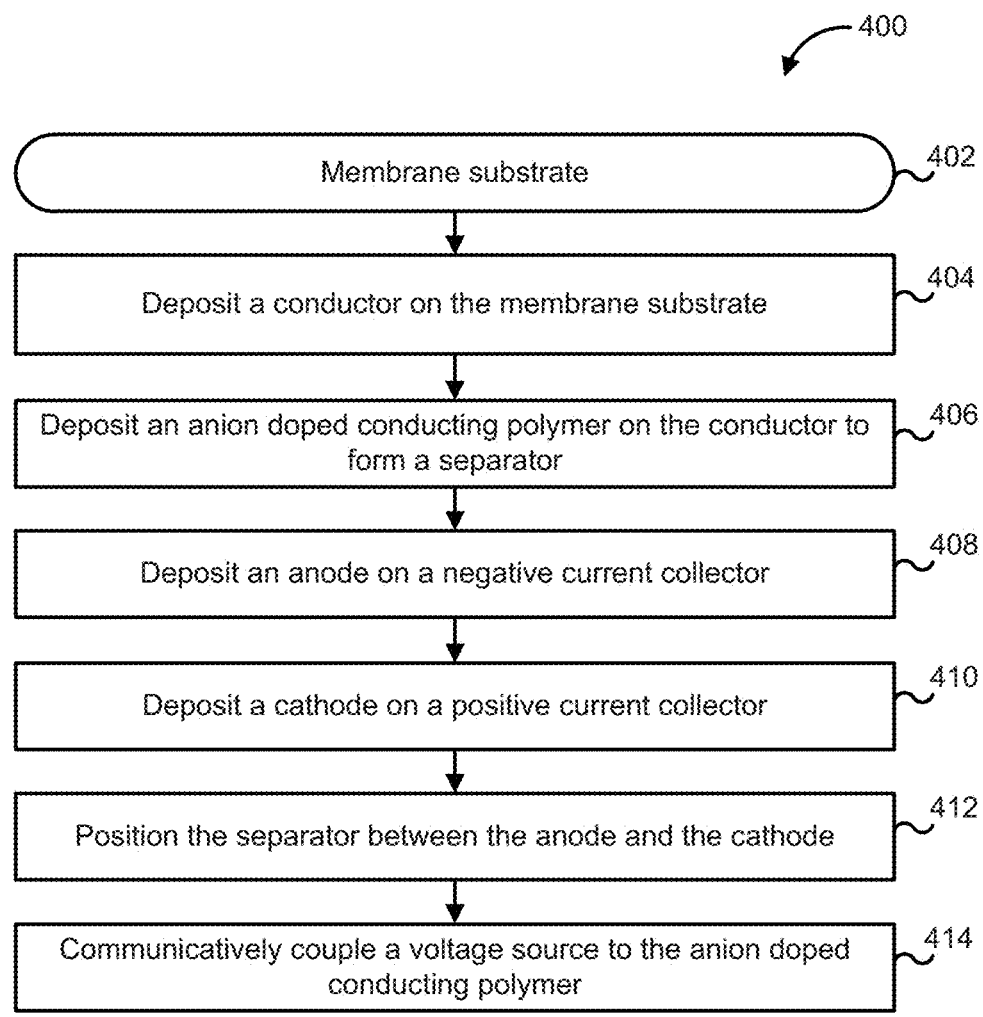
FIG. 5 is a schematic flow diagram of an embodiment of a method for forming an electrochemical cell.

FIG. 5 is a schematic flow diagram of an example method 400 for forming an electrochemical cell which can be included in an energy storage device (e.g., the energy storage device 100). The electrochemical cell formed using the method 400 can selectively allow control of the quantity of ions that can flow across a separator included in the electrochemical cell as described herein.

The method 400 includes providing a membrane substrate at 402. The membrane substrate can include the membrane substrate 132 or any other membrane substrate described herein. A conductive material is deposited on the membrane substrate at 404. The conductive material can include a metal, for example gold, platinum, copper or any other conductive material described herein which is deposited on the membrane substrate using any suitable method described herein, for example evaporated thereon.

An anion-doped CP is deposited on the conductive material to the form a separator at 406. The anion-doped CP can include PPy(DBS) or any other anion-doped CP described herein deposited using any suitable method described herein. The anion-doped CP is formulated to volumetrically expand or eliminate ionic "hopping sites" causing an increase in the impedance of the anion-doped CP when selectively subjected to a predetermined reducing or oxidizing voltage, as described herein. The increased impedance of the anion-doped CP is selectively reversible by applying a predetermined oxidation or reduction potential across the anion-doped CP.

An anode is deposited on a negative current collector at 408. For example, the anode 150 is deposited on the negative current collector 120 using any suitable process such as calendaring or screen printing. A cathode is deposited on a positive current collector at 410. For example, the cathode 140 is deposited on the positive current collector 110 using any suitable process such as calendaring or screen printing.

The separator is positioned between the anode and the cathode at 412, thereby forming the electrochemical cell. In various embodiments, a plurality of electrochemical cells can be stacked in a cell stack to form a battery or super-capacitor having a desired charge capacity. In such embodiments, each of the plurality of electrochemical cells included in the cell stack can be separated by an insulating layer.

A voltage source is communicatively coupled to the anion-doped CP at 414. For example, the controller 170 is communicatively coupled to the conductive material, for example via electrical leads to allow electrical communication with the anion-doped CP (e.g., PPy(DBS)). The voltage source can be used to selectively reduce or oxidize the anion dope CP to control a flow of cations thereacross, as described in detail herein with reference to the energy storage device 100 of FIG. 1.

Figure 6:
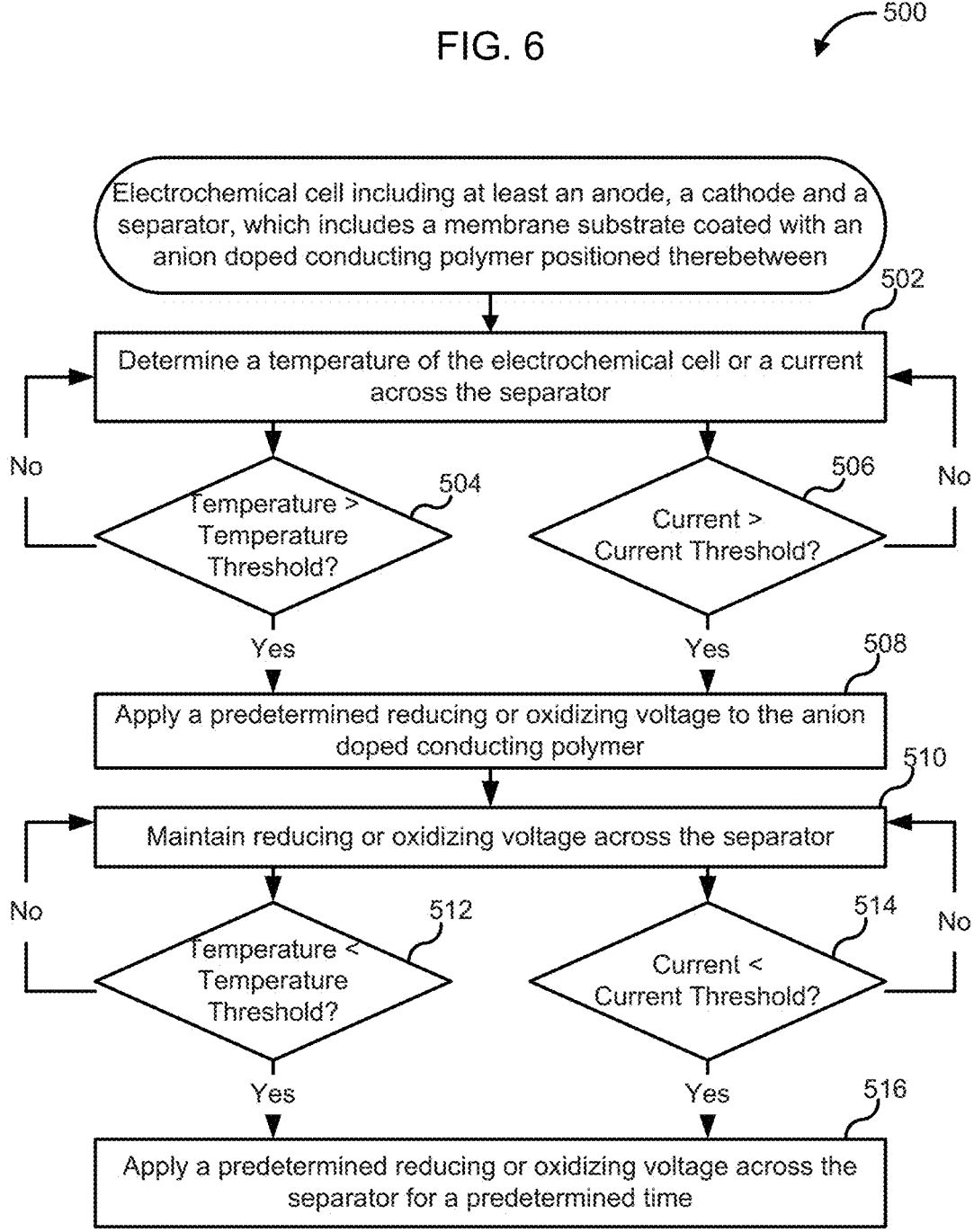
FIG. 6 is a schematic flow diagram of an embodiment of a method for preventing thermal runaway in an electrochemical cell.

FIG. 6 is a schematic flow diagram of another example method 500 for preventing thermal runaway in an electrochemical cell that includes at least an anode, a cathode and a separator positioned therebetween. The separator includes a membrane substrate, for example the membrane substrate 132, coated with an anion-doped conductive polymer, for example PPy(DBS). The separator (e.g., the separator 130) has an initial impedance to allow an initial quantity of cations (e.g., $Li^+$, $Na^+$, $K^+$, $Mg^{2+}$, $Ca^{2+}$, or any other cation) to pass therethrough. The operations of the method 500 can be stored in the form of instructions on a non-transitory CRM (e.g., the memory of the controller 270, or main memory 636, read only memory (ROM) 638 or storage device 640 included in the computing device 630 of FIG. 47). The CRM can be included in a computing device (e.g., the computing device 630) which is configured to execute the instructions stored on the CRM to perform the operations of the method 500.

The method includes detecting a temperature of the electrochemical cell or a current across the separator at 502. For example, the controller 170 can be coupled to a temperature sensor included in the energy storage device 100 or the ion-doped CP 136 of the separator 130 to determine a temperature of the energy storage device 100 and/or the current across the separator 130.

It is determined whether the temperature of the energy storage device is greater than a predetermined temperature threshold at 504. Additional or alternatively, it is also determined whether the current across the separator is greater than a predetermined current threshold at 506. The predetermined temperature threshold and the predetermined current threshold can correspond to an onset of a thermal runaway condition in the energy storage device, for example the energy storage device 100. If neither operation 506 or 508 is true, the method 500 returns to operation 502. In any one of 506 or 508 is true, a predetermined reducing or oxidizing voltage is applied on the anion-doped CP at 508. The predetermined reducing or oxidizing voltage causes the initial impedance (or operational impedance) of the anion-doped CP (e.g., PPy(DBS)) to increase to a first impedance greater than the initial impedance. The first impedance allows a first quantity of cations to pass through the separator at any given time, which is less than the initial quantity of cations. For example, the first quantity of cations can include less than 10%, less than 5% or less than 1% of the initial quantity of cations. In various embodiments, the first impedance can block substantially all of the cations from passing through the separator so that that first quantity of cations that can pass through the separator is about zero.

The reducing or oxidizing voltage is maintained across the separator at 510, for example across the separator 130 included in the energy storage device 100. In some embodiments, the anion-doped CP maintains its reduced or oxidized state, thereby the high impedance associated with the reduced or oxidized state of the anion-doped CP without a constant voltage applied thereon. In such embodiments, operation 510 can be excluded.

After a predetermined time or dynamically in real time, it is determined if the temperature has dropped below the predetermined temperature threshold at 512. Additionally or alternatively, it is also determined if the current across the separator has dropped below the predetermined current threshold at 514. If neither operation 512 or 514 is true, the method 500 returns to operation 510. If at least one of operations 512 or 514 is true, a predetermined oxidizing or reducing voltage is applied across the anion-doped CP for a predetermined time at 516. The predetermined oxidizing or reducing voltage causes the first impedance to decrease to a second impedance. The second impedance allows a second quantity of cations, which is greater than the first quantity of cations to pass through the membrane. In some embodiments, the second impedance of the anion-doped CP is equal to the initial impedance of the anion-doped CP so that the second quantity of cations that can pass through the separator is equal to the initial quantity of cations that were communicable through the separator before the onset of the thermal runaway condition. In this manner, thermal runaway is prevented without causing any damage to the energy storage device.

It should be noted that the above discussion regarding the method utilizing a anion-doped CP is similar if a cation-doped CP is employed, where the difference is the quantity of ions are a quantity of anions (e.g., Cl$^-$, F$^-$, I$^-$, SO$_4^{2-}$, or any other anion).

EXAMPLES

The examples herein are provided to illustrate advantages of the present technology and to further assist a person of ordinary skill in the art with preparing or using the membranes of the present technology. This section further describes various experiments demonstrating the fabrication of membranes that can provide controlled ion transport as described herein, characterization of such membranes to show control of ionic current across the membranes and use of such membranes as an ionic sensor, for example to determine health of an electrolyte included in an electrochemical cell. The examples herein are also presented in order to more fully illustrate certain preferred aspects of the present technology. The experimental examples described herein are only illustrations and should not be construed as limiting the disclosure in any way. The examples can include or incorporate any of the variations, aspects, or embodiments of the present technology described above. The variations, aspects, or embodiments described above may also further each include or incorporate the variations of any or all other variations, aspects or embodiments of the present technology.

Membrane Formation and Redox Properties

Figure 7:
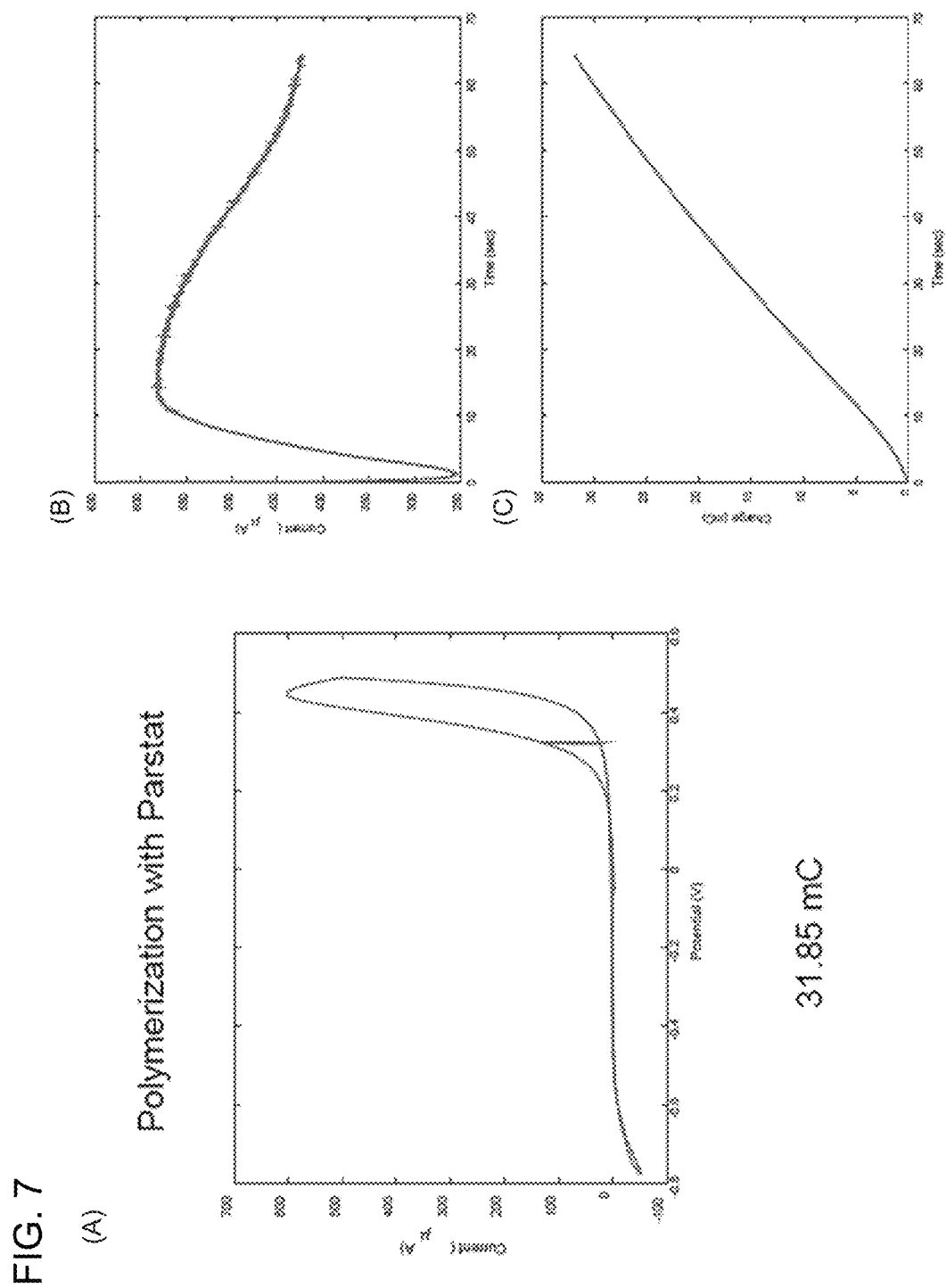
FIGS. 7-9 are plots of electrochemical deposition of a dodecylbenzenesuflonate doped polypyrole ("PPy(DBS)") CP on a membrane substrate to form a PPy(DBS) membrane having an areal density of 0.1 $C/cm^2$ (FIG. 7), conditioning of the PPy(DBS) membrane in NaCl (FIG. 8) and impedance spectra of the PPy(DBS) membrane (FIG. 9).
Figure 8:
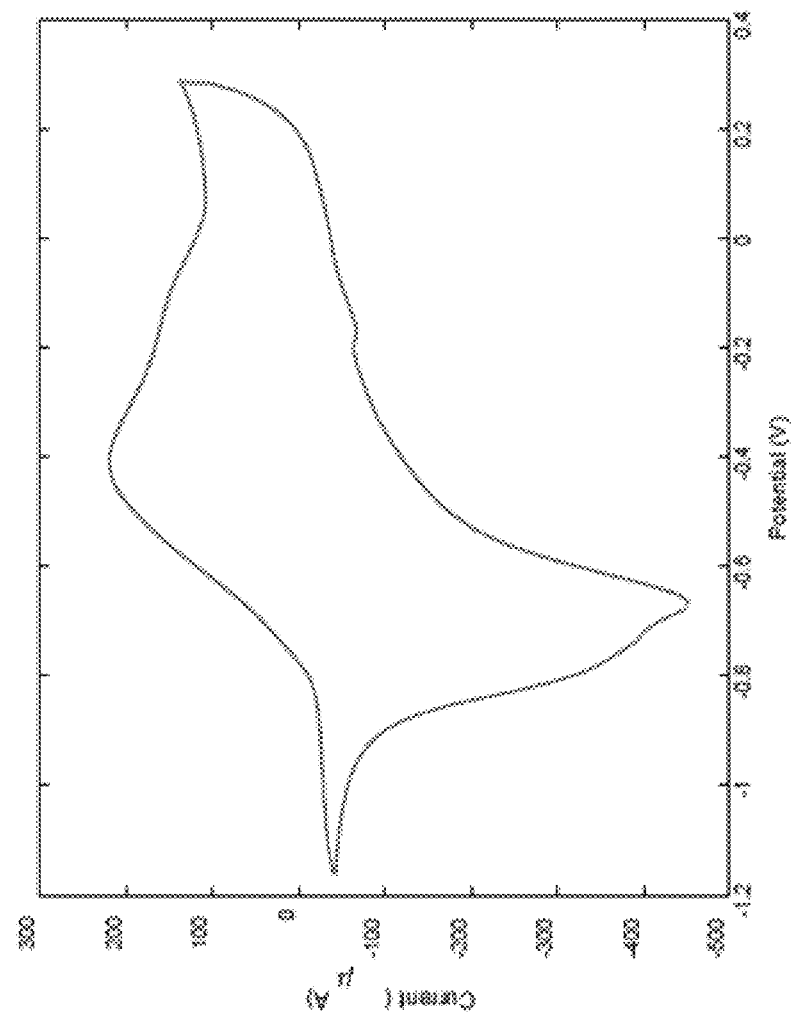
Figure 9:
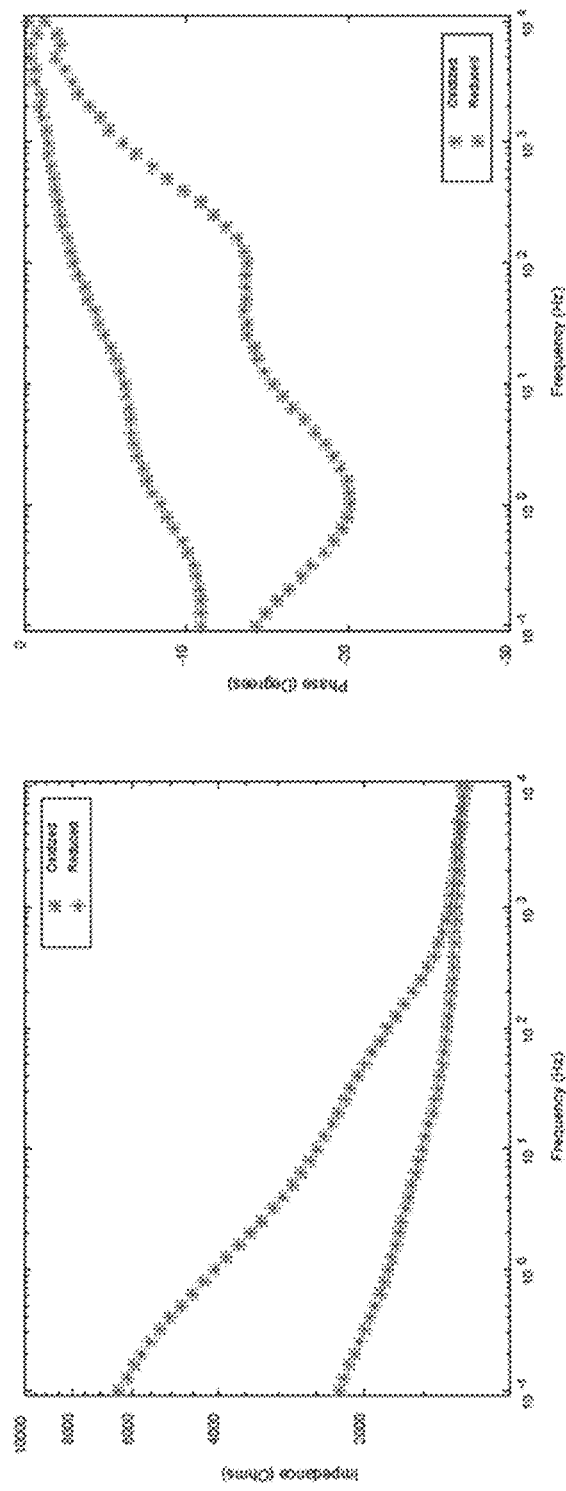

FIGS. 7-9 are plots of electrochemical deposition of a PPy(DBS) CP on a membrane substrate to form a PPy(DBS) membrane having an areal density of 0.1 C/cm$^2$. The membrane substrate includes a 600 nm thick PCTE membrane. The membranes are sputtered with a 10 nm thick gold layer covering a circular area of 0.31 cm$^2$, and electrically connected with a silver wire. Epoxy is applied to insulate the exposed silver so as to exclude its participation in the electrochemical measurements.

A polymerization solution containing 0.1 M pyrrole and 0.1 M NaDBS is prepared in deionized water (resistivity 18.2 MΩ·cm) into which the membrane substrate is inserted. CV between +0.4 V and −0.8 V is performed on the membrane substrate determine the necessary applied potential to initiate PPy(DBS) growth. Chronoamperometry (CA) at an appropriate potential such as 0.45 V is used to potentiostatically electropolymerize PPy(DBS) membrane on the gold layer of the membrane substrate to form the PPy(DBS) membrane, as shown in FIG. 7 (left) and the accumulated charge due to the electropolymerization process is monitored until the PPy(DBS) membrane has an areal density of 0.1 C/cm$^2$, at which point the CA process is ceased. FIG. 7 (top right) is a plot of the current and FIG. 7 (bottom right) is the charge developed in the PPy(DBS) membrane, which was about 31.85 mC.

The 0.1 C/cm$^2$ areal density PPy(DBS) membrane is conditioned in NaCl by performing CV between 0.2 V and −1.2 V until the current response is redundant across multiple cycles. FIG. 9 is impedance vs frequency plots (left) and phase vs frequency plots (right) of the 0.1 C/cm$^2$ PPy(DBS) membrane during its reduced and oxidized state.

Figure 10:
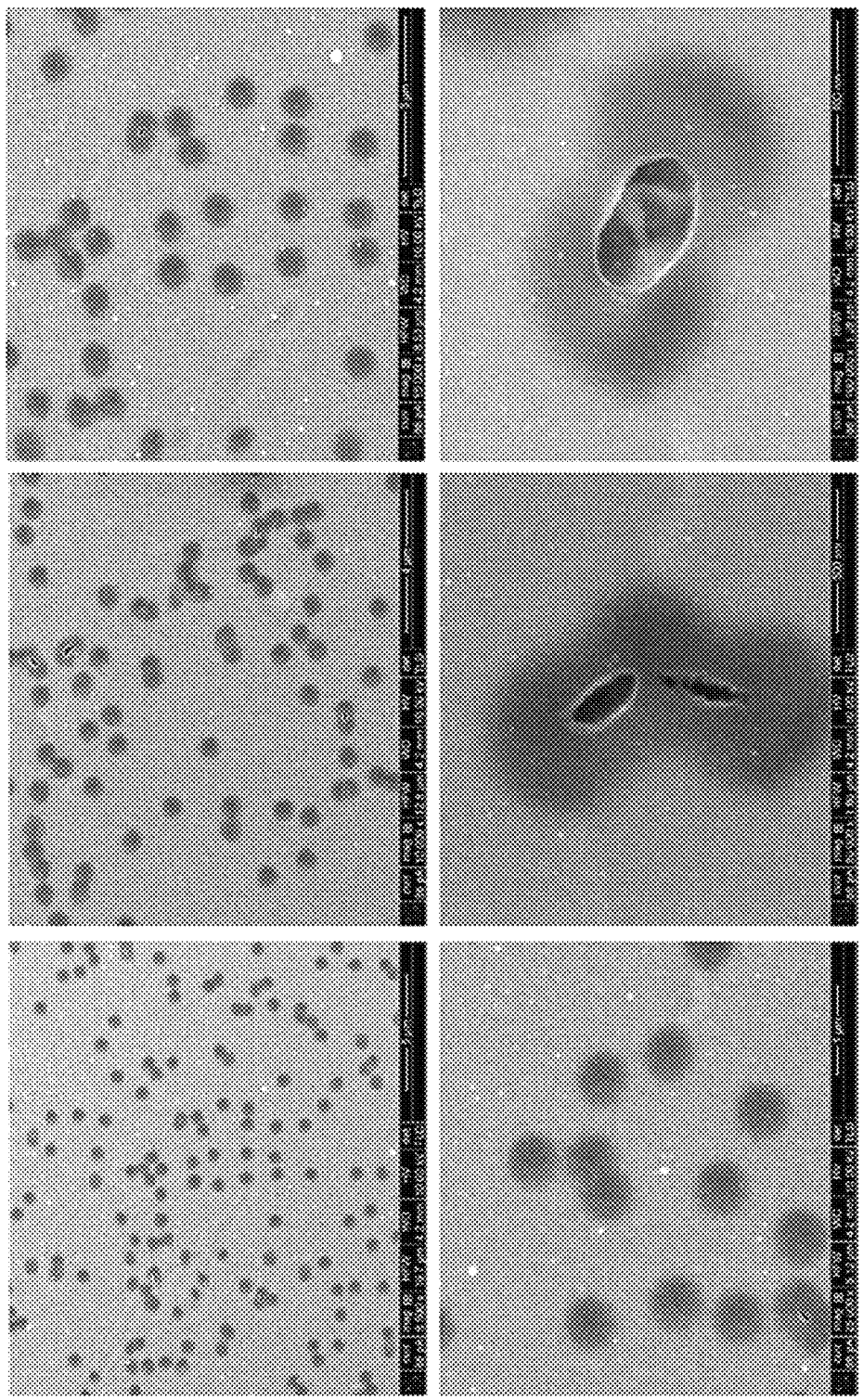
FIG. 10 are scanning electron micrograph (SEM) images of the PPy(DBS) membrane of FIGS. 7-9 at various magnifications.
Figure 11:
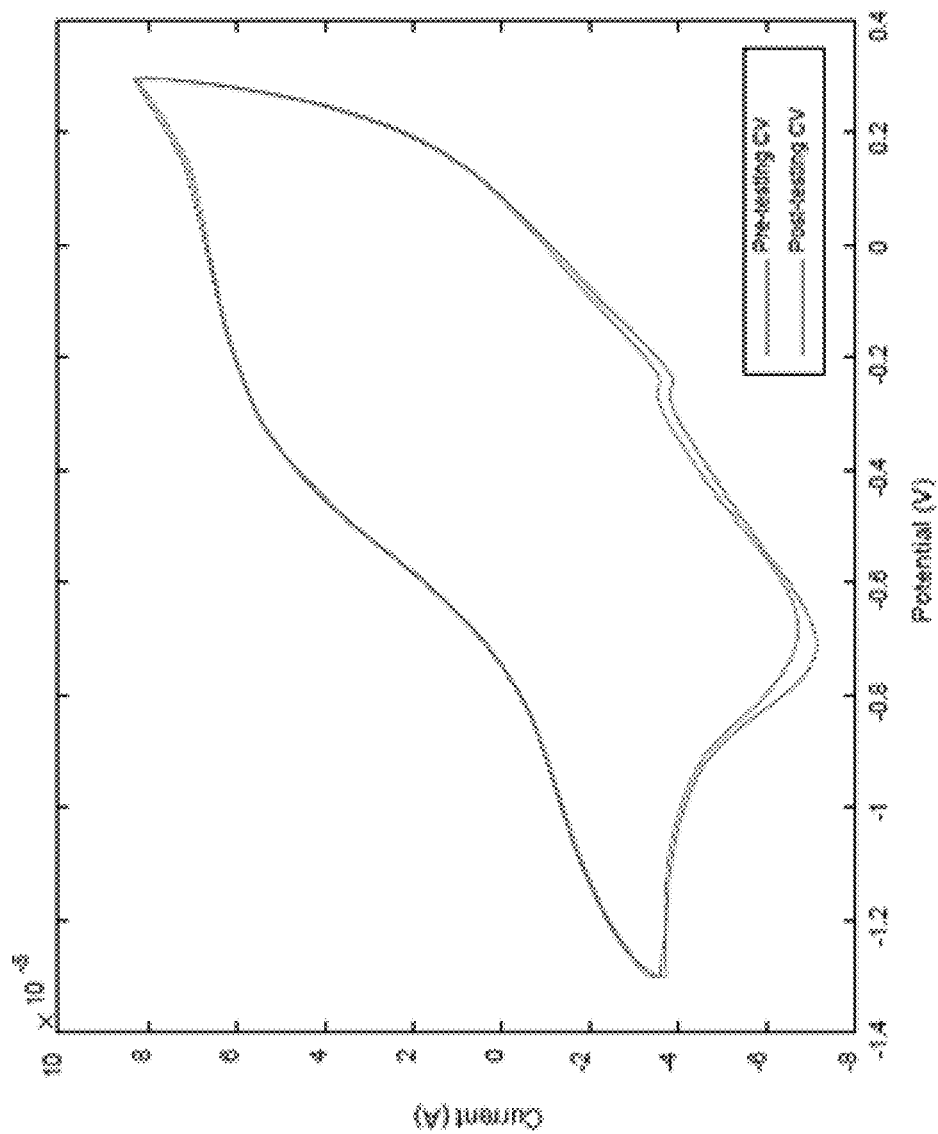
FIG. 11 is a cyclic voltammogram (CV) plot of the PPy(DBS) membrane of FIGS. 7-9 before and after testing.
Figure 12:
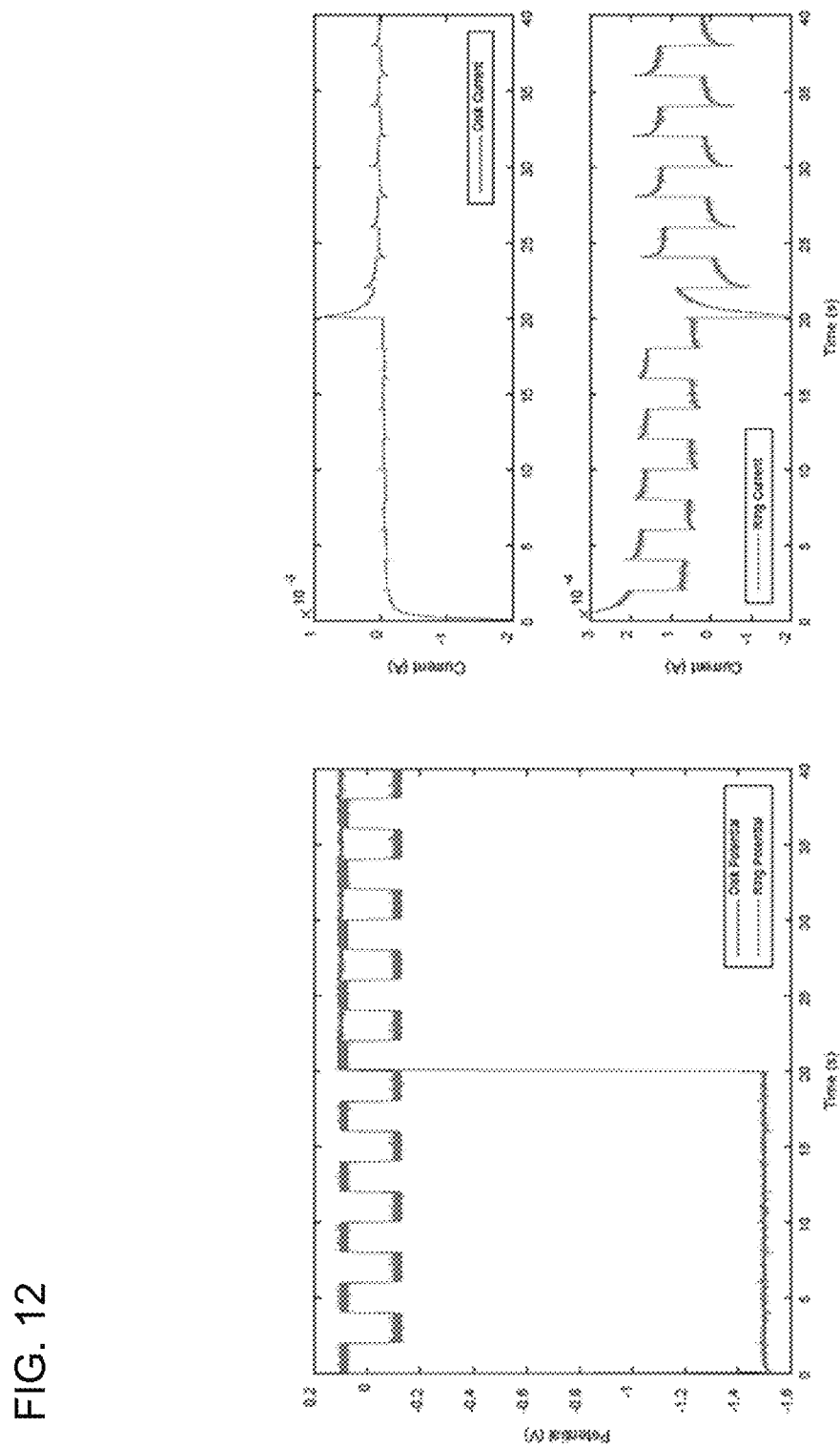
FIGS. 12-15 are plots of gating response of PPy(DBS) membrane of FIGS. 7-9 in 100 mM NaCl and subjected to a peak to peak voltage of 100 mV voltage at a frequency of 0.25 Hz (FIGS. 12-13) and 10 Hz (FIGS. 14-15).
Figure 13:
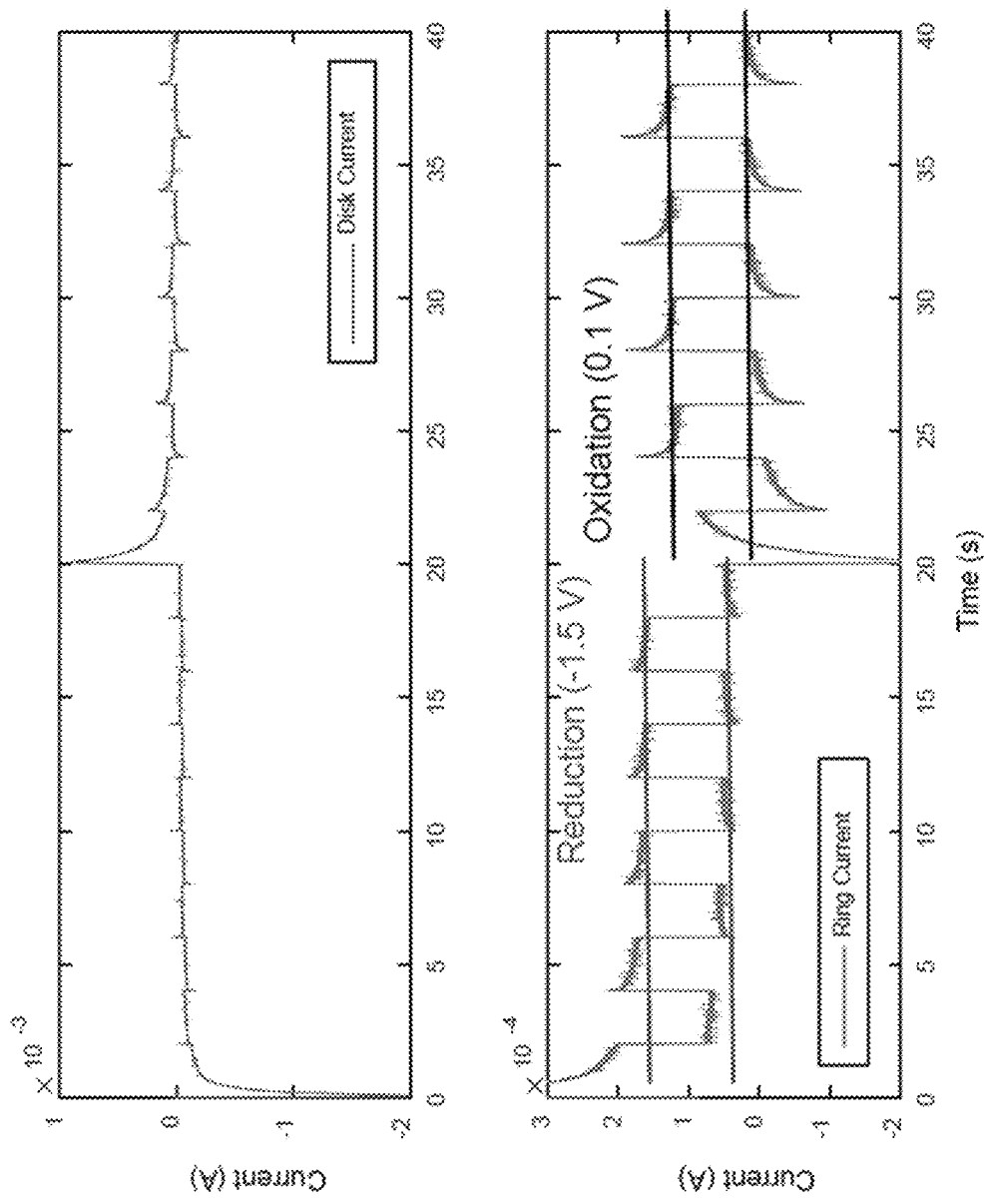

FIG. 10 are scanning electron micrograph (SEM) images of the PPy(DBS) membrane of FIGS. 7-9 at various magnifications. FIG. 11 is a cyclic voltammogram (CV) plot of the PPy(DBS) membrane of FIGS. 7-10 before and after testing. The total charge in the PPy(DBS) membrane is 1.35 mC before testing (pre-testing) and is 1.30 mC after testing demonstrating that the total charge in the PPy(DBS) membrane does not change significantly after testing or operation.

Figure 14:
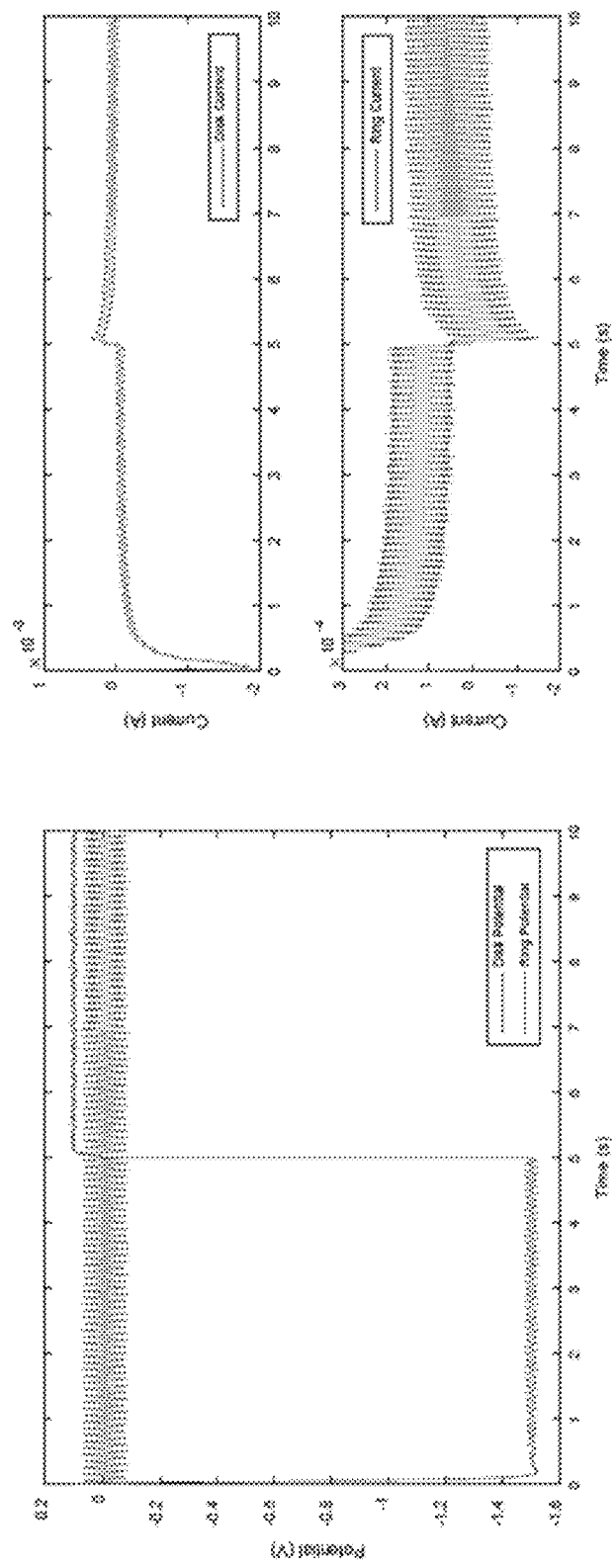
Figure 15:
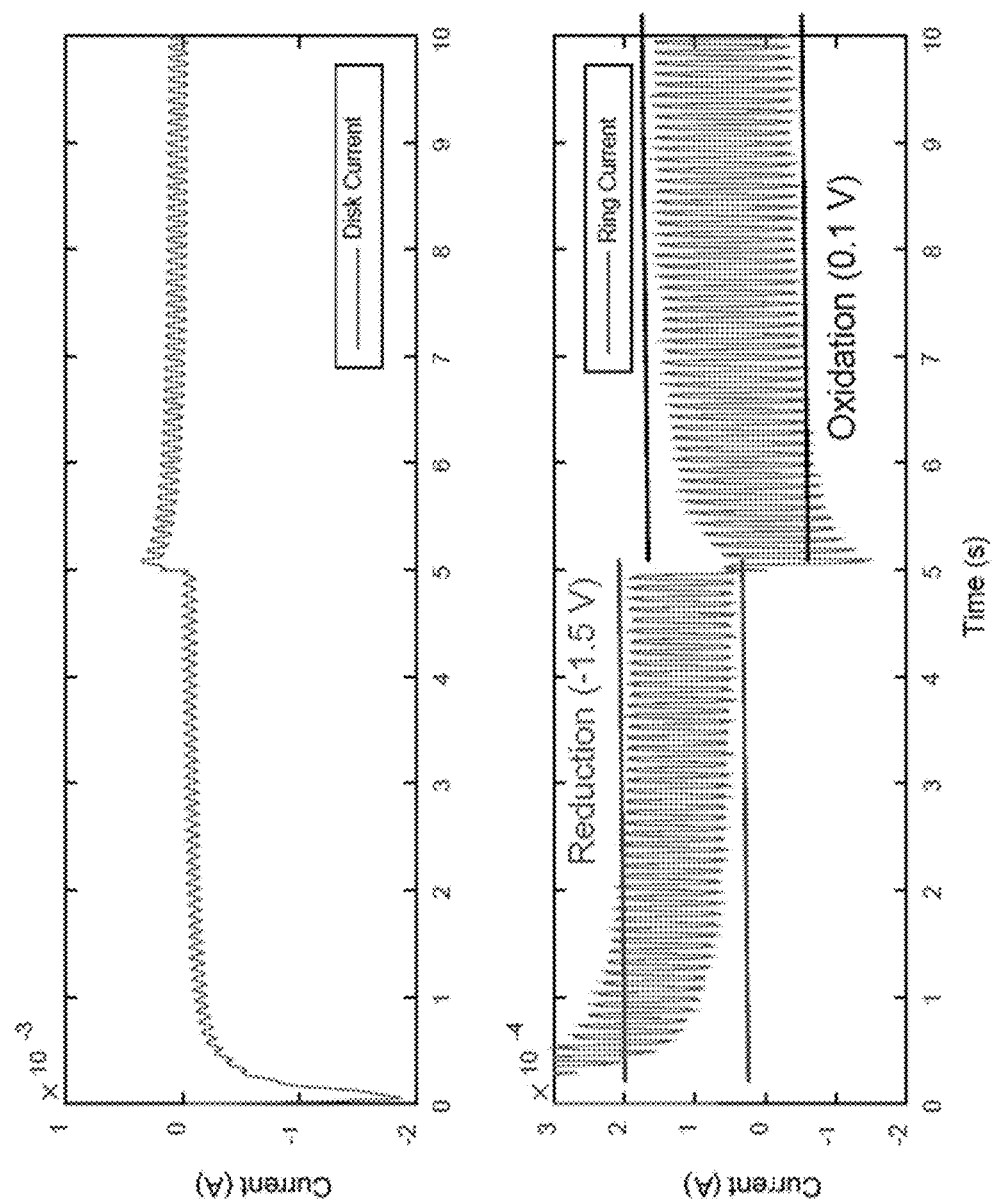

FIGS. 12-15 are plots of gating response of PPy(DBS) membrane of FIGS. 7-9 in 100 mM NaCl and subjected to a peak to peak voltage of 100 mV voltage at a frequency of 0.25 Hz (FIGS. 12-13) and 10 Hz (FIGS. 14-15). The potential of the PPy(DBS) membrane (disk potential) is varied from −1.5 V which is the reducing potential to 0.1 V corresponding to the oxidation potential of the PPy(DBS) membrane. At the 0.25 Hz frequency (FIGS. 12-13), the peak-to-peak transmembrane current of the reduced PPy(DBS) membrane (ring current) is 111.4 µA which decreases to a peak-to-peak transmembrane current of 107.7 µA for the oxidized PPy(DBS) membrane, so that an overall difference in peak-to-peak transmembrane current between reduced and oxidized states is 3.7 µA. In contrast, at the 10 Hz frequency, the peak-to-peak transmembrane current of the reduced PPy(DBS) membrane (ring current) is 136.6 µA which increases to a peak-to-peak transmembrane current of 186.2 µA for the oxidized PPy(DBS) membrane, so that an overall difference in peak-to-peak transmembrane current between reduced and oxidized states is −49.6 µA.

Figure 16:
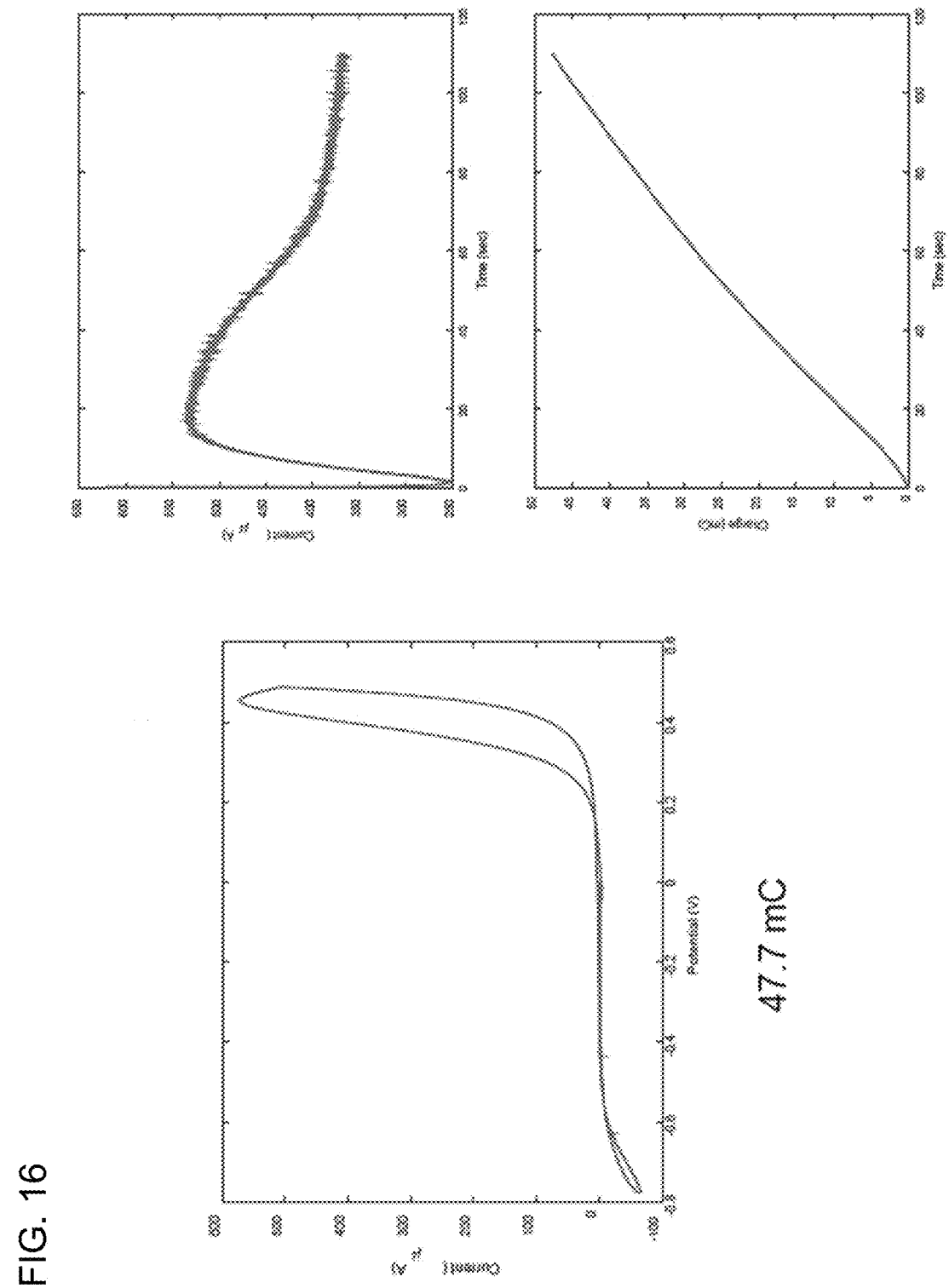
FIGS. 16-17 are plots of electrochemical deposition of a PPy(DBS) CP on a membrane substrate to form a PPy(DBS) membrane having an areal density of 0.15 $C/cm^2$ (FIG. 16) and conditioning of the PPy(DBS) membrane in NaCl (FIG. 17).
Figure 17:
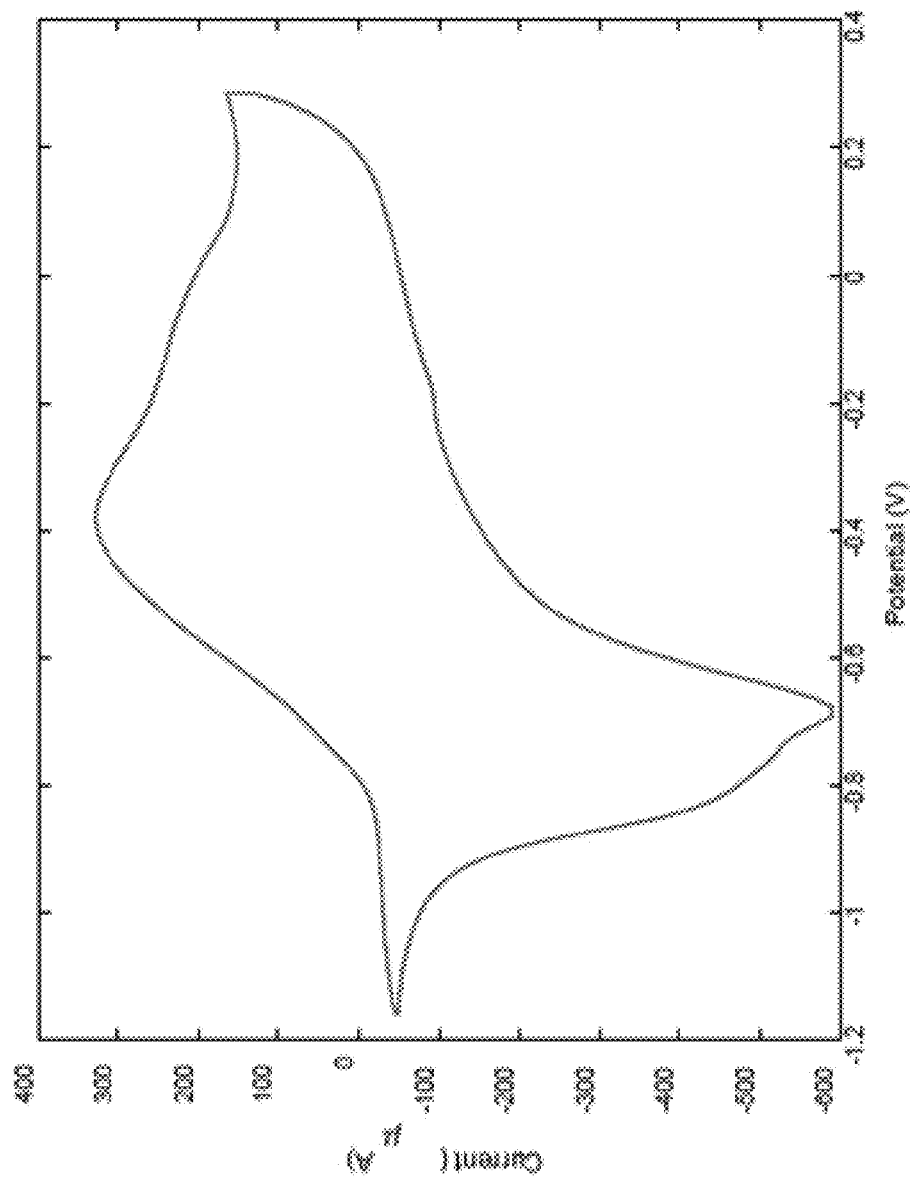
Figure 18:
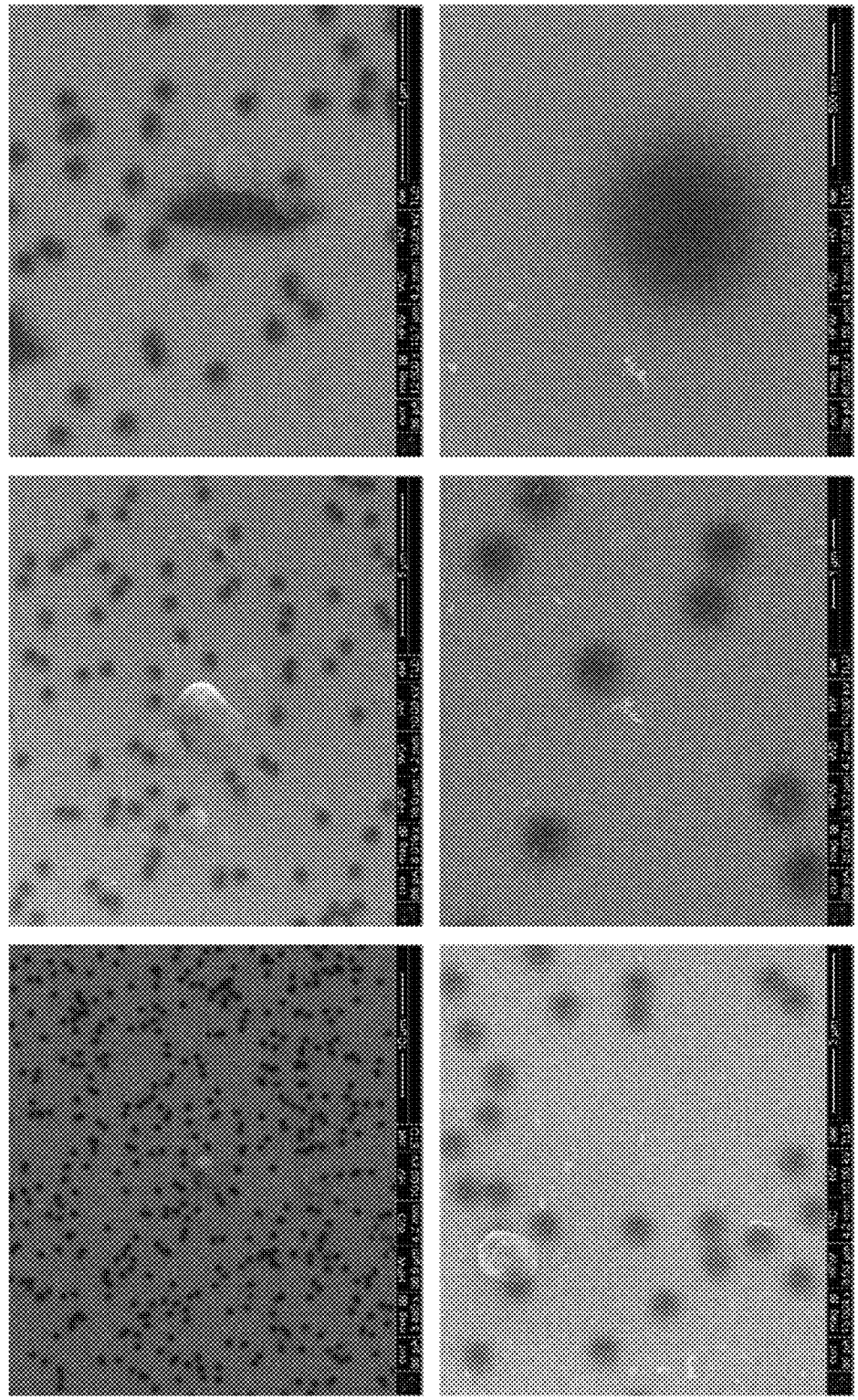
FIG. 18 are (SEM) images of the PPy(DBS) membrane of FIGS. 16-17 at various magnifications.

FIGS. 16-17 are plots of electrochemical deposition of a PPy(DBS) CP on a membrane substrate to form a PPy(DBS) membrane having an areal density of 0.15 $C/cm^2$ (FIG. 16) and conditioning of the PPy(DBS) membrane in NaCl (FIG. 17). CV between +0.4 V and −0.8 V is performed on the membrane substrate as described before to determine the necessary applied potential to initiate PPy(DBS) growth. CA at an appropriate potential such as 0.45 V is used to potentiostatically electropolymerize PPy(DBS) CP on the gold layer of the membrane substrate to form the PPy(DBS) membrane, as shown in FIG. 16 (left) and the accumulated charge due to the electropolymerization process is monitored until the PPy(DBS) membrane has an areal density of 0.15 $C/cm^2$, at which point the CA process is ceased. FIG. 16 (top right) is a plot of the current and FIG. 16 (bottom right) is the charge developed in the PPy(DBS) membrane, which was about 47.7 mC. The 0.15 $C/cm^2$ areal density PPy(DBS) membrane is conditioned in NaCl by performing CV between 0.2 V and −1.2 V until the current response is redundant across multiple cycles (FIG. 17). FIG. 18 are SEM images of the PPy(DBS) membrane of FIGS. 16-17 at various magnifications.

Figure 19:
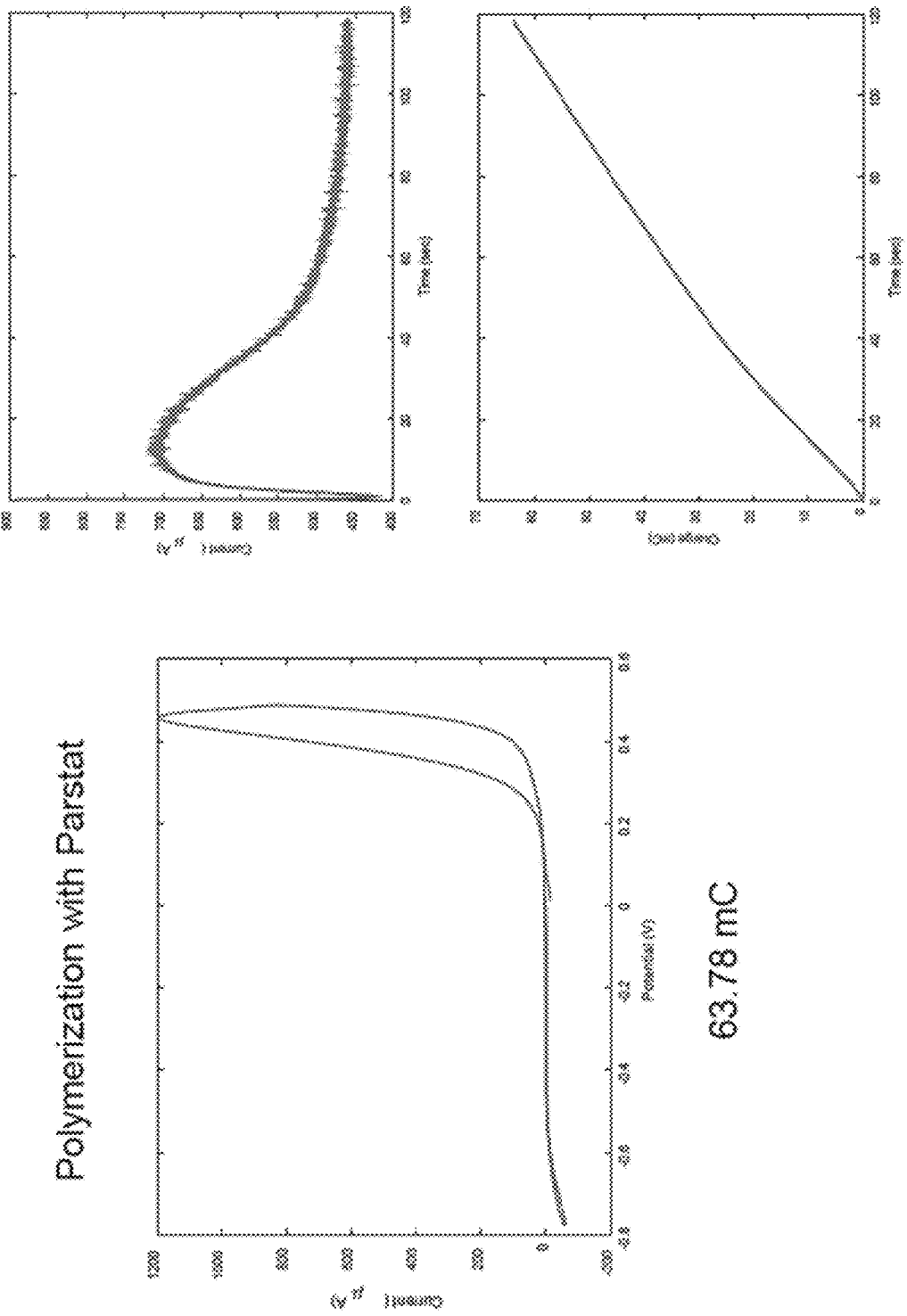
FIGS. 19-21 are plots of electrochemical deposition of a PPy(DBS) CP on a membrane substrate to form a PPy(DBS) membrane having an areal density of 0.2 $C/cm^2$ (FIG. 19), conditioning of the PPy(DBS) membrane in NaCl (FIG. 20) and impedance spectra of the PPy(DBS) membrane (FIG. 21).
Figure 20:
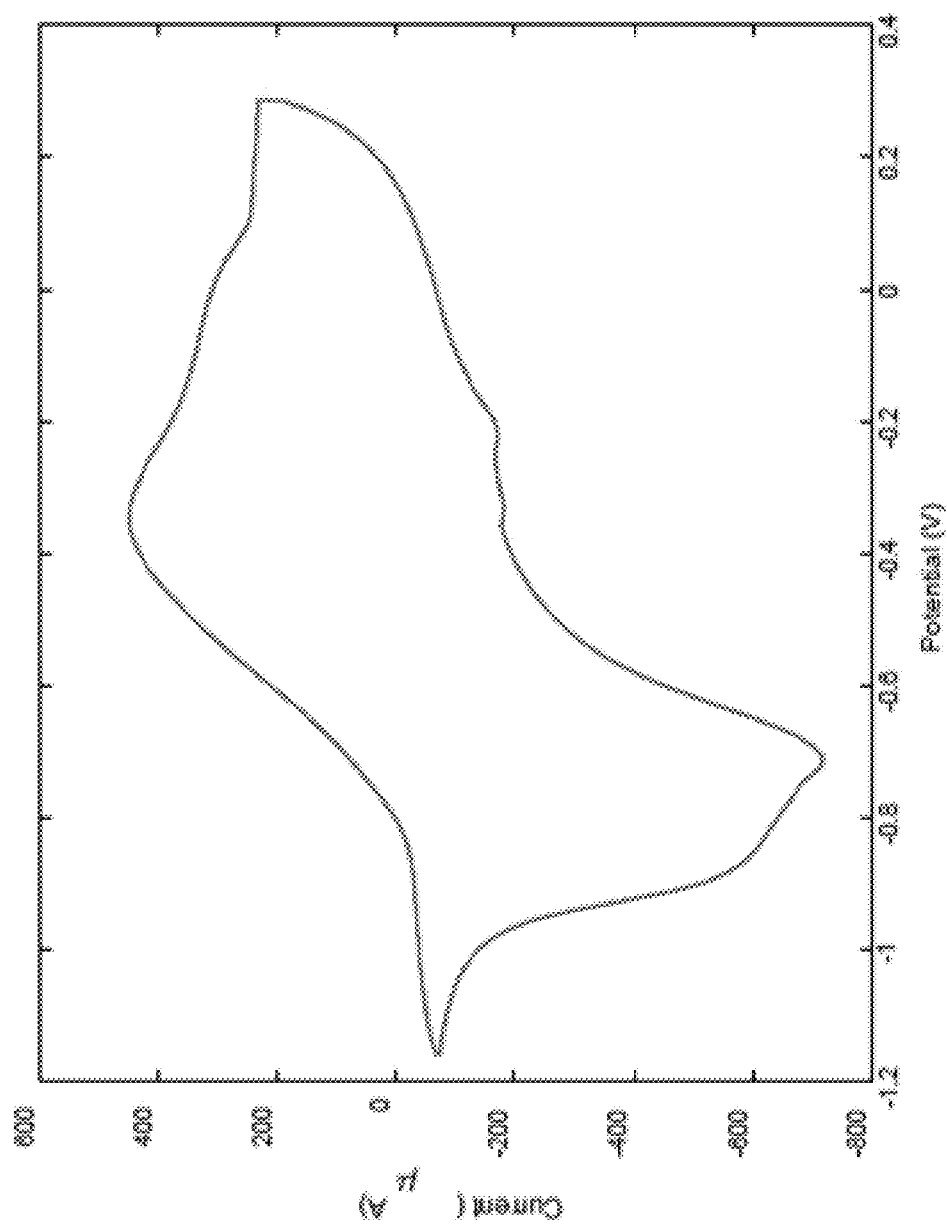
Figure 21:
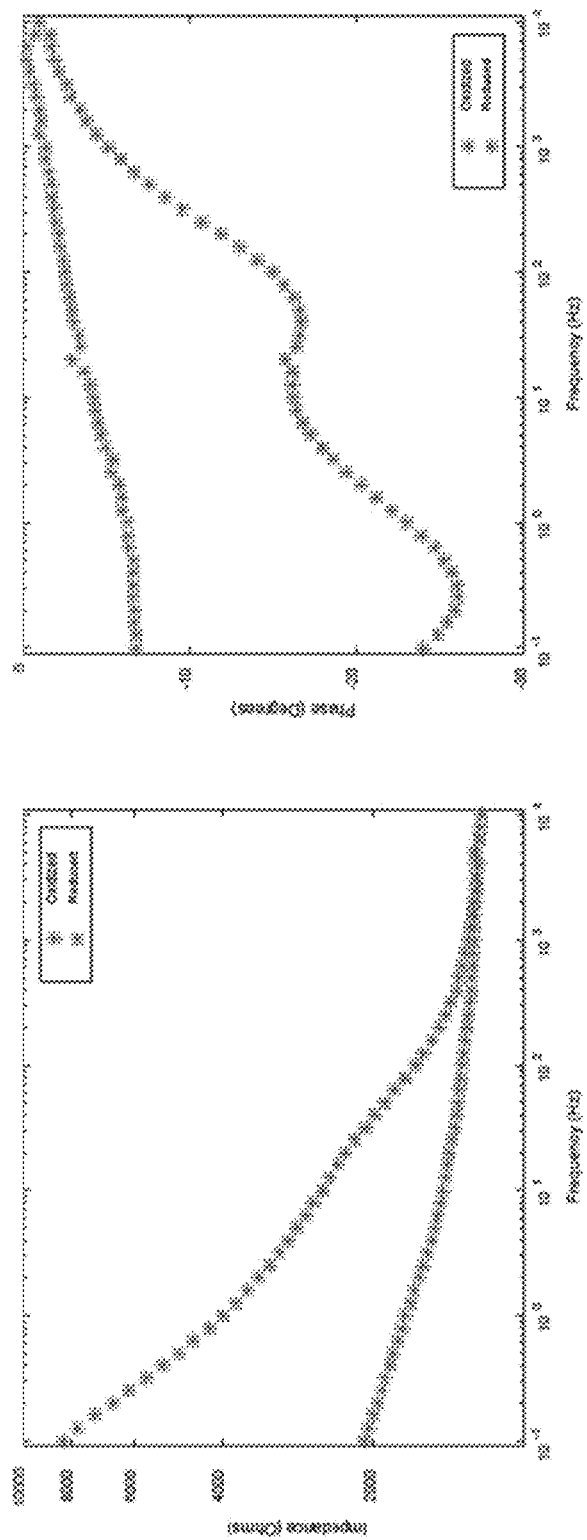

FIGS. 19-21 are plots of electrochemical deposition of a PPy(DBS) CP on a membrane substrate to form a PPy(DBS) membrane having an areal density of 0.2 $C/cm^2$ (FIG. 19), conditioning of the PPy(DBS) membrane in NaCl (FIG. 20) and impedance spectra of the PPy(DBS) membrane (FIG. 21). CV between +0.4 V and −0.8 V is performed on the membrane substrate as described before to determine the necessary applied potential to initiate PPy(DBS) growth. CA at an appropriate potential such as 0.45 V is used to potentiostatically electropolymerize PPy(DBS) CP on the gold layer of the membrane substrate to form the PPy(DBS) membrane, as shown in FIG. 19 (left) and the accumulated charge due to the electropolymerization process is monitored until the PPy(DBS) membrane has an areal density of 0.2 $C/cm^2$, at which point the CA process is ceased. FIG. 19 (top right) is a plot of the current and FIG. 20 (bottom right) is the charge developed in the PPy(DBS) membrane, which is about 63.78 mC. The 0.2 $C/cm^2$ areal density PPy(DBS) membrane is conditioned in NaCl by performing CV between 0.2 V and −1.2 V until the current response is redundant across multiple cycles (FIG. 20).

Figure 22:
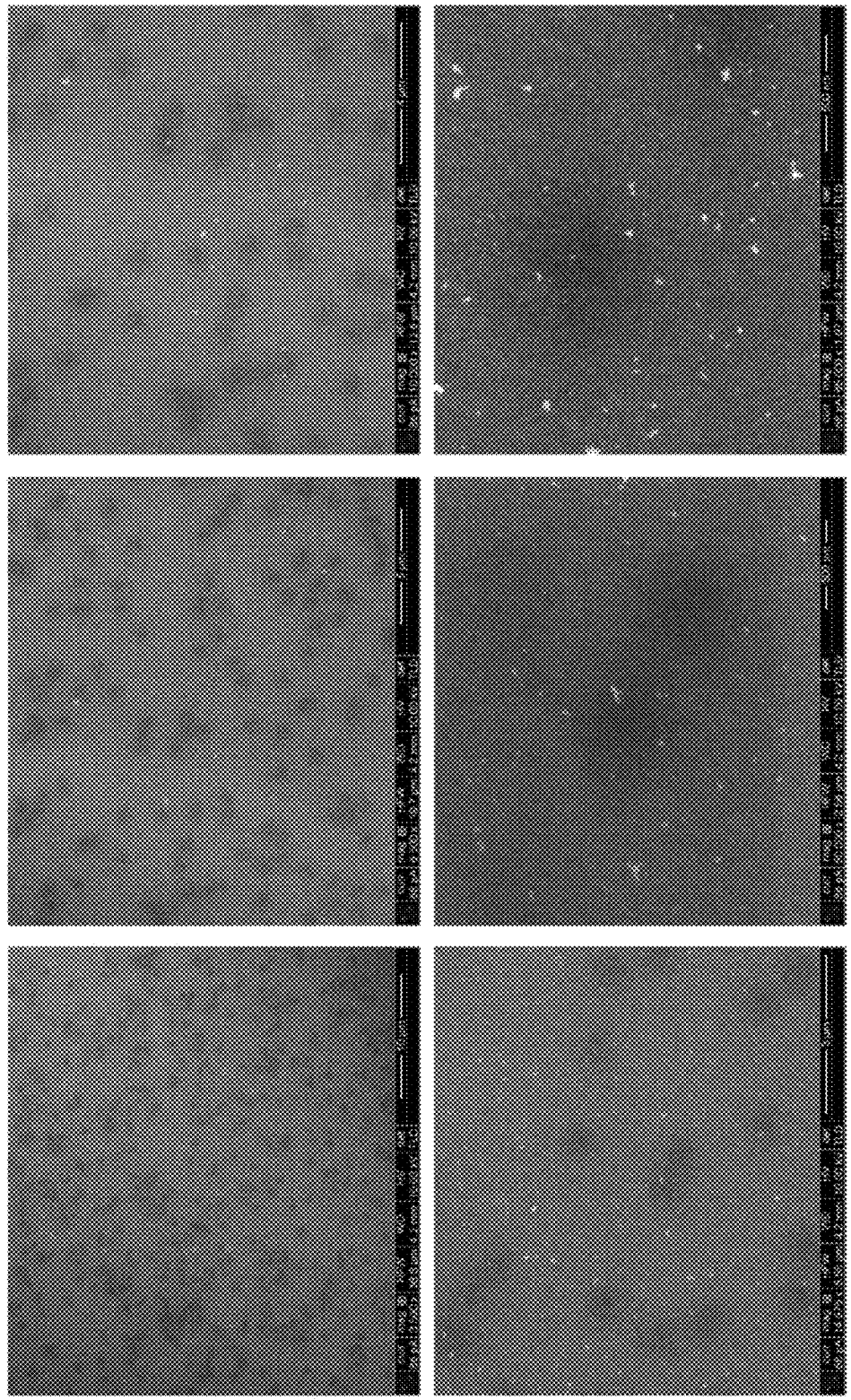
FIG. 22 are scanning electron micrograph (SEM) images of the PPy(DBS) membrane of FIGS. 19-21 at various magnifications.
Figure 23:
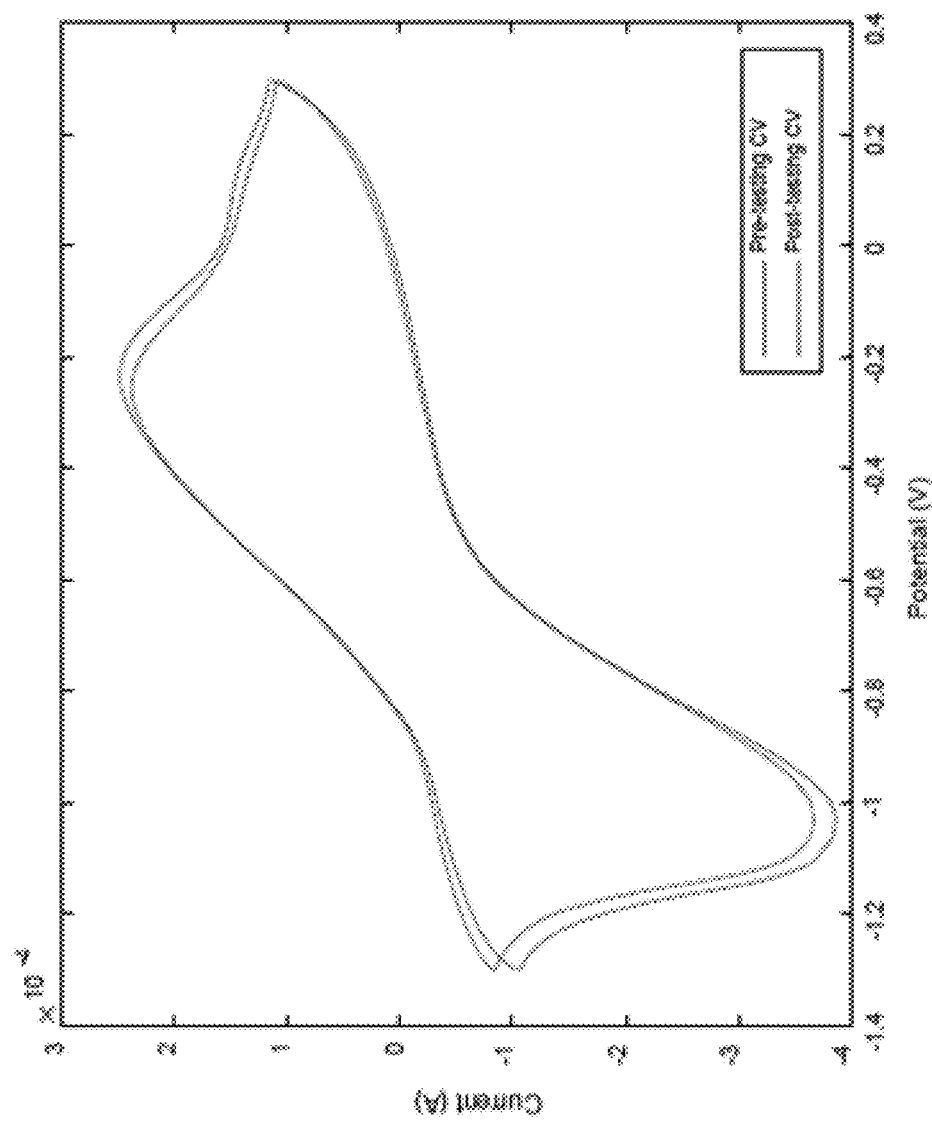
FIG. 23 is a CV plot of the PPy(DBS) membrane of FIGS. 7-9 before and after testing.

FIG. 21 is impedance vs frequency plot (left) and phase vs frequency plot (right) of the 0.2 $C/cm^2$ PPy(DBS) membrane during its reduced and oxidized state. FIG. 22 is (SEM) images of the PPy(DBS) membrane of FIGS. 19-21 at various magnifications. FIG. 23 is a CV plot of the PPy(DBS) membrane of FIGS. 7-9 before and after testing. The total charge in the PPy(DBS) membrane is about 4.22 mC before testing (pre-testing) and is about 3.89 mC after testing.

Figure 24:
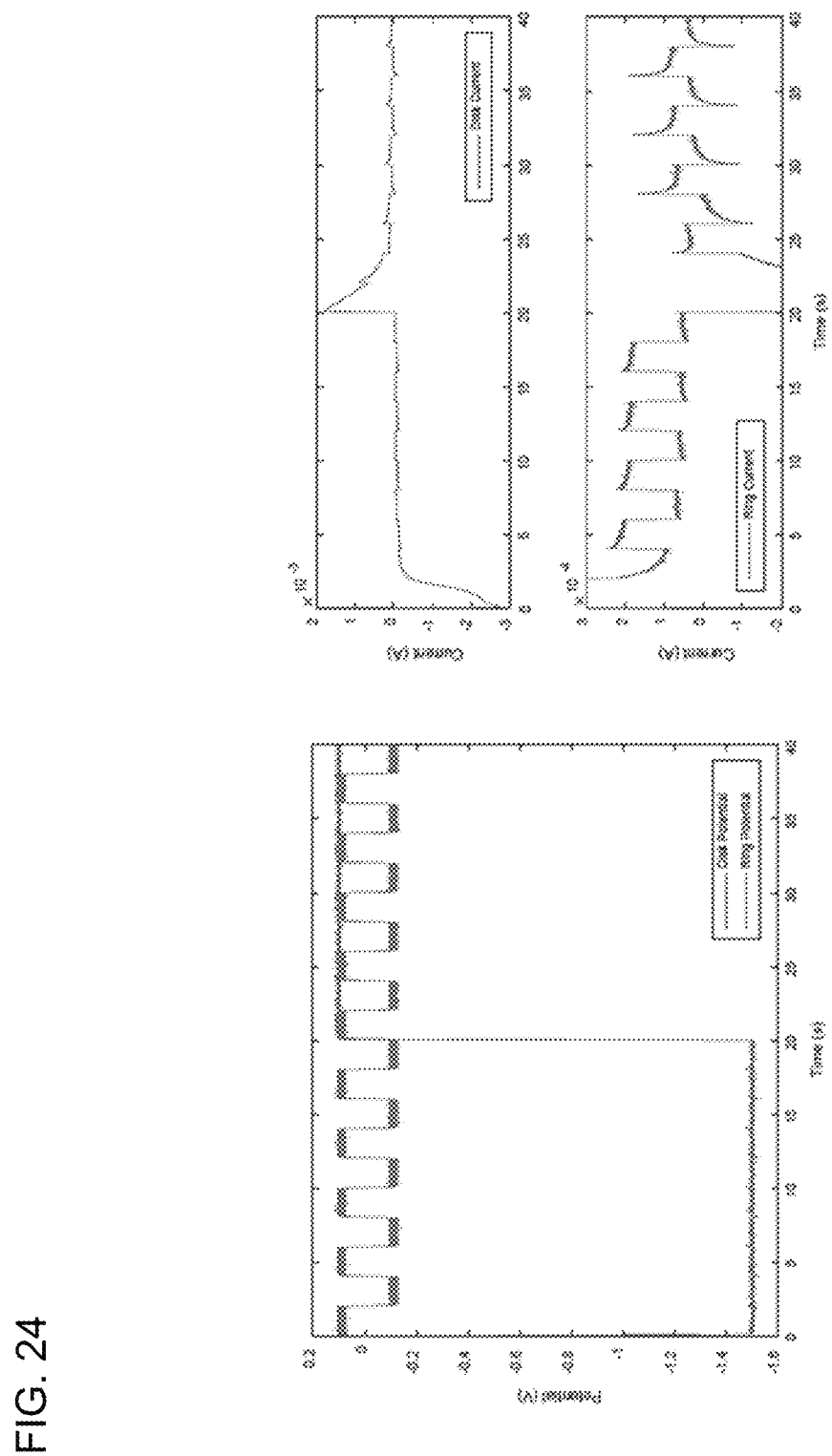
FIGS. 24-25 are plots of gating response of PPy(DBS) membrane of FIGS. 19-21 in 100 mM NaCl and subjected to a peak to peak voltage of 100 mV voltage at a frequency of 0.25 Hz (FIG. 24) and 10 Hz (FIG. 25).
Figure 25:
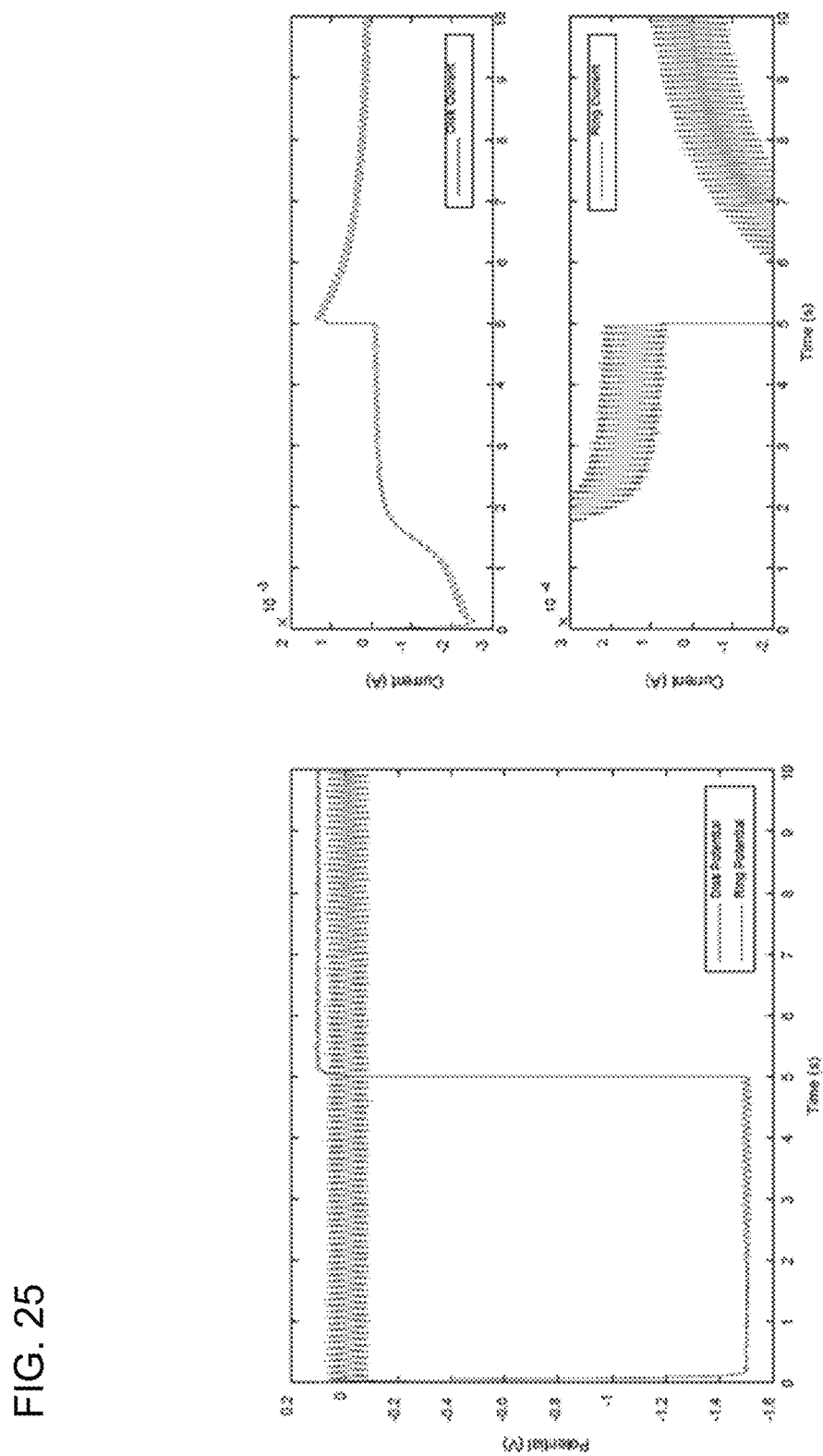

FIGS. 24-25 are plots of gating response of PPy(DBS) membrane of FIGS. 19-21 in 100 mM NaCl and subjected to a peak to peak voltage of 100 mV voltage at a frequency of 0.25 Hz (FIG. 24) and 10 Hz (FIG. 25). The potential of the PPy(DBS) membrane (disk potential) is varied from −1.5 V which is the reducing potential to +0.1 V corresponding to the oxidation potential of the PPy(DBS) membrane. At the 0.25 Hz frequency (FIG. 25), the peak-to-peak transmembrane current of the reduce PPy(DBS) membrane (ring current) is 128.5 µA which decreases to a peak-to-peak transmembrane current of 38.3 µA for the oxidized PPy (DBS) membrane, so that an overall difference in peak-to-peak transmembrane current between reduced and oxidized states is 90.2 µA. In contrast, at the 10 Hz frequency, the peak-to-peak transmembrane current of the reduced PPy (DBS) membrane (ring current) is 146.6 µA which increases to a peak-to-peak transmembrane current of 176 µA for the oxidized PPy(DBS) membrane, so that an overall difference in peak-to-peak transmembrane current between reduced and oxidized states is 29.4 µA.

Figure 26:
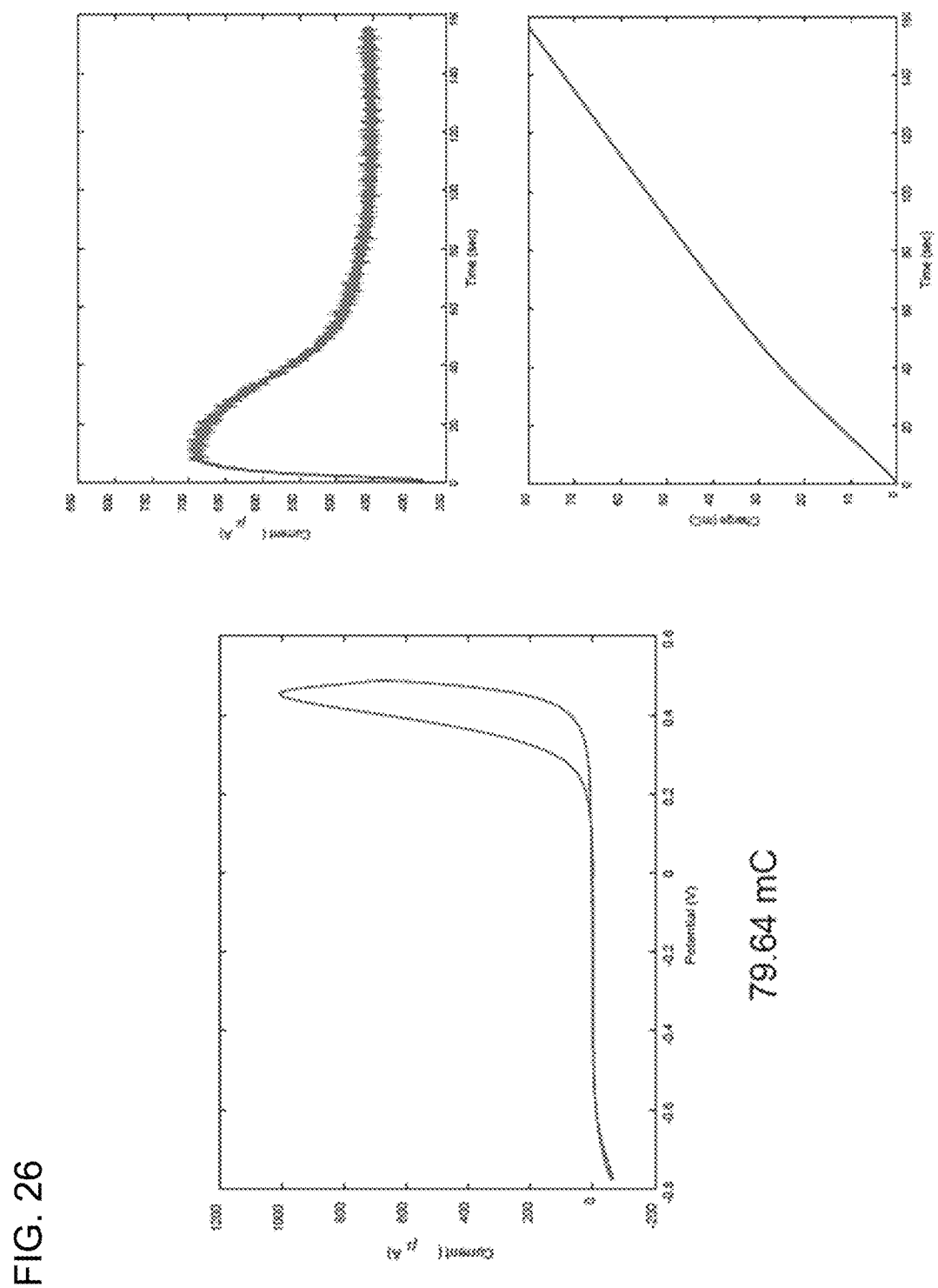
FIGS. 26-28 are plots of electrochemical deposition of a PPy(DBS) CP on a membrane substrate to form a PPy(DBS) membrane having an areal density of 0.25 $C/cm^2$ (FIG. 26), conditioning of the PPy(DBS) membrane in NaCl (FIG. 27) and impedance spectra of the PPy(DBS) membrane (FIG. 28).
Figure 27:
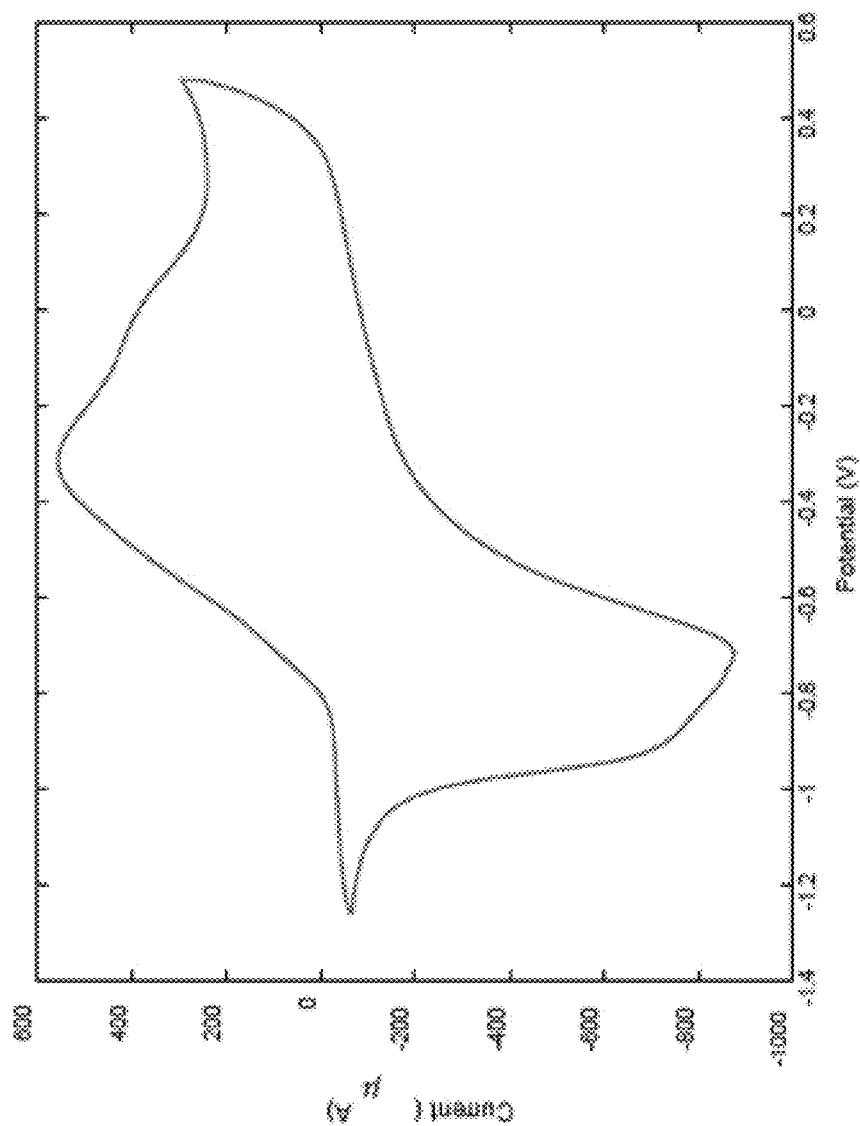
Figure 28:
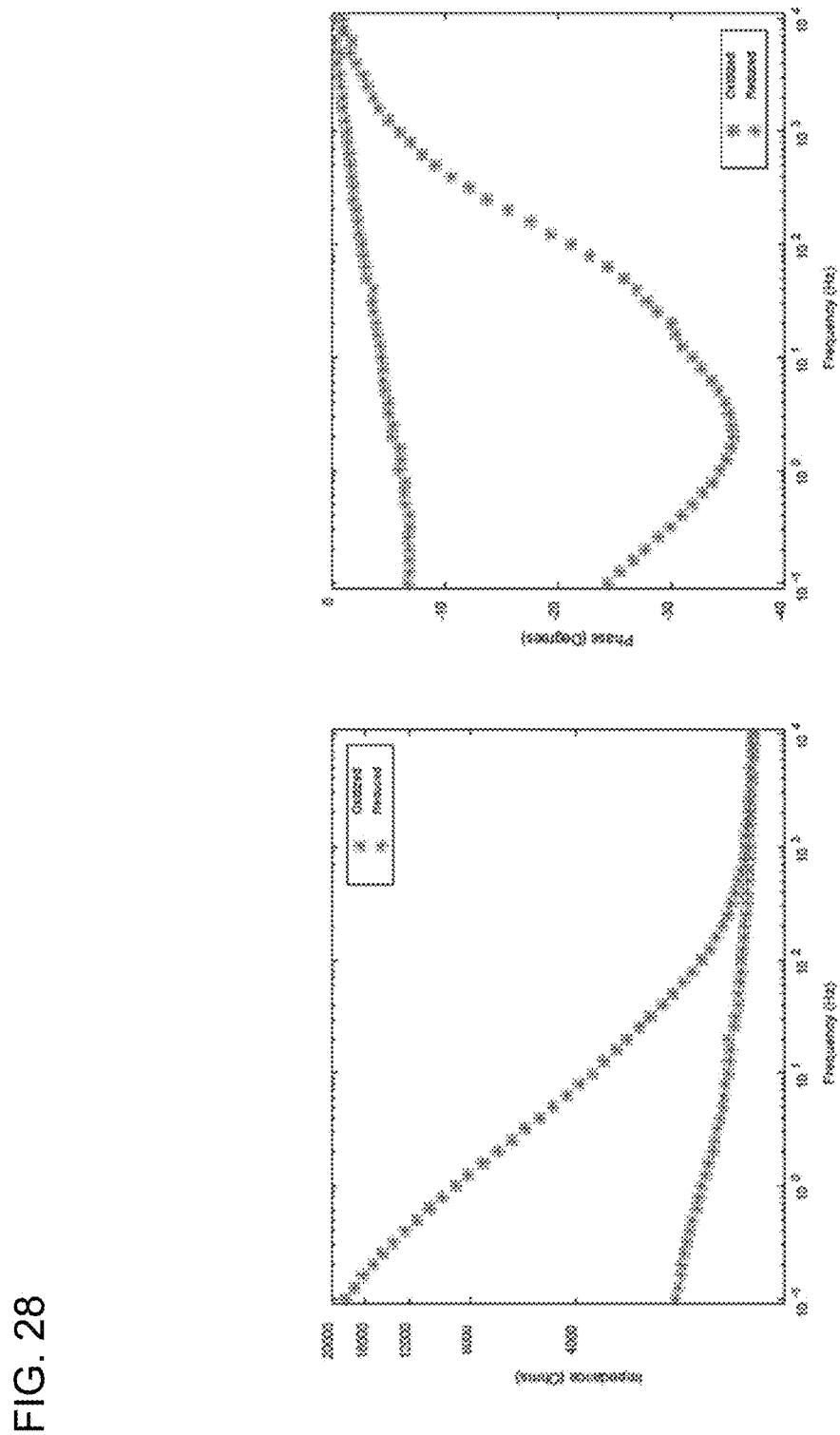

FIGS. 26-28 are plots of electrochemical deposition of a PPy(DBS) CP on a membrane substrate to form a PPy(DBS) membrane having an areal density of 0.25 $C/cm^2$ (FIG. 26), conditioning of the PPy(DBS) membrane in NaCl (FIG. 27) and impedance spectra of the PPy(DBS) membrane (FIG. 28). CV between +0.4 V and −0.8 V is performed on the membrane substrate as described to determine the necessary applied potential to initiate PPy(DBS) growth. CA at an appropriate potential such as 0.45 V is used to potentiostatically electropolymerize PPy(DBS) CP on the gold layer of the membrane substrate to form the PPy(DBS) membrane, as shown in FIG. 26 (left) and the accumulated charge due to the electropolymerization process is monitored until the PPy(DBS) membrane has an areal density of 0.25 $C/cm^2$, at which point the CA process is ceased. FIG. 19 (top right) is a plot of the current and FIG. 20 (bottom right) is the charge developed in the PPy(DBS) membrane, which was about 79.64 mC. The 0.25 $C/cm^2$ areal density PPy(DBS) membrane is conditioned in NaCl by performing CV between 0.2 V and −1.2 V until the current response is redundant across multiple cycles (FIG. 27).

Figure 29:
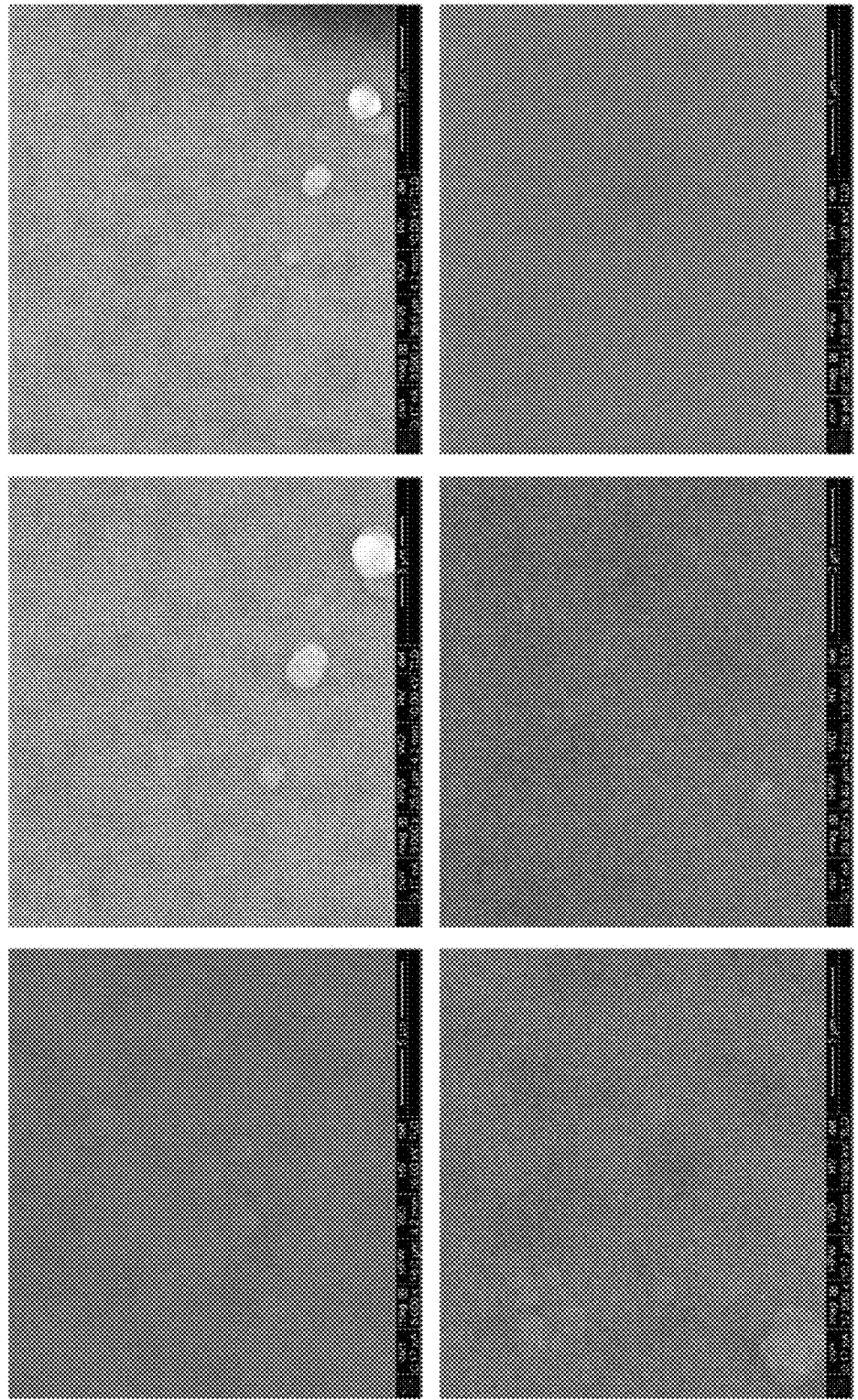
FIG. 29 are scanning electron micrograph (SEM) images of the PPy(DBS) membrane of FIGS. 26-28 at various magnifications.
Figure 30:
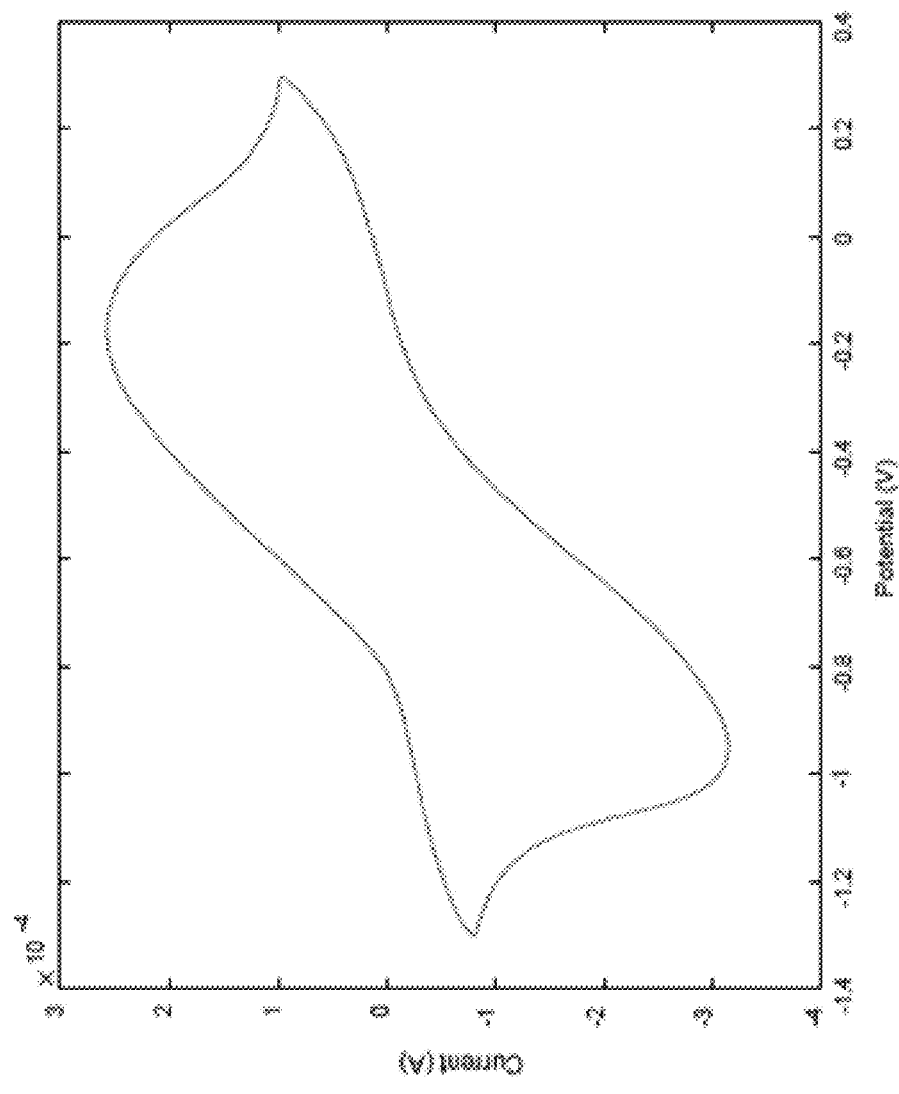
FIG. 30 is a CV plot of the PPy(DBS) membrane of FIGS. 26-28.

FIG. 28 is impedance vs frequency (left) and phase vs frequency (right) of the 0.2 $C/cm^2$ PPy(DBS) membrane during its reduced and oxidized state. FIG. 29 is (SEM) images of the PPy(DBS) membrane of FIGS. 26-28 at various magnifications. FIG. 30 is a CV plot of the PPy (DBS) membrane of FIGS. 26-28 before testing. The 0.25 $C/cm^2$ PPy(DBS) membrane has a charge of about 4.06 mC.

Figure 31:
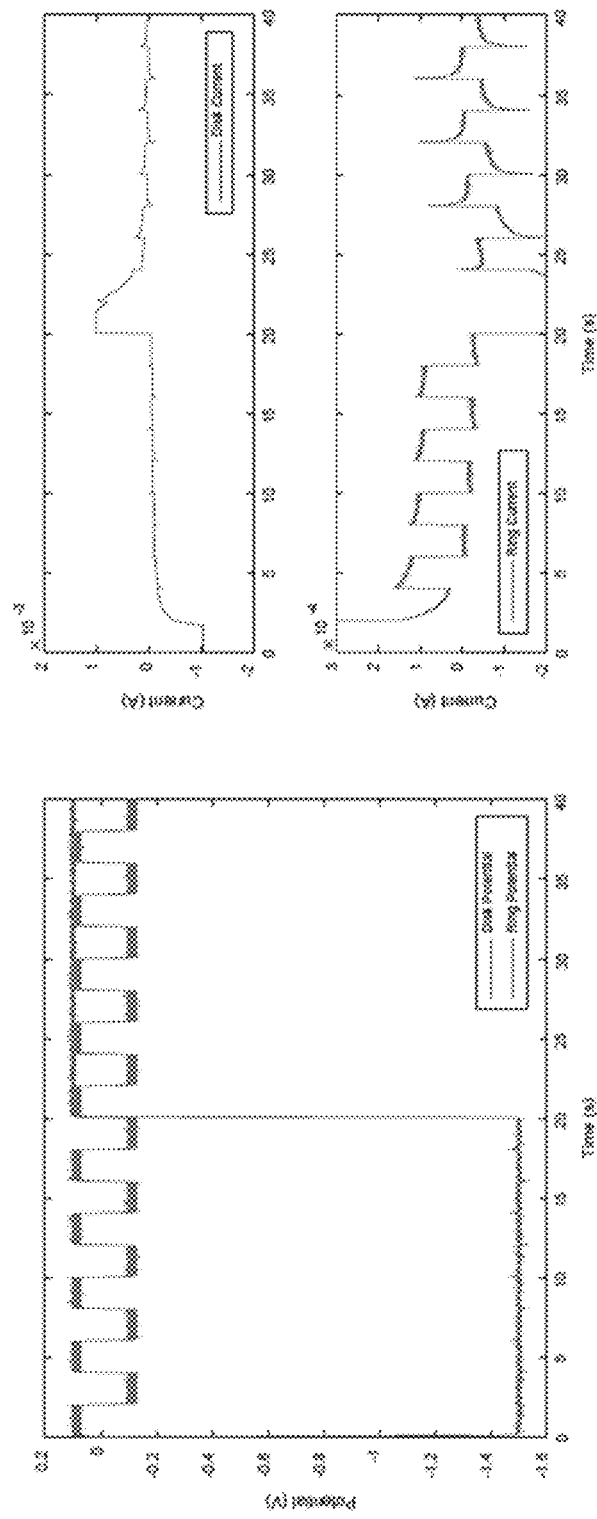
FIGS. 31-32 are plots of gating response of PPy(DBS) membrane of FIGS. 26-28 in 100 mM NaCl and subjected to a peak to peak voltage of 100 mV voltage at a frequency of 0.25 Hz (FIG. 31) and 10 Hz (FIG. 32).
Figure 32:
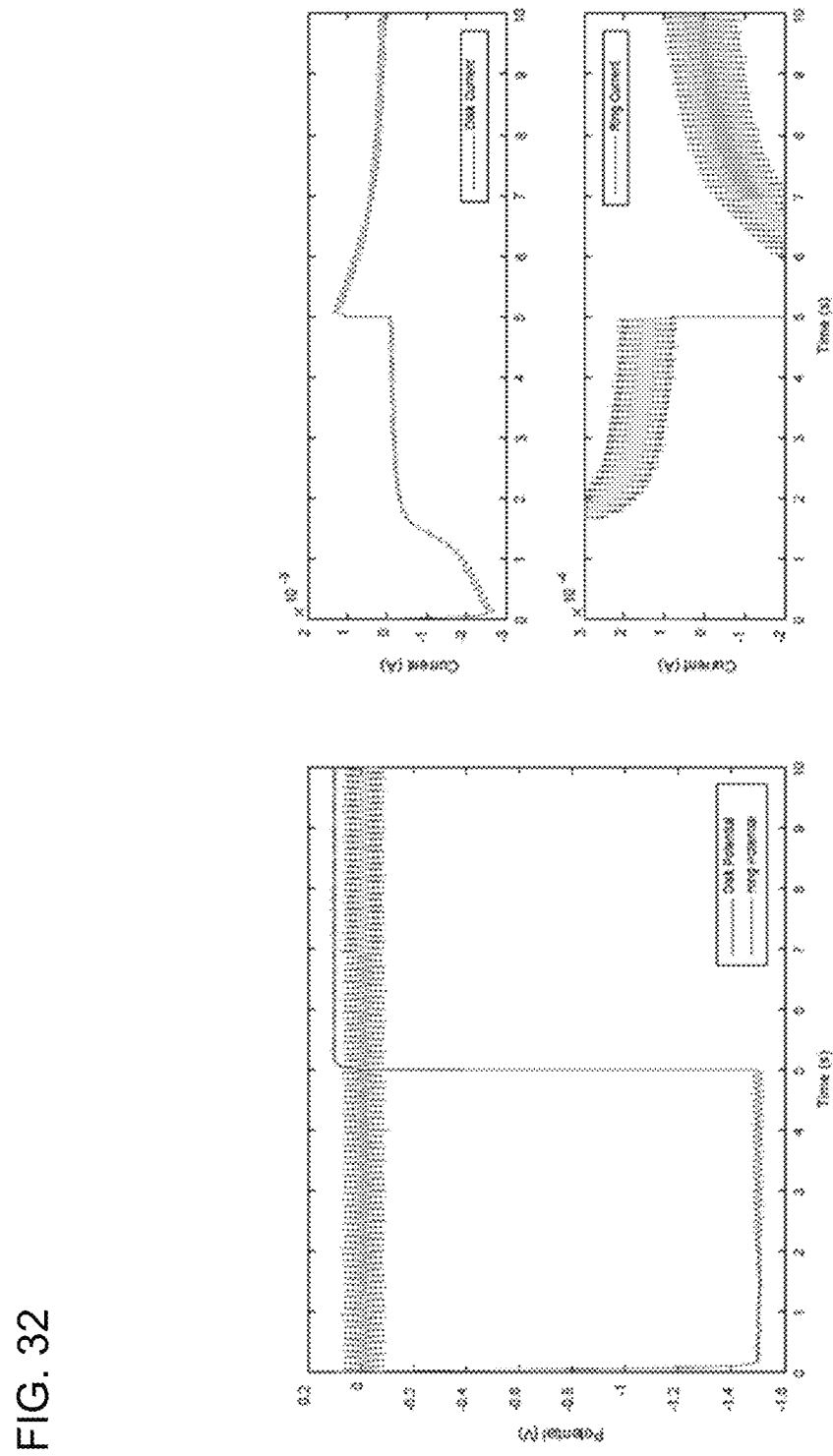

FIGS. 31-32 are plots of gating response of PPy(DBS) membrane of FIGS. 26-28 in 100 mM NaCl and subjected to a peak to peak voltage of 100 mV voltage at a frequency of 0.25 Hz (FIG. 31) and 10 Hz (FIG. 32). The potential of the PPy(DBS) membrane (disk potential) is varied from −1.5 V which is the reducing potential to +0.1 V corresponding to the oxidation potential of the PPy(DBS) membrane. At the 0.25 Hz frequency (FIG. 25), the peak-to-peak transmembrane current of the reduced PPy(DBS) membrane (ring current) is 114.5 µA which decreases to a peak-to-peak transmembrane current of 36.1 µA for the oxidized PPy (DBS) membrane, so that an overall difference in peak-to-peak transmembrane current between reduced and oxidized states is 78.4 µA. In contrast, at the 10 Hz frequency, the peak-to-peak transmembrane of the reduced PPy(DBS) membrane (ring current) is 132.3 µA which increases to a peak-to-peak transmembrane current of 173.3 µA for the oxidized PPy(DBS) membrane, so that an overall difference in peak-to-peak transmembrane current between reduced and oxidized states is 41 µA.

Figure 33:
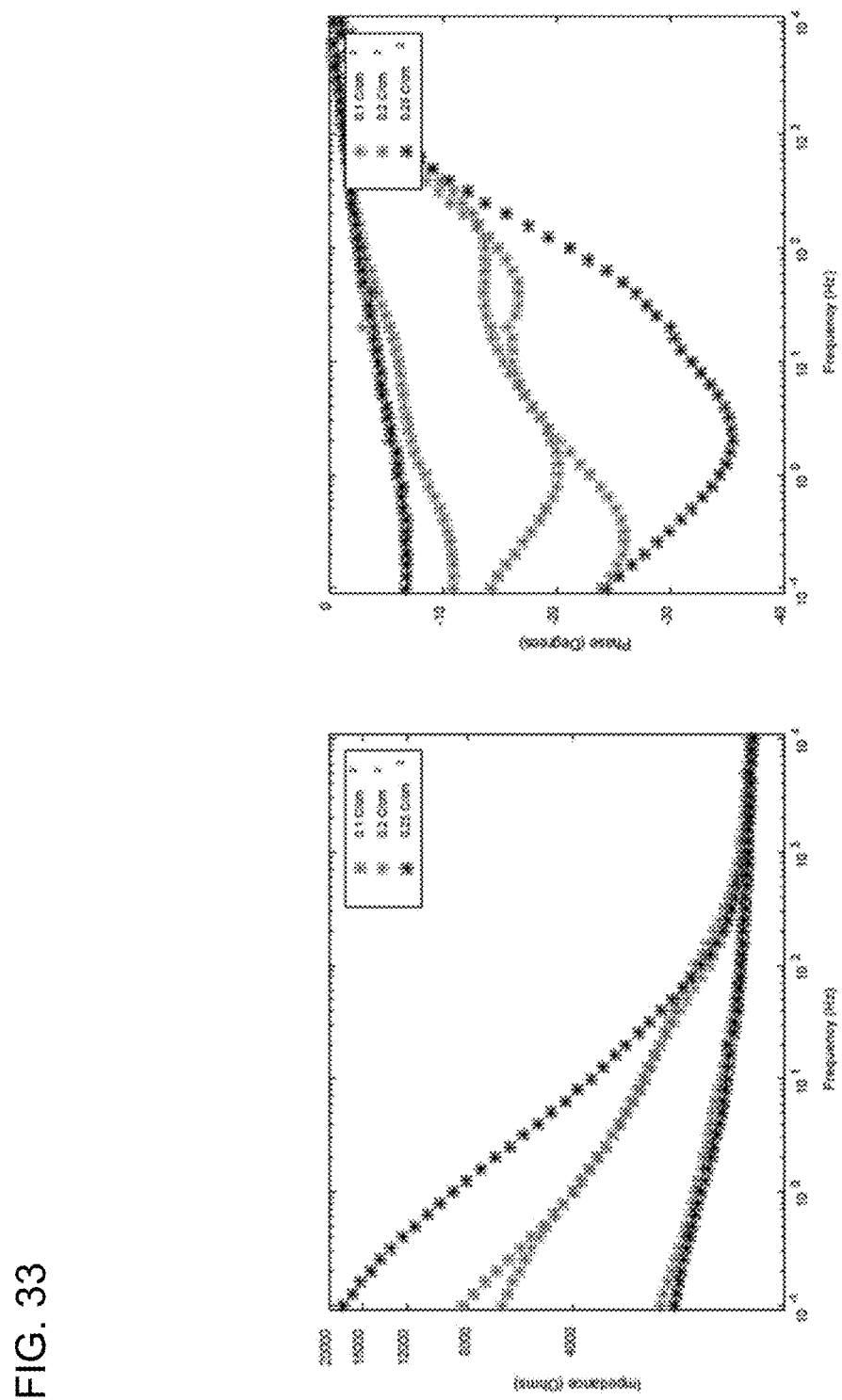
FIG. 33 are comparative plots of the impedance vs frequency (left) and phase vs frequency (right) of the PPy (DBS) membranes having areal density densities of 0.1 $C/cm^2$, 0.2 $C/cm^2$ and 0.25 $C/cm^2$.
Figure 34:
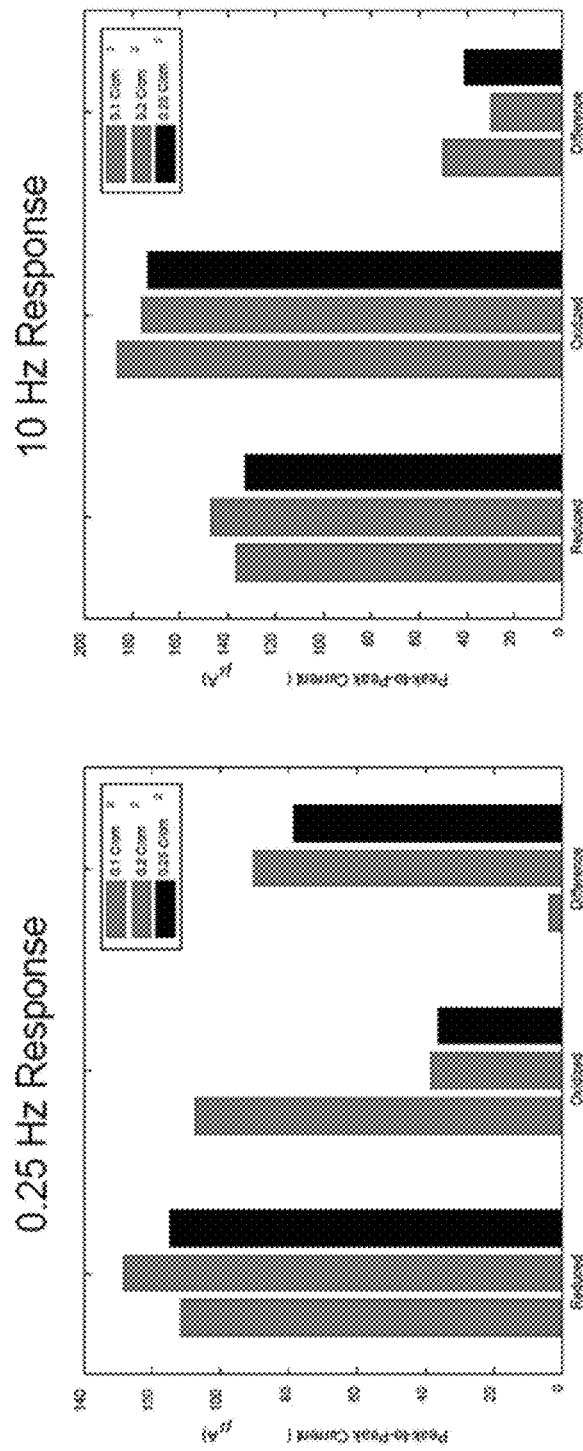
FIG. 34 are plots of gating response of the PPy(DBS) membranes having areal density densities of 0.1 $C/cm^2$, 0.2 $C/cm^2$ and 0.25 $C/cm^2$ at 0.25 Hz (left) and 10 Hz (right).

FIG. 33 is comparative plots of the impedance vs frequency (left) and phase vs frequency (right) of the PPy (DBS) membranes having areal density densities of 0.1 $C/cm^2$, 0.2 $C/cm^2$ and 0.25 $C/cm^2$. FIG. 34 is comparative plots of gating response of the PPy(DBS) membranes having areal density densities of 0.1 C/cm$^2$, 0.2 C/cm$^2$ and 0.25 C/cm$^2$ at 0.25 Hz (left) and 10 Hz (right). The largest difference in impedance at the 0.25 Hz frequency is observed for the 0.2 C/cm$^2$ areal density PPy(DBS) membrane, while the largest difference in impedance at the 10 Hz frequency is observed for the 0.1 C/cm$^2$ areal density PPy (DBS) membrane. Table I summarizes the gating response of the various areal density PPy(DBS) membranes at 0.25 Hz and 10 Hz.

TABLE I

Gating response of various areal density PPy(DBS) membranes at 0.25 Hz and 10 Hz.

| | 0.1 C/cm$^2$ | 0.2 C/cm$^2$ | 0.25 C/cm$^2$ |
|---|---|---|---|
| 0.25 Hz Square Wave, 100 mV Amplitude; Peak-to-Peak Current Response (μA) | | | |
| Reduced | 111.4 | 128.5 | 114.5 |
| Oxidized | 107.7 | 38.3 | 36.1 |
| Difference | 3.7 | 90.2 | 78.4 |
| 10 Hz Square Wave, 100 mV Amplitude; Peak-to-Peak Current Response (μA) | | | |
| Reduced | 136.6 | 146.6 | 132.3 |
| Oxidized | 186.2 | 176 | 173.3 |
| Difference | 49.6 | 29.4 | 41 |

PPy(DBS) Membrane Ion-Transport Control

FIG. 35A is an optical image of a separator that can be used for controlling ion transport therethrough and includes a membrane substrate coated with a gold and a PPy(DBS) CP to form a PPy(DBS) separator. The separator is formed using substantially the same process as used for forming the PPy(DBS) membranes described in the previous section, and includes PCTE membrane substrate coated with gold which is electroplated with the PPy(DBS) CP. A silver wire is used to provide electronic communication to a potentiostat for controlling the voltage applied across the PPy(DBS) separator. Various areal density PPy(DBS) separators are prepared having areal density densities ranging from 0.05-0.4 C/cm$^2$.

FIG. 35B is an optical image of an experimental setup for testing and controlling the ion-transport through the PPy (DBS) separator. The setup includes a source chamber, a drain chamber and a separator chamber formed in a Teflon block. 100 mM NaCl is contained within the source chamber and the drain chamber, and the PPy(DBS) separator positioned therebetween. FIG. 35C is a schematic illustration of the experimental device. A working electrode (WE) which serves as the source (s) and includes a disc.

Figure 36:
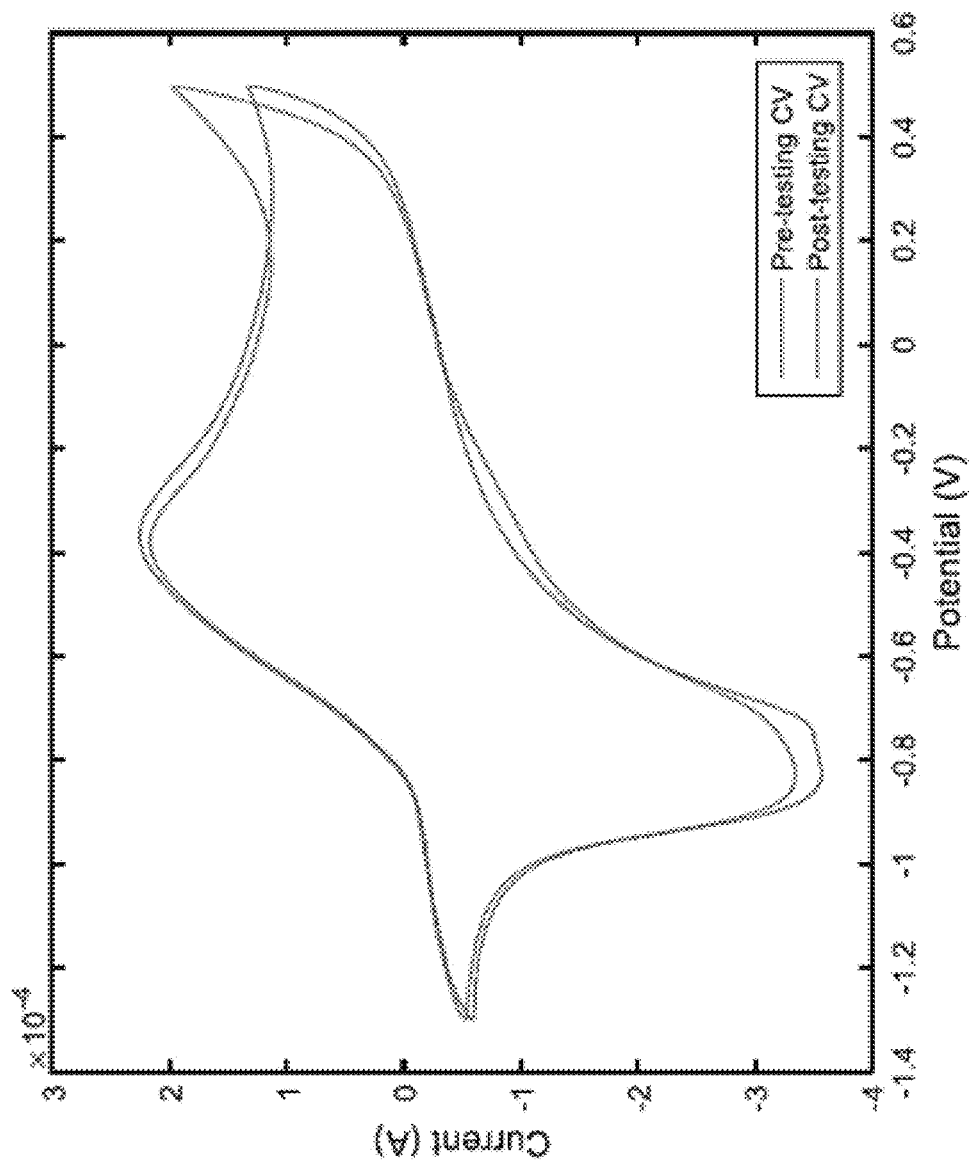
FIG. 36 is a CV plot of a separator that includes a 0.15 C/cm$^2$ areal density PPy(DBS) membrane positioned thereon before and after testing.

Drain-to-source response testing of a 0.15 C/cm$^2$ areal density is performed by applying a redox potential to the PPy(DBS) separator varying the potential from 0 to −1.0 V at 40 second intervals. A drain to source square wave at a potential of 100 mV is applied for an 8 second period at a frequency of 125 mHz. FIG. 36 is a CV plot of a 0.15 C/cm$^2$ areal density PPy(DBS) separator before and after testing. The CV scan is performed between −1.3 to 0.5 V at a 50 mV/sec scan rate.

Figure 37:
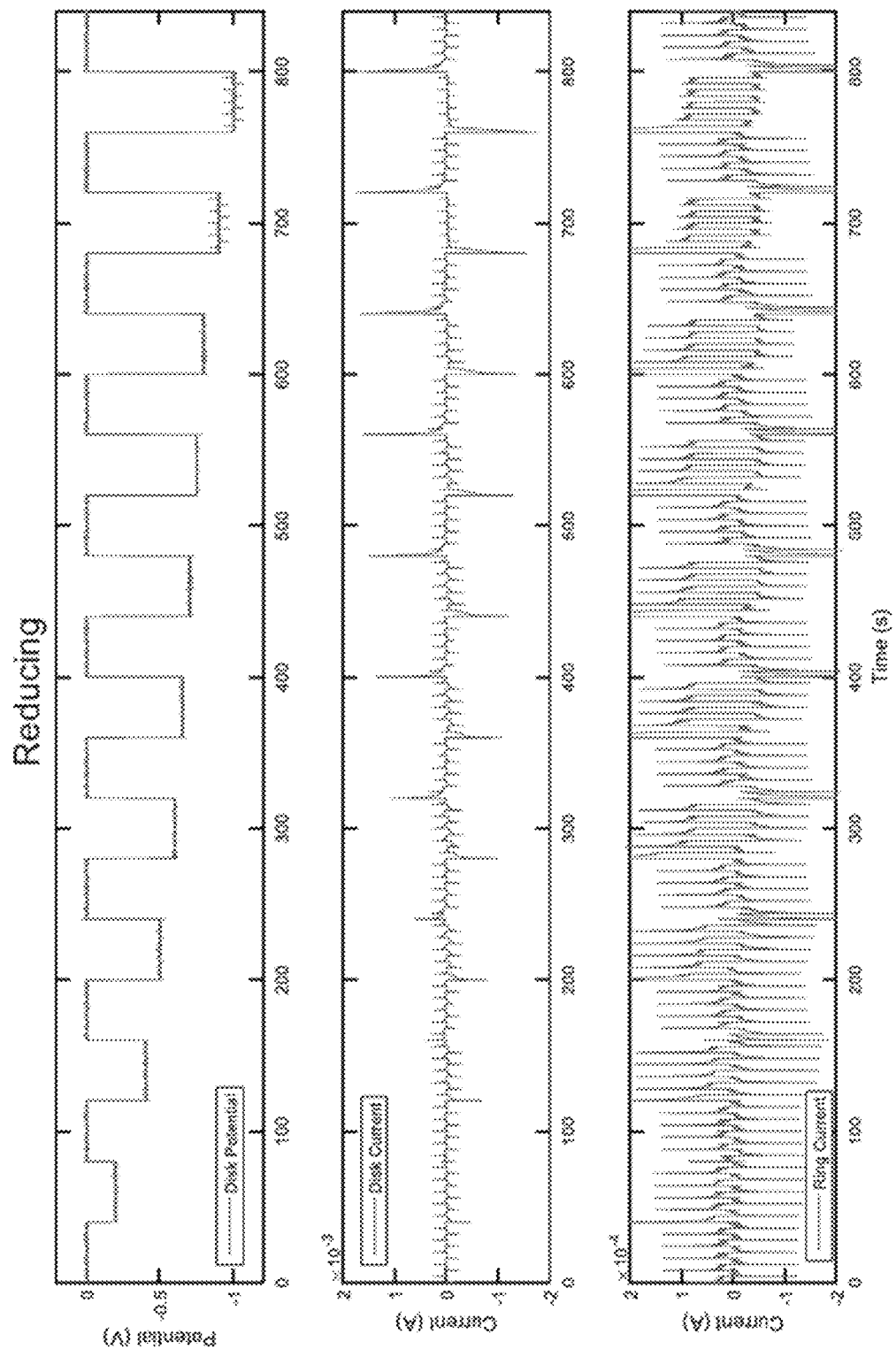
FIG. 37 are plots of voltage vs time (top) and current vs time (middle) response of the PPy(DBS) separator of FIG. 35 at reducing voltages and the corresponding current vs time (bottom) response of the reference electrode (RE) which includes a ring electrode.
Figure 38:
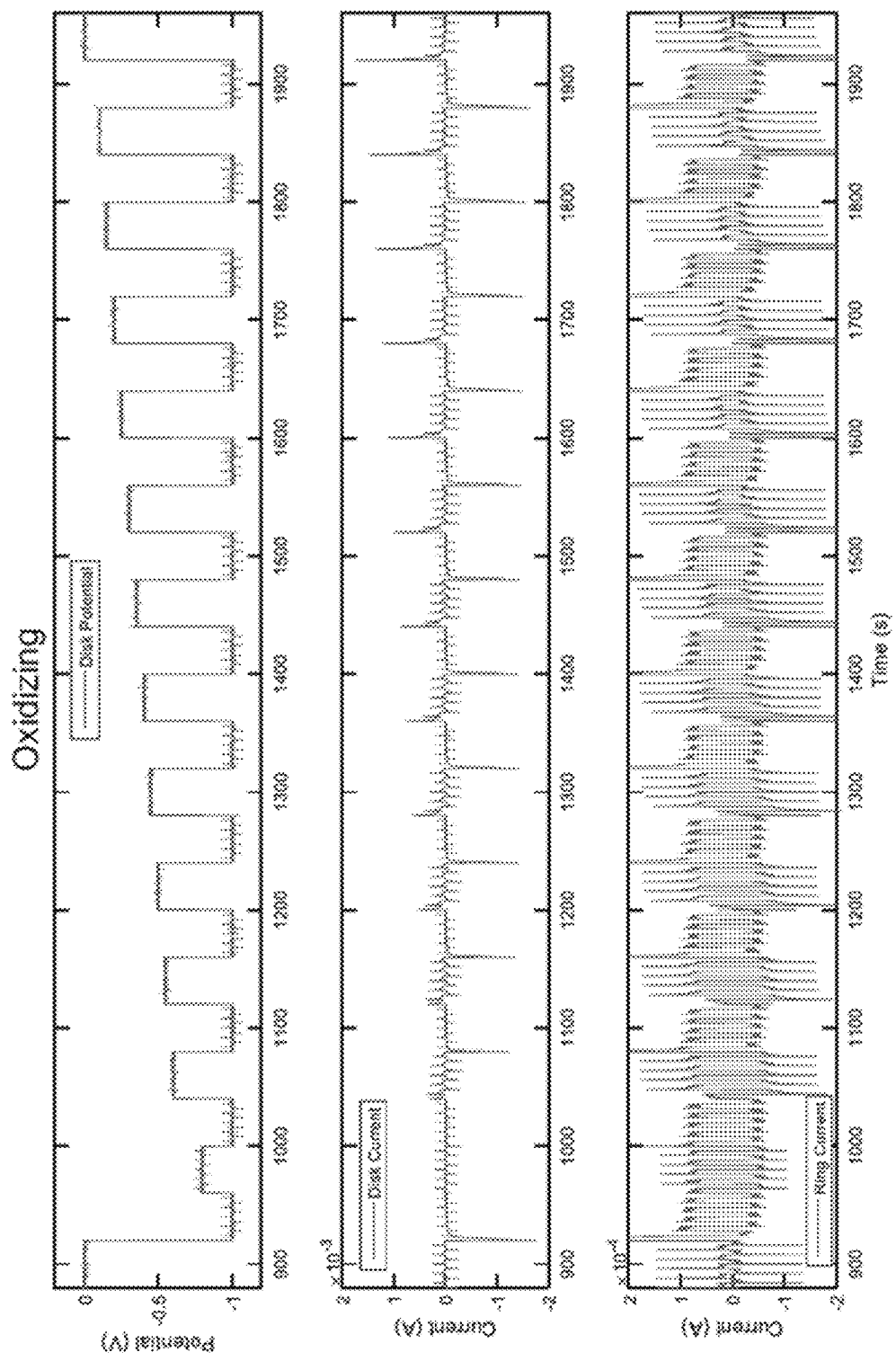
FIG. 38 are plots of voltage vs time (top) and current vs time (middle) response of the PPy(DBS) separator at oxidizing voltages and the corresponding current vs time (bottom) response of the reference electrode (RE) which includes a ring electrode.

FIG. 37 are plots of voltage vs time (top) and current vs time (middle) response of the PPy(DBS) separator of FIG. 35 at reducing voltages and the corresponding current vs time (bottom) response of the reference electrode (RE) which includes a disc electrode. FIG. 38 are plots of voltage vs time (top) and current vs time (middle) response of the PPy(DBS) separator at oxidizing voltages and the corresponding current vs time (bottom) response of the reference electrode (RE) which includes a disc electrode.

Figure 39:
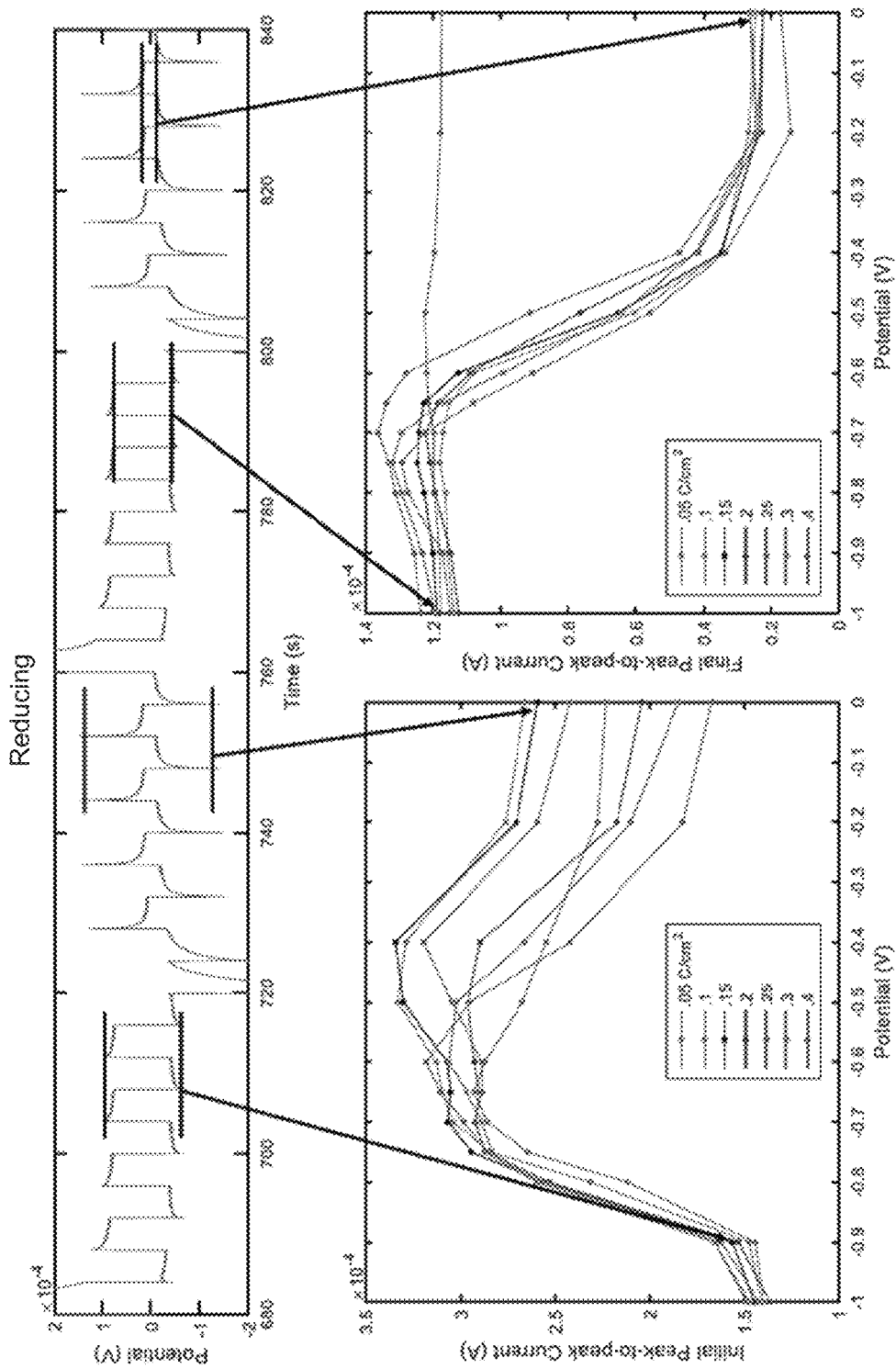
FIG. 39 (top) is a plot of reducing potentials applied on various areal density PPy(DBS) separators over time.
Figure 40:
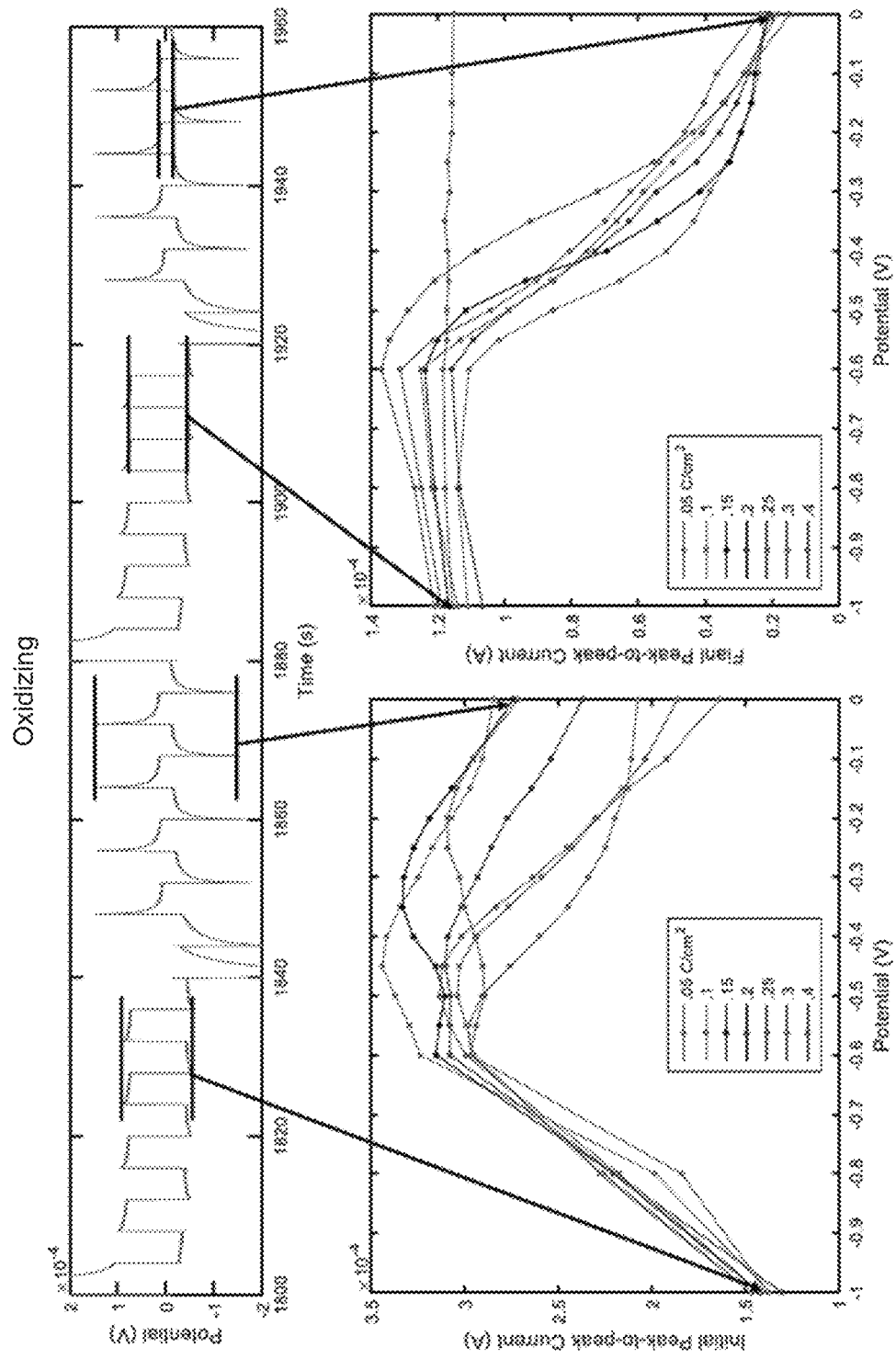
FIG. 40 (top) is a plot of oxidizing potentials applied on various areal density PPy(DBS) separators over time.
Figure 41:
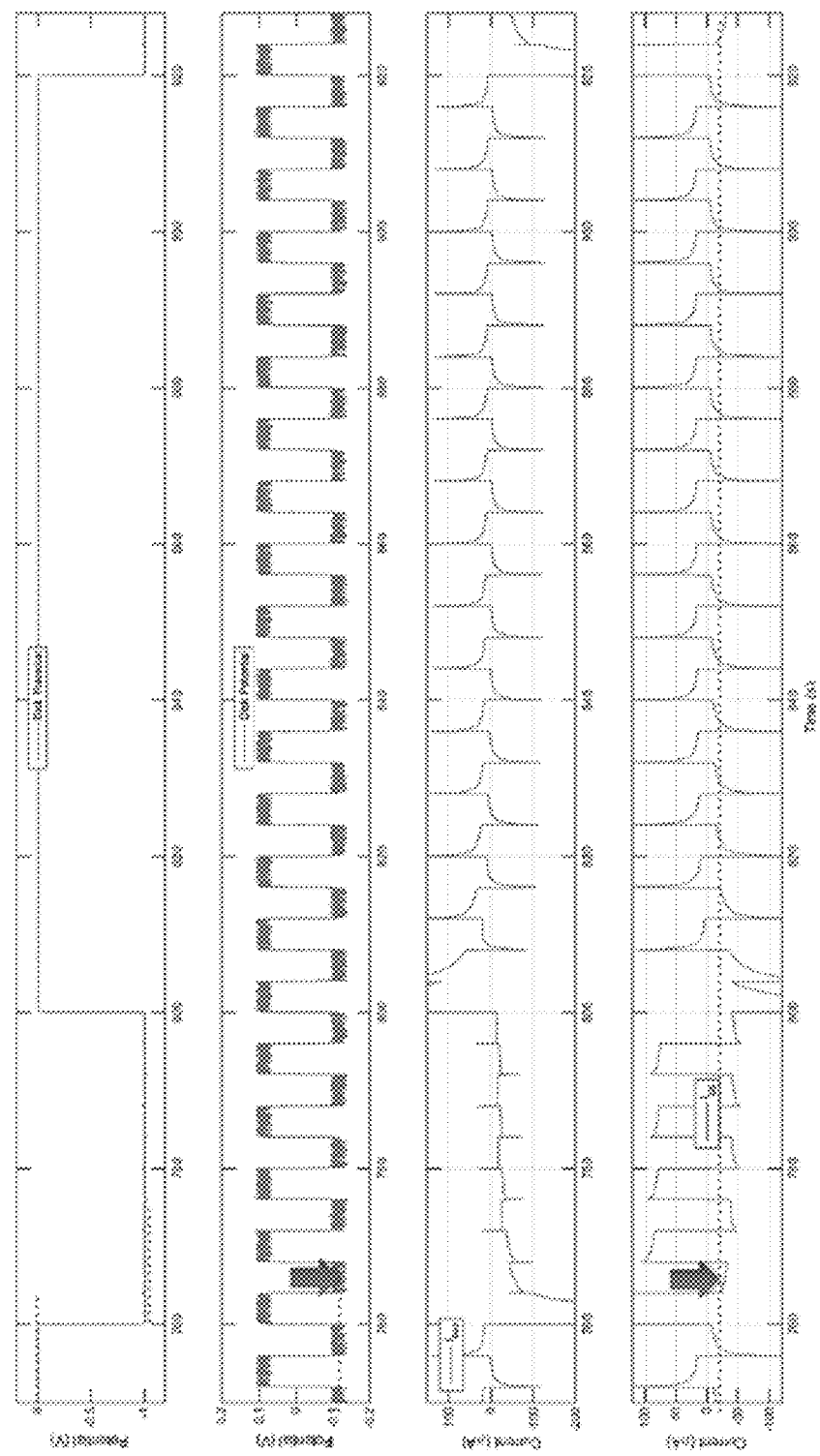
FIG. 41 are plots of reduction potentials ($V_{red}$) and oxidation potentials ($V_{ox}$) at a drain-to-source voltage ($V_{DS}$) of −100 mV and +100 mV.

FIGS. 39-41 are plots of drain to source current response in response to PPy(DBS) separator reduction potential. FIG. 39 (top) is a plot of reducing potentials applied on various areal density PPy(DBS) separators over time; FIG. 39 (bottom left) is a plot of corresponding initial peak-to-peak (PTP) current and FIG. 39 (bottom right) is a plot of final PTP current representing a transmembrane current through the PPy(DBS) separator during an initial stabilization phase and ion-transport controlling phase, respectively of the various PPy(DBS) separators. The initial stabilization phase corresponds to the formation of an electrical double layer and charge buildup on the PPy(DBS) CP. The ion transport controlling phase represents the phase when the PPy(DBS) is ready to perform ion-transport control. As shown in FIG. 39 (bottom right), reduction starts at voltages less than −0.3 B and peaks at about −0.7 V.

FIG. 40 (top) is a plot of oxidizing potentials applied on various areal density PPy(DBS) separators over time; FIG. 40 (bottom left) is a plot of corresponding initial peak-to-peak (PTP) current and FIG. 40 (bottom right) is a plot of final PTP current representing a transmembrane current through the PPy(DBS) separator during an initial stabilization phase and ion-transport controlling phase, respectively of the various PPy(DBS) separators.

FIG. 41 are plots of reduction potentials ($V_{red}$) and oxidation potentials ($V_{ox}$) at −100 mV drain-to-source potential ($V_{DS}$) and +100 mV $V_{DS}$ over time with the corresponding drain-to-source current ($I_{DS}$). At the −100 mV $V_{DS}$, the $I_{DS}$ at $V_{red}$ is approximately the same as the $I_{DS}$ at $V_{ox}$. On the contrary, at the +100 mV $V_{DS}$, the $I_{DS}$ at $V_{red}$ is much greater than the $I_{DS}$ at $V_{ox}$.

Ion-Sensing for Electrolyte Health Monitoring and Bio-Sensing

As described before, the membranes described herein can also be used for sensing a concentration of ions in an electrolyte included in an energy storage device as an indicator of a health of the electrolyte, and thereby the health of the energy storage device. The present technology similarly may be used to sense a concentration of ions in a bio-electrolyte, such as blood, lymph, cytosol, etc.

Figure 42:
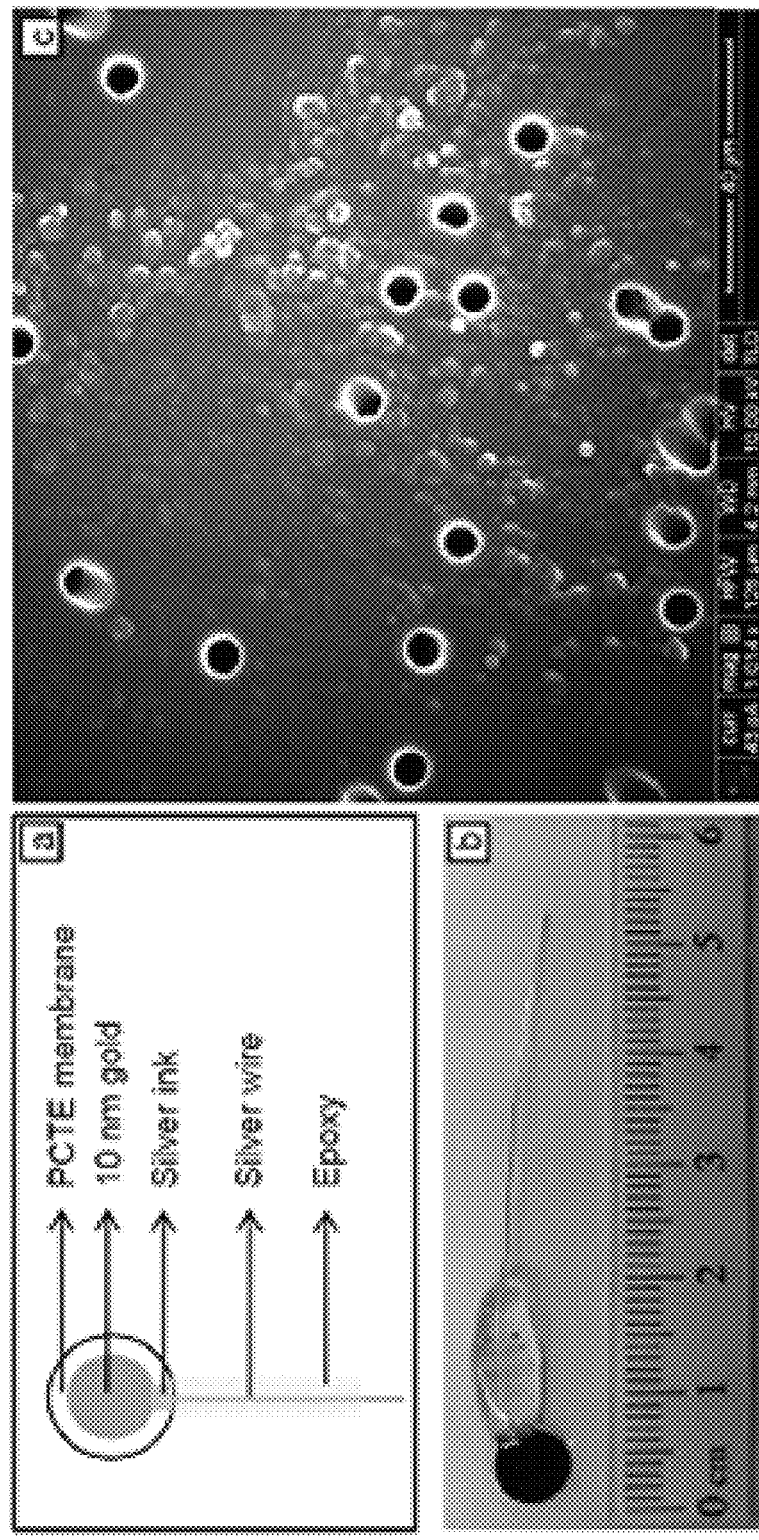
FIG. 42a is a schematic illustration of a PPy(DBS) membrane that can be used in an electrochemical cell as a sensor for health monitoring of the electrochemical cell.
FIG. 42b is an optical image of the sensor, and FIG. 42c are SEM micrograph showing PPy(DBS) formed in and around the pores of polycarbonate track etched (PCTE) membranes.

FIG. 42a is a schematic illustration of a PPy(DBS) membrane that can be used in an electrochemical cell as a sensor for health monitoring of the electrochemical cell. FIG. 42b is an optical image of the sensor, and FIG. 42c are SEM micrograph showing PPy(DBS) formed in and around the pores of PCTE membranes.

Sensor Fabrication: Pyrrole (reagent grade, 98%), sodium dodecylbenzene sulfonate (NaDBS, technical grade) and sodium chloride (NaCl, ≥99.5%) are purchased from Sigma Aldrich. Small discs of PCTE filter membranes (Isopore, 10 μm TCTP, Millipore) are used as the membrane substrate due to its high compliance, thus allowing the sensor to operate in the free deflection mode. The membrane substrates are sputtered with a 10 nm thick gold layer covering a circular area of 0.31 cm$^2$, and electrically connected with a silver wire. Epoxy is applied to insulate the exposed silver so as to exclude its participation in the electrochemical measurements.

A polymerization solution containing 0.1 M pyrrole and 0.1 M NaDBS is prepared in deionized water (resistivity 18.2 MΩ·cm). Potentiostatic electropolymerization of PPy (DBS) is carried out at 0.43 V on the gold coated PCTE membrane substrate until a total accumulated charge yields a polymer with an areal density charge density of 0.48

C/cm². A completed device is shown in FIG. 42b. FIG. 42c shows an SEM micrograph of the deposited PPy(DBS). While the thickness of each membrane was not measured, it is assumed that maintaining a constant areal density charge density is equivalent to maintaining a constant thickness. To ensure comparative performance of each sensor, the sensors are equilibrated by cyclic voltammetry (−1.3 to 0.5 V) for 20 cycles in 25 mM, 50 mM, 75 mM, or 100 mM NaCl until the current response is concordant over two consecutive cycles. This is followed by cycling each electrode in deionized water to expel any residual sodium ions that might be trapped in PPy(DBS) matrix. Sensing experiments are carried out using chronoamperometry at an applied reduction potential of −1 V in 2 mL of NaCl electrolyte of varying concentrations.

Figure 43:
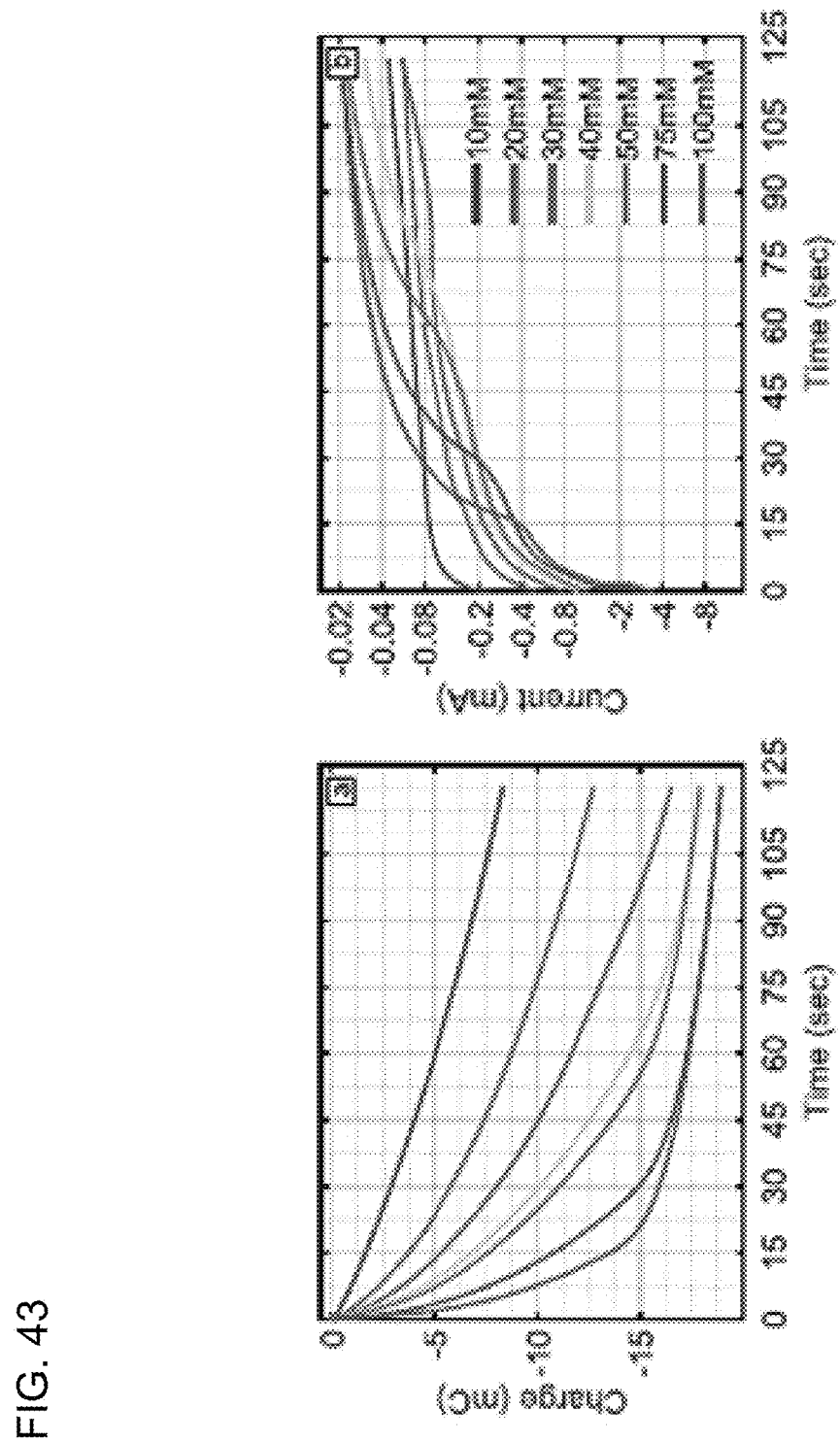
FIGS. 43a-b are chronoamperometric reduction plots of PPy(DBS) as a function of electrolyte concentrations: (a) charge response, and (b) current response.

Results: The chronoamperometric response of PPy(DBS) (equilibrated in 50 mM NaCl) in NaCl under a reduction potential of −1 V and the corresponding charge data is presented in FIG. 43. In FIG. 43a, it is observed that at low cation concentrations (<30 mM) the rate of charge accumulation is nearly constant. However, at higher cation concentrations there is distinct change in the slope as the charge accumulation proceeds, indicating a change in the process kinetics. In increasing the electrolyte concentration, the initial slopes are seen to vary directly as a function of concentration while the second slopes, where present, appear similar at all concentrations.

Based on the mechanistic interpretation of charge transport in PPy(DBS), it is construed that the initial slope corresponds to the movement of ions into the polymeric matrix. Following the complete occupancy of accessible redox sites, additional ions cannot be accommodated by the polymer, leading to the formation of a double layer at the polymer surface. This process is represented by the second slope seen at concentrations higher than 30 mM. It is important to note that with increasing concentration, the time at which the transition in the slopes shift towards the lower end of the time scale. This observation can be correlated to Equation 1 where an increase in electrolyte concentration translates to an increase in electrochemical potential that drives ion influx. Thus, since the number of redox sites is a constant for a given mass of polymer, the increased rate of ion influx causes the polymer to saturate more rapidly.

Similarly, in FIG. 43b the current response at low concentrations (<30 mM) shows a slow approach to saturation, but some redox sites are still unoccupied within the observed time span. For higher concentrations, the curve appears to represent two processes having two distinct time constants. Under these conditions, the completion of filling of accessible redox sites can be identified by the inflection point after which the current asymptotically approach zero. This decay is representative of a double layer build up and maintenance as ions can no longer be accommodated in the PPy(DBS) membrane. With an increase in electrolyte concentration, the inflection points are seen to shift towards the lower end of the time scale. This is a consequence of the increase in the rate of saturation of redox sites due to an increase in electrochemical driving force.

Figure 44:
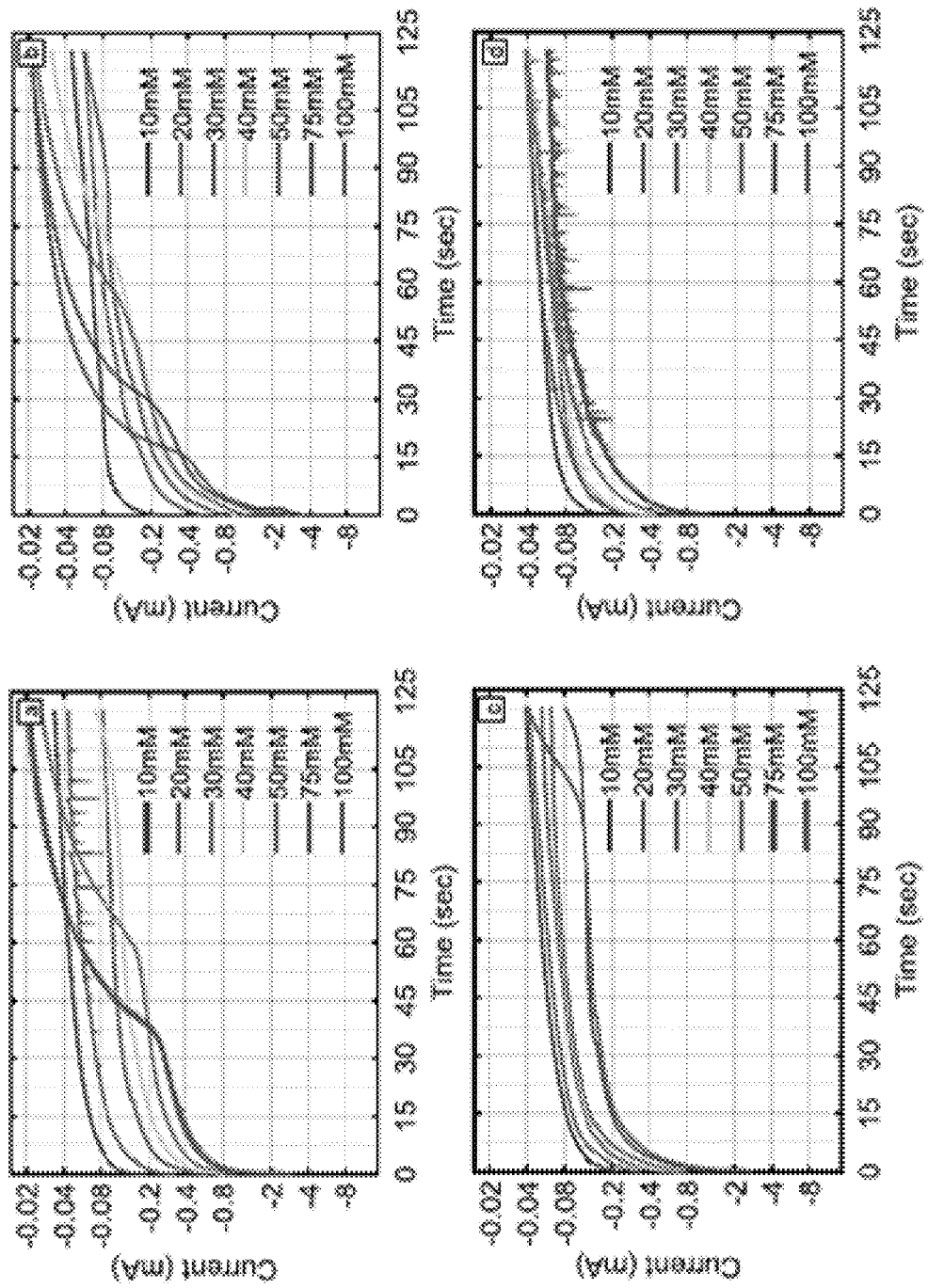
FIGS. 44a-d are chronoamperometric response plots of PPy(DBS) as a function of electrolyte concentration for membranes equilibrated in (a) 25 mM NaCl, (b) 50 mM NaCl, (c) 75 mM NaCl, and (d) 100 mM NaCl.

The response of PPy(DBS) equilibrated in different concentrations of NaCl is presented in FIG. 44. Equilibrating PPy(DBS) in electrolytes with higher concentration increases the porosity of the PPy(DBS) matrix, rendering more redox sites accessible to ingressing cations during potentiostatic measurements. Thus, the time to reach saturation in PPy(DBS) is found to be dependent on the concentration of solution in which PPy(DBS) was equilibrated prior to characterization. At an equilibration concentration of 50 mM, in FIG. 44b the first inflection point during sensing operation is observed when electrolyte concentration is 30 mM. For membranes equilibrated in 75 mM, inflections are first observed only at 75 mM NaCl in the experiment time frame of 120 seconds as seen in FIG. 44c. Membranes equilibrated in 100 mM (FIG. 44d) show no inflections in the experimental time frame, indicating that saturation occurs at even higher times than those equilibrated at 75 mM. At 25 mM, a higher number of cations are cycled through the polymer than predicted, resulting in a more porous matrix and a concurrent shift in inflection points to higher times than those equilibrated at 50 mM.

Following is a description of the nomenclature used herein: $\eta_p$—electrons produced during electropolymerization; $\eta_c$—electrons consumed during electropolymerization; $\mu_{Na+}$—electrochemical potential; $\tau$—time constant; $\Theta$—temperature; $[C]^+$—cation concentration; F—Faraday constant; G(s)—transfer function; i(t) or I(s)—current; k—gains and system residues; $N_r$—number of redox sites; p—system poles; $Q_p$—polymerization charge; R—Gas constant; s—Laplace variable; t—time; V or V(s)—applied voltage; $y_{Na+}^o$—mole fraction of residual sodium in PPy (DBS); $y_{Na+}^{NaCl}$—mole fraction of sodium in NaCl electrolyte; and $z_e$—charge associated with an electron.

The admittance transfer function of the conducting polymer for a voltage input V(s), transient current output I(s) is given by $$G(s) = \frac{I(s)}{V(s)} = \frac{k}{\left(s + \frac{1}{\tau_1}\right)} \quad (3)$$

where k and $\tau_1$ are the gain and time constant associated with G(s), respectively.

Chronoamperometric measurement of reduction currents in CPs are obtained as a result of a step voltage input applied to the system. This step input of magnitude $k_i$ is represented by an integrator in Laplace domain as:

$$V(s) = \frac{k_i}{s} \quad (4)$$

and a non-ideal step input is represented as:

$$V(s) = \frac{k_i}{\left(s + \frac{1}{\tau_2}\right)}; \text{ where } \frac{1}{\tau_2} \to 0, \neq 0 \quad (5)$$

where $k_i$ and $\tau_2$ are respectively the gain and time constant associated with a non-ideal reduction potential. Equations 3 and 5 can be combined to represent the chronoamperometric current response as shown in Equation 6, $$I(s) = G(s) \cdot V(s) = \frac{k_1}{\left(s + \frac{1}{\tau_1}\right)} + \frac{k_2}{\left(s + \frac{1}{\tau_2}\right)} \quad (6)$$

In this equation, $k_1$ and $k_2$ represent the residues, while $(1/\tau_1)$ and $(1/\tau_2)$ represent the poles $p_1$ and $p_2$ respectively. In the time domain, Equation 6 is transformed into a two-term exponential function shown in Equation 7

$$i(t)=k_1 e^{t/\tau_1}+k_2 e^{t/\tau_2} \tag{7}$$

Figure 45:
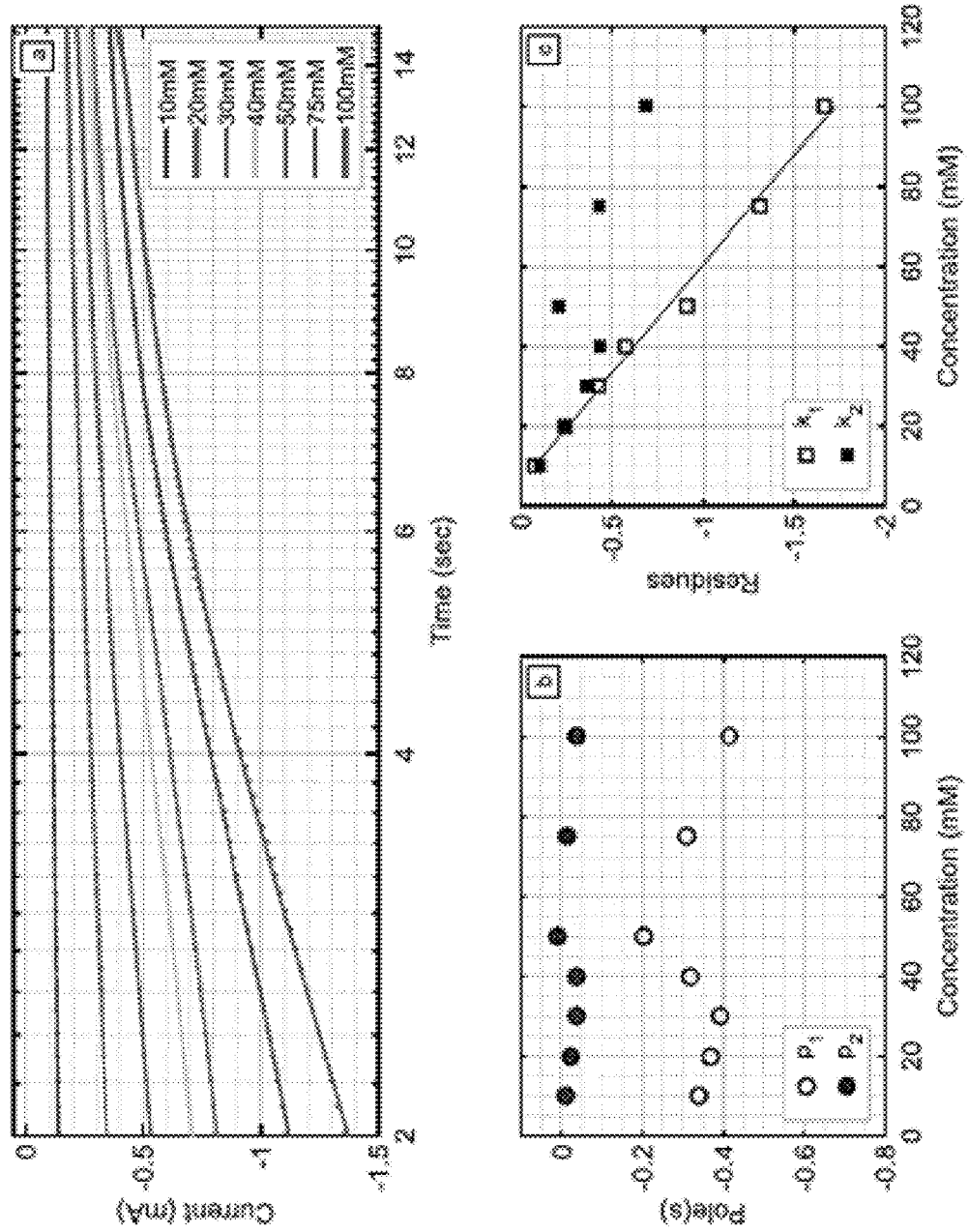
FIGS. 45a-c are analysis of chronoamperometric response of PPy(DBS) equilibrated in 50 mM NaCl (a) two-term exponential model fit (solid line) for reduction currents (dotted line) from 2 to 15 seconds (b) poles of system response and (c) residues of PPy(DBS) component of system response as a function of electrolyte concentration.

Equation 7 only describes the process of ion influx until saturation, and not the current corresponding to formation of the double layer. FIG. 45a shows the experimental transient chronoamperometric response of PPy(DBS) sensors equilibrated in 50 mM NaCl FIG. 44b and the result plotted from Equation 7. The time period of interest is limited to the first 15 seconds as the polymer saturates beyond this time frame at higher electrolyte concentrations. FIG. 45b shows that the poles $p_2$ (or $1/\tau_2$) corresponding to the integrator are nearly zero. The values for $p_1$ now represent total system behavior and consistently fall between −0.2 and −0.6 for all data sets. This indicates reliability in the fabrication and performance of PPy(DBS) membranes. The compliant PCTE filter membranes allow the system to operate in the free deflection mode and give an unbiased representation of CP material properties. It is expected that for CPs deposited on rigid substrates such as silicon nitride wafers, $p_1$ would capture the blocked force response of the polymer, causing the values to vary linearly with increasing concentration.

The residues $k_1$ of the system response presented in FIG. 45c approximate the sensing behavior of PPy(DBS) and are found to be linearly dependent on electrolyte concentration. The relationship between the residue $k_1$ and cation concentration $[C]^+$ as determined by the linear fit is given by Equation 8, $$k_1=-0.01827[C]^++0.1065 \tag{8}$$

This calibration curve can be used to extrapolate the cation concentration of a solution whose chronoamperometric response yields a value for $k_1$ through the two-exponential model. The slope of the calibration curve is defined as the sensitivity of the sensor and has the units 'k/mM' where k is a dimensionless parameter that represents the residue $k_1$. High sensitivity is advantageous as this implies good sensor resolution in the determination of cation concentration. The values of $k_1$, and thus the sensitivity, can vary with any changes to the device, such as polymer mass, thickness, morphology, sensor geometry as well as the nature of the substrate.

Figure 46:
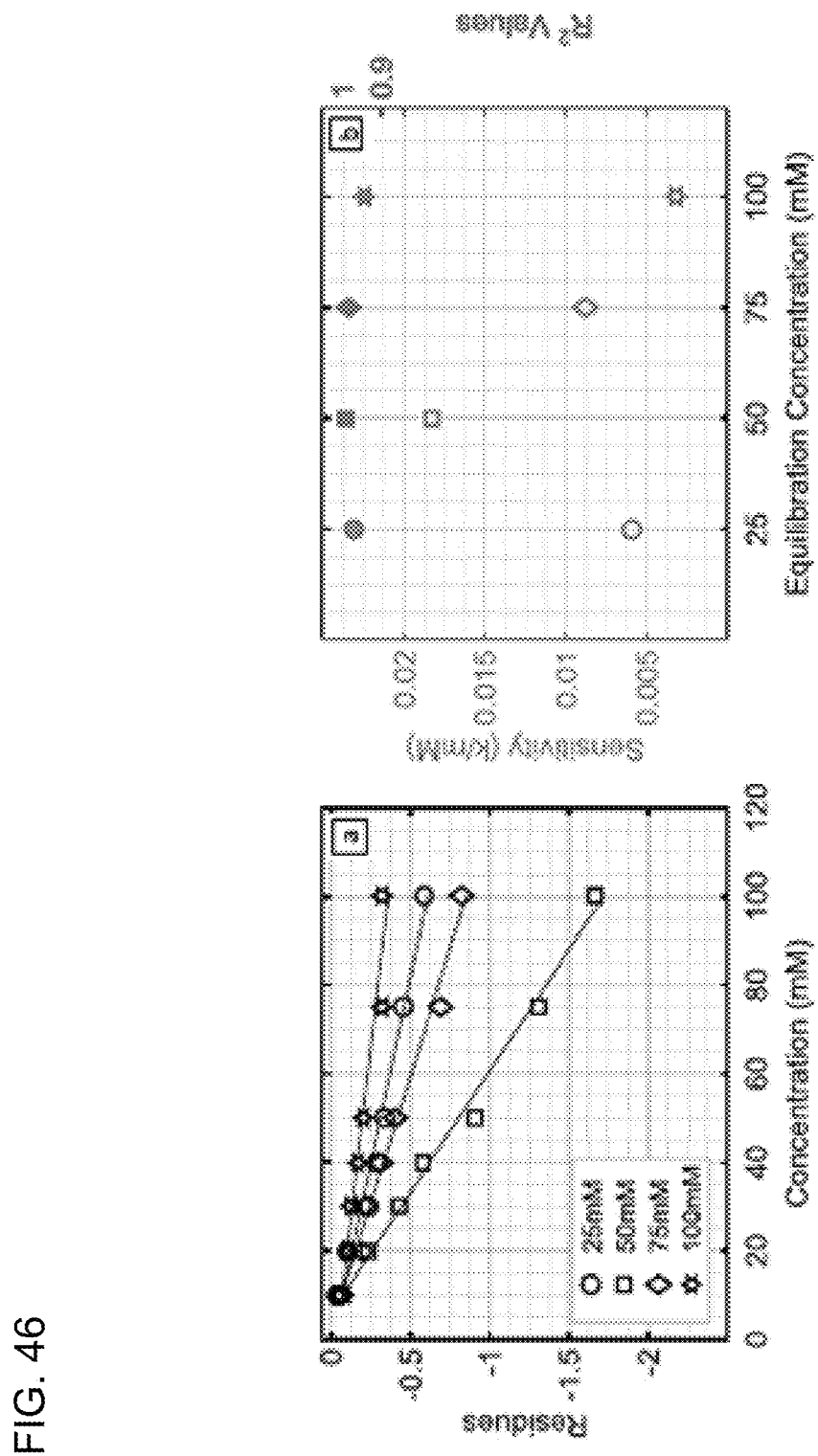
FIGS. 46a-b are plots of effect of equilibration conditions on (a) residues ($k_1$) of PPy(DBS) membranes (b) sensitivities and $R^2$ values of linear fit in the concentration range 10-100 mM.

A comparison of residues obtained using this analysis technique for PPy(DBS) membranes equilibrated in 25 mM, 50 mM, 75 mM and 100 mM are presented in FIG. 46a. The $R^2$ value of the linear fit for each equilibration concentration is greater than 0.9, with the best fit occurring at 50 mM equilibration ($R^2$=0.99) as shown in FIG. 46b. Therefore, the systems poles and residues provide a reliable way to quantify the sensitivity of the cation sensors. Amongst the four tested equilibration conditions, membranes cycled in 50 mM NaCl have the highest cation sensitivity in the concentration range 10-100 mM In this manner, using the cation sensor and model described herein, the linear dependence of residues on concentration observed from the model allows for precise determination of cation concentration. This can enable, for example determination of cation concentration included in an electrolyte of an electrochemical cell. The concentration of cations in the electrolyte can be indicative of a health of the electrolyte and therefore, it can be used as a parameter for indicating battery health. Therefore, the ion-doped conductive polymer separator or membrane described herein can serve as a separator in an electrochemical cell and/or energy storage device for controlling ion-transport therethrough, as well as sense a quantity of ions in an electrolyte of an electrochemical cell and/or energy storage device to determine the health of the cell/device. Similarly, a person of skill in the art would recognize that these same features are applicable to bio-sensing, where cation or anion sensing may be used in a biological context (e.g., with any one or more of blood, lymph, cytosolic components, etc. as at least part of the electrolyte) to allow for precise determination of cation or anion concentration.

Other Applications

Ion sensing: The ion-doped CP membranes described herein, for example, the PPy(DBS) CP membrane, can be used as a sensor for measuring the concentrations of ions, for example $Na^+$, $K^+$, $Li^+$, $Ca^{2+}$ or any other cation or anion in liquid or gaseous samples. For example, the ion-doped CP membranes can be used as potentiometric or an amperometric ion sensor for sensing the quantity of one or more ions in biological samples (e.g., blood, urine, saliva, cerebrospinal fluid, etc.), environmental samples, food samples, or any other sample.

Filtration and Separation: The ion-doped CP membrane can be used as a tunable membrane filter (e.g., an osmotic filter) for selectively filtering various size particles, molecules or ions. By selectively applying the reduction and/or the oxidation potential on the ion-doped CP, a pore size of the membrane can be adjusted to selectively allow particles molecules or ions of various sizes to pass therethrough. The ion-doped CP membrane can also be used for controlled osmosis or reverse osmosis. In some embodiments, the transmembrane conductance of the ion-doped CP is controlled selectively to allow cations or ions to selectively pass therethrough. In some embodiments, the ion-doped CP membrane is used to separate various liquids or gases, or in any other filtration or separation applications.

Drug Delivery and Therapeutics: The ion-doped CP membrane described herein can also be used for therapeutics and targeted drug delivery. For example, the ion-doped CP membrane can be used as a vehicle for a drug, for example a cancer drug, shaped in the form of a hollow pill, a tablet or a gel drop such that the ion-doped CP forms the sidewalls of the pill and the drug is contained therewithin. In other embodiments, the ion-doped CP can be coated on implants such as orthopedic implants or dental implants and used to selectively deliver a drug to the implant site, for example an anti-inflammatory or anti-bacterial drug.

In an initial state, the pores of the sidewalls of the pill formed by ion-doped CP can defines pores having a cross-section (e.g., a diameter) smaller than an effective cross-section of the drug molecules so that the drug molecules are trapped within the ion-doped CP. The ion-doped CP pills can be injected into the blood stream of a patient or delivered orally. Once the ion-doped CP pill reaches the drug delivery site, for example the portion of the body where cancer cells are located, an electrical or electromagnetic field can be selectively applied on the ion-doped CP pills (e.g., via a magneto resonance imaging (MRI) machine or a handheld electromagnetic field generation device). The electrical or electromagnetic field can oxidize or reduce the ion-doped CP causing volumetric expansion of the ion-doped CP. This causes an increase in the cross-section of the pores defined by the ion-doped CP so that the cross-section of the pores becomes larger than the cross-section of the drug molecules. The drug molecules can now escape from the ion-doped CP pills and delivered to the desired location of the body, for example the site of cancer cells.

Figure 47:
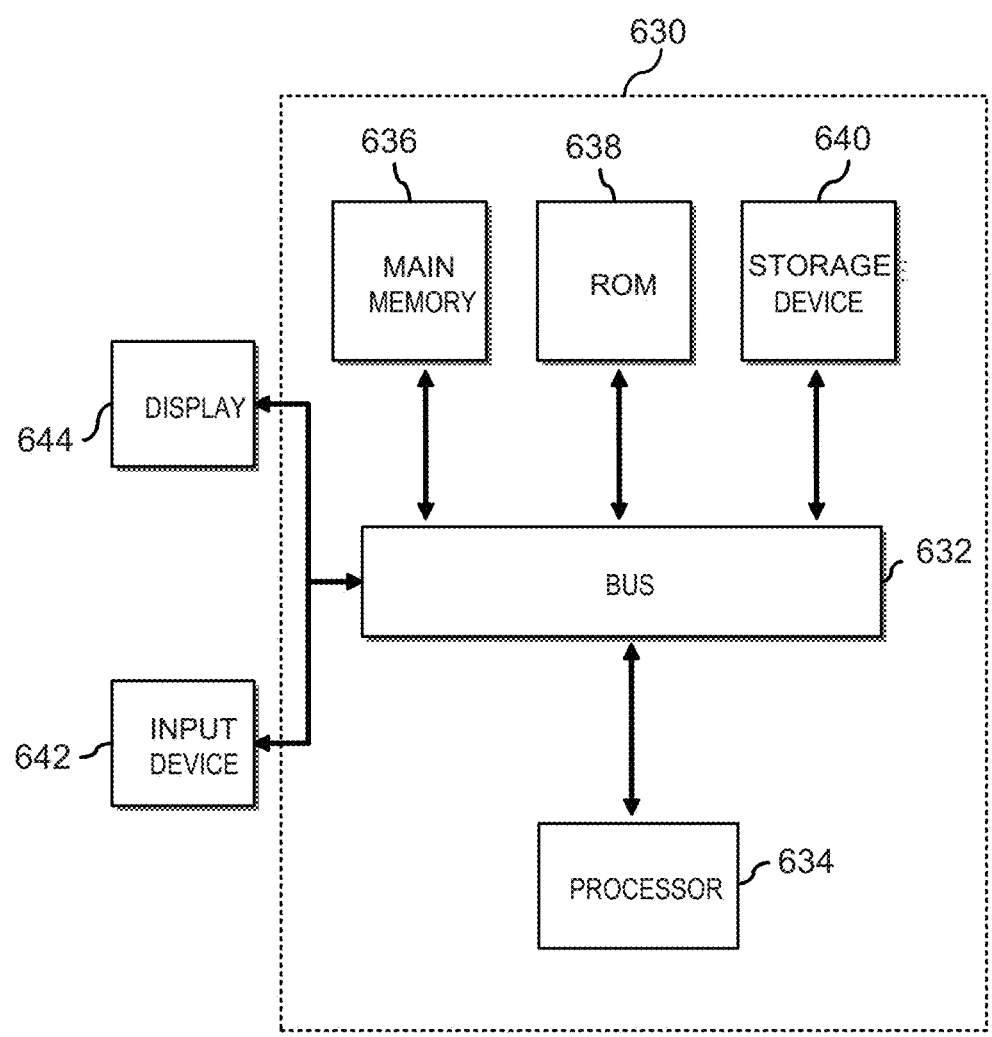
FIG. 47 is a schematic block diagram of an embodiment of a computing device which can be used as a controller included in the aftertreatment systems of FIG. 1.

In some embodiments, the controller 170 or any of the controllers described herein can comprise a system computer of an apparatus or system which includes the energy storage device 100. For example, FIG. 47 is a block diagram of a computing device 630 in accordance with an illustrative implementation. The computing device 630 can be used to perform any of the methods or the processes described herein, for example the method 500. In some embodiments, the controller 170 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640, such as a solid-state device, magnetic disk or optical disk, is coupled to the bus 632 for persistently storing information and instructions (for example, instructions for determining the onset of a thermal runaway condition).

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware circuitry and software.

Although an example computing device has been described in FIG. 47, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of any two or more of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Further Membrane Properties and Further Applications

Figure 48:
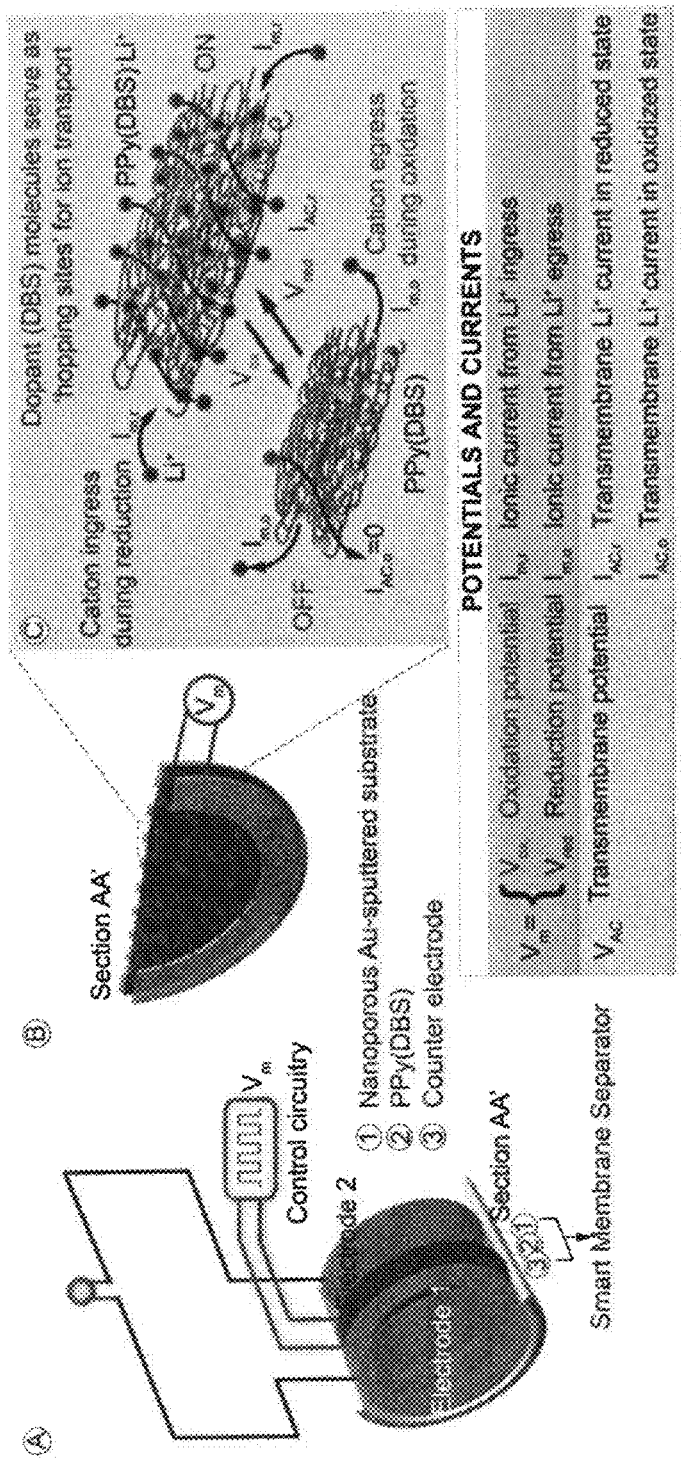
FIGS. 48A-C illustrate the structure and function of a membrane, according to the working examples.

The following examples further demonstrate that an applied electrical potential to a membrane of the present technology alters the redox state and allows it to conduct ions across the membrane. This membrane, referred to as a smart membrane separator hereafter, is a programmable ionic conductor that exhibits a varying ionic impedance due to an external stimulus and applied in an energy storage device (e.g., supercapacitor, redox flow battery ("RFB")) as shown in FIG. 48A. Besides a RFB, the smart membrane separator when used in a supercapacitor or a hybrid battery provides additional control input to preserve the state of charge (SOC) and prolong the shelf-life.

As discussed previously, bidirectional ion transport is an essential function of biological ion channels in cell membranes. While other synthetic analogues of biological ion transporters use nanoscale electrostatic interactions to demonstrate ionic rectification and transistor like function, ion transport in these synthetic analogues is unidirectional, and its physics of operation does not allow controlled bidirectional transport using a control signal. Further, these nanofluidic ionic devices are not suitable for implementation in an energy storage device. Thus, prior to the present technology, synthetic membranes with programmable bidirectional ion transport did not exist.

The smart membrane separators of the following examples are fabricated in a similar fashion as described earlier in the working examples above. In particular, a polycarbonate tracketched (PCTE) membrane (Isopore—EMD Millipore) with 600 nm diameter pores and a 50 nm sputtered gold layer is used as the substrate for electropolymerization of PPy(DBS). This substrate, as well as a gold foil strip and an Ag/AgCl pellet (World Precision Instruments), are connected as the working, counter, and reference electrodes, respectively, to a Potentiostat (PARSTAT 4000) and submerged in an aqueous solution of 100 mM sodium dodecylbenzenesulfonate (NaDBS) and 200 mM pyrrole (Sigma Aldrich). Chronoamperometry (CA) is performed with a 0.42 V constant potential applied to the cell to monitor the electropolymerization current and charge over time until the desired polymer areal density is reached.

The newly formed polymer is subsequently rinsed with deionized water, dried with nitrogen gas, and submerged as the working electrode in an aqueous solution of desired ion type and concentration, along with an Ag/AgCl pellet as the counter/reference electrode. The polymer is conditioned by application of a cyclic voltammetry (CV) function to induce redox reactions, cycling between −1.3V and 0.5V at a scan rate of 50 mV/s, in which distinct reduction and oxidation current peaks are visible. This function is continued until the same number of ions (monitored by charge) ingress/egress the polymer for each cycle. At this point, typically after about 20 cycles, the polymer is considered to be fully conditioned and in equilibrium.

Figure 49A:
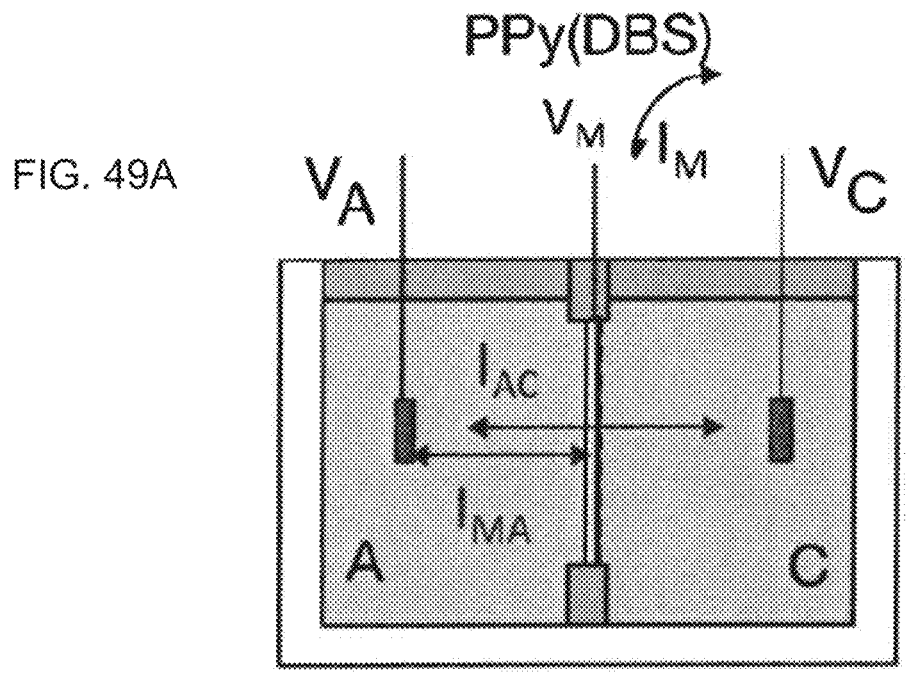
FIGS. 49A-B illustrates a controlled ion transport experimental setup as a cross-sectional schematic (FIG. 49A), and photograph of the final assembly (FIG. 49B) demonstrating the electrode setup and the active membrane separated chamber assembly, according to the working examples.

To assess transmembrane ionic flow of a smart membrane separator, a bicameral device was designed and manufactured to allow for use and electrical connection of the membrane as the septum. Both chambers are filled with aqueous solution and an Ag/AgCl pellet is submerged in each chamber. The membrane and two pellets are electrically connected to a bipotentiostat as the disk working, ring working, and counter/reference electrodes, respectively, for application of the membrane and transmembrane potentials. See FIGS. 49A-B for a cross-sectional schematic (FIG. 49B) and final assembly demonstrating the electrode setup and the active membrane separated chamber assembly (FIG. 49C).

The PPy(DBS) membrane spans the pores of the substrate and forms a barrier for ion transport as illustrated in FIG. 48B. The Au-layer between PCTE substrate and PPy(DBS) and a counter electrode kept immersed in the electrolyte allows for the application of an electrical field to PPy(DBS) ($V_m$) independent of electrodes kept on either sides of the membrane. In the absence of an external electric field to PPy(DBS) ($V_m=0$), the polymer backbone is in its oxidized state and has a high packing density. Due to tight packing of the polymer in its oxidized state, ion transport across the membrane for an applied transmembrane potential ($V_{AC}$) is negligibly small. By the application of a reducing field to PPy(DBS) ($V_m=-1$ V to $-0.45$V), the polymer gathers a net negative charge. This leads to cation ingress (e.g., by any one or more of the following—$Li^+$, $Na^+$, $Ca^{2+}$, $Mg^{2+}$) to the DBS dopant sites in the polymer from the electrolyte and allows for cation transport across the membrane for various $V_{AC}$, as shown in FIG. 48C. Due to the ability of $V_m$ to control transmembrane current $I_{AC}$ between a negligible minimum and a maximum, the membrane is considered to switch between OFF and ON states.

Figure 49B:
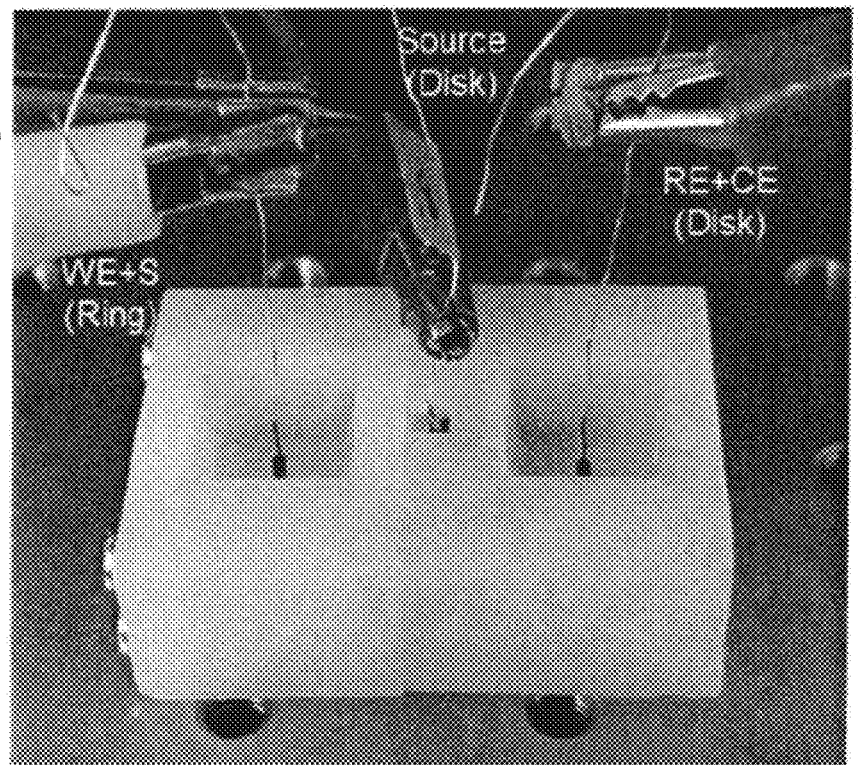

Controlled ion transport across suspended PPy(DBS) is demonstrated for various thicknesses, cation concentrations, $V_m$ and $V_{AC}$. Thickness of PPy(DBS) formed over the porous substrate is varied by controlling areal charge density ($A_E=0.05$-1.5 $C/cm^2$) during potentiostatic electropolymerization (see procedure for generating PPy(DBS) above). For thickness ($A_E>0.15$ $C/cm^2$), it is observed from SEM images that PPy(DBS) spans the pores underneath and forms a physical barrier for ion transport across the porous substrate. The experimental setup to investigate ion transport across the membrane is shown in FIG. 49B and as the inset in FIG. 50A. The ionic circuit is set up using the membrane as septum in a bicameral device, and transmembrane currents were recorded for reduced and oxidized states of the PPy (DBS).

Figure 50:
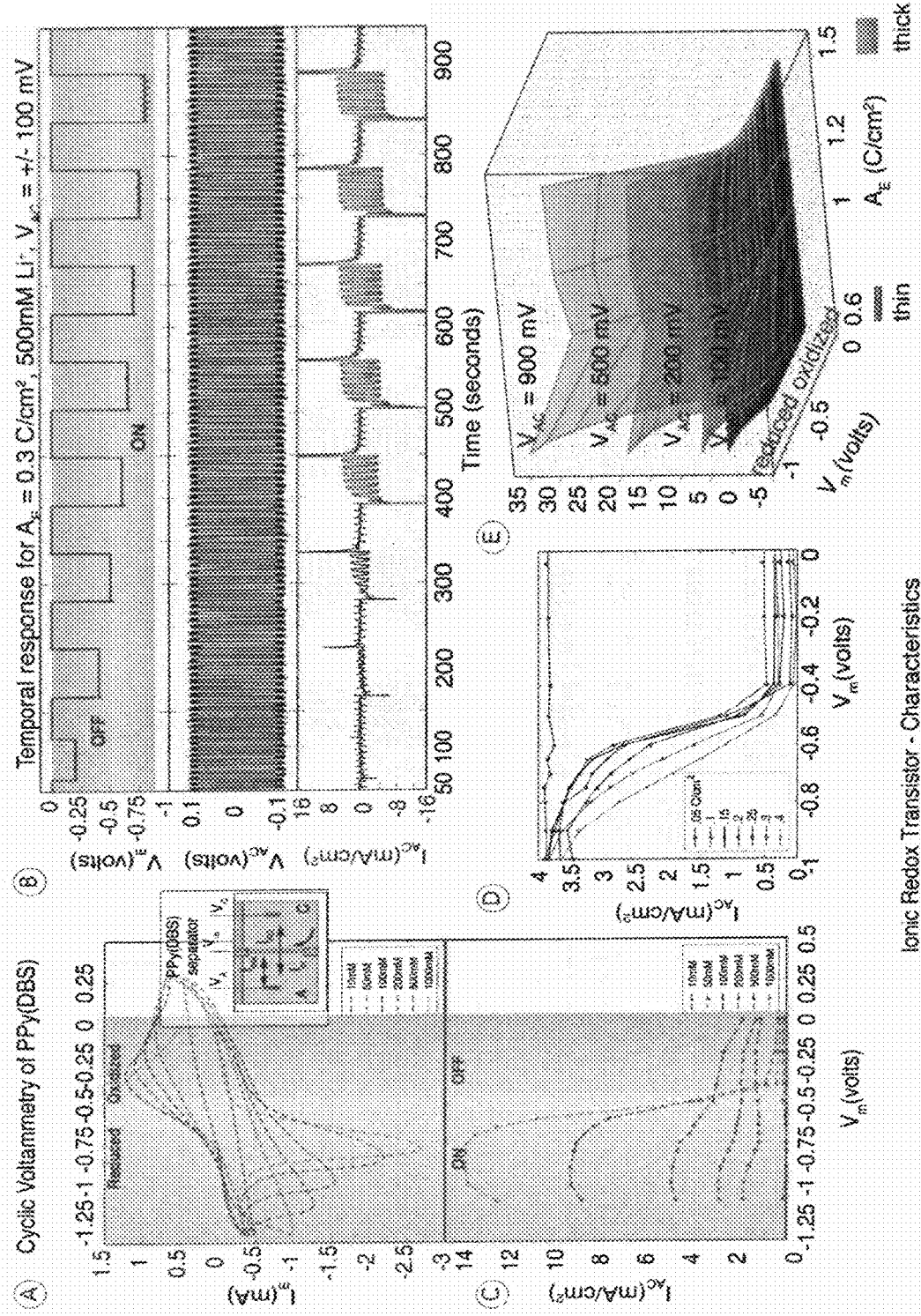
FIGS. 50A-E illustrates the characterization of a PPy (DBS)-based ionic redox transistor, according to the working examples.

The cyclic voltammogram (CV) of PPy(DBS) (areal density of 0.3 $C/cm^2$) in various concentrations of $Li^+$ is shown in FIG. 50A. The CV appears as expected, with the reduction potential shifting to the right and the peak reduction current increasing with concentration. A typical temporal response of transmembrane current ($I_{AC}$ [$mA/cm^2$]) at different redox potentials ($V_m=-0.4V$ to $-0.9V$) and periodic $V_{AC}$ (±100 mV) is shown in FIG. 50B.

In regard to the data in FIG. 50B, A potential VM between 0 V and −1.1 V is applied to the membrane with respect to the RE/CE electrode at potential VC to either oxidize or reduce the polymer, respectively. A potential VA in the form of a square wave is applied to the WE/S electrode also with respect to the RE/CE electrode, resulting in an overall transmembrane potential VAC. The resulting currents at the membrane (IM) and the WE/S electrode (IAC) are subsequently measured. These currents are a direct result of the motion of ions into and across the membrane. There also exists an interplay between the membrane and transmembrane currents. Upon investigation of the internal circuitry of the bipotentiostat, the potential difference between VA and VM allows a double-layer of ions to build up on the electrode or membrane within a single chamber. This manifests as an interplay current between the WE/S electrode and the membrane, denoted by IMA. In order to get accurate measurements of the transmembrane current, this interplay current must be removed from the signal. To remove the interplay current IMA, it must first be determined. The measured current IAC contains the transmembrane and interplay currents at all times, and since the transmembrane current is the unknown variable desired to determine, the interplay current cannot be resolved from the measured IAC. The measured current IM contains the redox current of the membrane and the interplay currents. During transients of the membrane redox state, the redox current is not known and therefore the interplay current cannot be determined. However, once the redox event has terminated and the membrane is in a steady-state condition, the redox current diminished to zero. It is therefore known that the measured current IM at steady-state redox conditions is equal to the interplay current IMA.

$$I_M^{SS} = I_{MA}$$

With the interplay current known in steady-state redox conditions, the true transmembrane current can now be determine in these same conditions. Since the interplay current at the membrane will be equal to and opposite of the interplay current at the WE/S electrode, the principle of superposition can be used to remove it from the measured IAC. The corrected transmembrane currents is then equated by $$I_{AC}^C = I_{AC}^M = I_M^{SS}.$$

From this it can be seen that the steady-state transmembrane current is close to zero in the oxidized membrane state and is a non-zero square wave in the reduced membrane state, following closely to the square wave potential VAC being applied.

In FIG. 50B, it is observed that transmembrane currents are negligibly small ($I_{AC} \approx 0$) till the onset of reduction ($V_m > -0.5V$) and the membrane is in the OFF state. As the applied membrane potential is decreased beyond the onset of reduction ($V_m < -0.5V$), the transmembrane current ($I_{AC}$) begins to increase. As the membrane potential decreases beyond the reduction peak ($V_m < -0.8V$), the transmembrane current reaches a steady state, indicating that it is in the ON state.

The peak to peak transmembrane currents from the temporal response in FIG. 50B as a function of membrane potential is shown in FIG. 50C. From comparing the CV in FIG. 50A and redox regulated ion transport in FIG. 50C, it is observed that the membrane switches between fully OFF and fully ON as the potential changes from fully oxidized to fully reduced states. Between fully oxidized and reduced states, it is observed from FIG. 50C that the membrane is in partially ON state, indicating that ion transport can be regulated between a minimum and a maximum in real-time. Due to the similarity of the redox regulated ion transport to an electronic bipolar junction transistor, the membrane membrane may be referred to as an 'ionic redox transistor' and current-voltage behavior in FIGS. 50C-E as ionic redox transistor characteristics. More quantitative analysis of this result is presented in Hery, T. and Sundaresan, V.-B. "Ionic redox transistor from pore-spanning PPy(DBS) membranes" *Energy Environ. Sci.* 2016, 9, 2555-2562, and its Supplementary Information, each of which is incorporated herein by reference in its entirety for any and all purposes.

The ionic redox transistor characteristics are investigated for PPy(DBS) various thicknesses ($A_E = 0.05$-$0.4$ C/cm$^2$) using a concentration of 100 mM Na$^+$ and a transmembrane potential ($V_{AC}$) of ±100 mV, and are presented in FIG. 50D. For areal density 0.05 C/cm$^2$, it is observed that PPy(DBS) does not span the 600 nm pore and does not form a barrier between the two chambers. Consequently, no change in transmembrane current ($I_{AC}$) is observed as PPy(DBS) is reduced. For thin membranes ($A_E = 0.1$-$0.4$ C/cm$^2$), ionic redox transistor characteristics for Na$^+$ transport are similar to FIG. 50C as observed with Li$^+$ ions. It should be noted from FIG. 50D that the transmembrane current in the fully ON state with PPy(DBS) barrier is asymptotic or equal to the current in the absence of pore-spanning PPy(DBS), indicating that the membrane offers minimal additional impedance to ion transport than the pores in steady state. The ionic redox transistor characteristics are investigated for thick PPy(DBS) ($A_E = 0.6$-$1.5$ C/cm$^2$) using an aqueous solution of 100 mM Na$^+$ and various transmembrane potentials ($V_{AC} = \pm 100$ mV to $\pm 900$ mV), and shown in the three dimensional plot in FIG. 50E. As transmembrane potential ($V_{AC}$) increases, the peak transmembrane current ($I_{AC,max}$) follows a near linear trend, indicating ohmic behavior. For the same $V_m$, transmembrane current ($I_{AC}$) is smaller for thick PPy(DBS) membranes, indicating that the transmembrane electrolytic resistance is dependent on intrinsic ionic conductivity of PPy(DBS). In the oxidized state, the transmembrane current decreases with increasing areal density, following with samples in FIG. 50D, and this decrease is amplified by increasing transmembrane potential.

Amplification factor ($\beta$) is used to capture the increase in transmembrane current ($I_{AC}$) as the membrane switches between fully ON and fully OFF states. Amplification factor $\beta$ is defined as the ratio of the turnover in the reduced and oxidized states $$\beta = \frac{V_{chain,red}^{Li^+}}{V_{chain,ox}^{Li^+}} \qquad (9)$$

Figure 51:
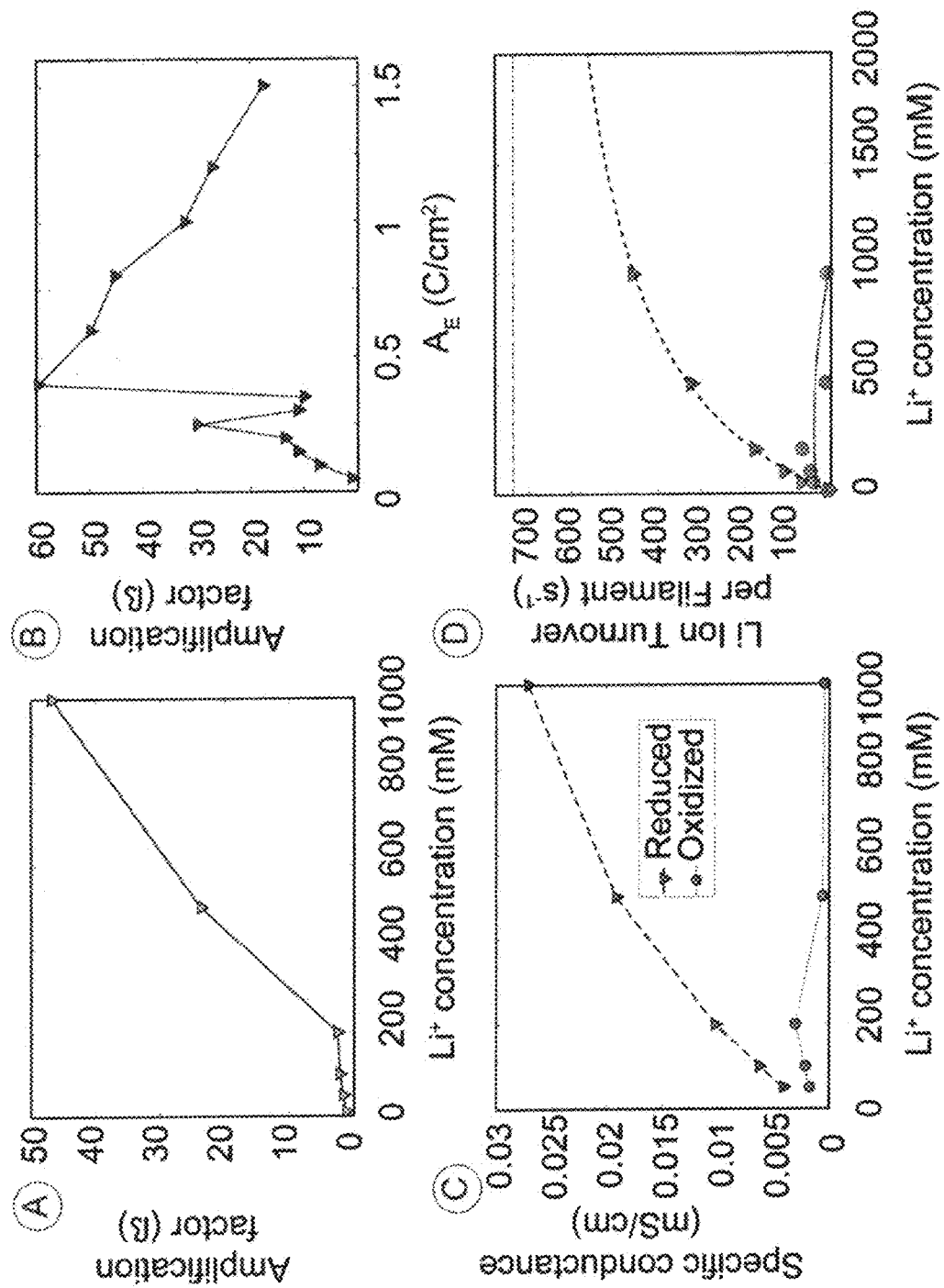
FIGS. 51A-D provide certain physical properties of the PPy(DBS)-based ionic redox transistor of the working examples.

The amplification factor as a function of Li$^+$ concentration is calculated and shown in FIG. 51A. At smaller concentrations, below 200 mM, the amplification factor is relatively small, and it has a linear dependence between 200 mM and 1000 mM. At lower Li$^+$ concentrations, smaller number of charge carriers in the electrolyte and comparable size of Li$^+$ ion to porous pathways in PPy(DBS) results in a smaller amplification factor. Without being bound by theory, at higher concentrations of Li$^+$ it is believed that the smaller transmembrane current ($I_{AC}$) in the oxidized state (in FIG. 50C) is due to asymmetric swelling of PPy(DBS) which minimizes ion transport. Additionally, the higher transmembrane current ($I_{AC}$) in the reduced state is attributed to the increased number of charge carriers in the electrolyte, thereby leading to a larger amplification factor.

The amplification factors for various thickness of PPy (DBS) ($A_E = 0.05$-$1.5$ C/cm$^2$) in 100 mM Na$^+$ at $V_{AC} = \pm 100$ mV are shown in FIG. 51B. For thin membranes ($A_E = 0.1$-$0.4$ C/cm$^2$), amplification factor increases with thickness and is attributed to the decreasing $I_{AC}$ in the oxidized state (see FIG. 50D). A discontinuity is observed in amplification factor trend for thickness corresponding to $A_E = 0.3$-$0.35$ C/cm$^2$. For thicker membranes ($A_E \geq 0.4$ C/cm$^2$), amplification factor begins to decrease with increasing thickness for 100 mM Na$^+$ and $V_{AC} = \pm 100$ mV. Without being bound by theory, this is attributed to a negligible decrease of $I_{AC}$ in the oxidized state while in the reduced state $I_{AC}$ decreases with increasing thickness, following with FIG. 50E, resulting in a reducing amplification factor.

Energy Storage Devices Including Membranes of the Present Technology

The present technology contemplates the application of the smart membrane separators described herein to supercapacitors and RFBs. Although the ionic conductivity, as illustrated in FIG. 51C, of smart membrane separator (~30 µS/cm) pores is lower than that of conventional membrane separators (10-100 mS/cm)[27], it is expected that faster kinetics at the electrodes in the architecture of supercapacitor and RFBs will balance out the lower conductivity. Besides its application in a supercapacitor and RFBs, the smart membrane separator may also be applied in conventional Li-ion batteries for preventing thermal runaway and performance enhancements in real time. It is worth noting the peak power requirements to activate the membrane are lower than the constant power achieve across the membrane with an applied potential of 900 mV. The transmembrane power will continue to increase quadratically with increasing potential, while membrane activation power will remain the same.

The smart membrane separator in a supercapacitor or a RFB will be used to switch the device ON or OFF by changing its redox state, as demonstrated in the earlier results. In addition, the current output from the device can be continuously regulated between OFF and ON states to control C-rate charge/discharge behavior. The faster electrode kinetics in these architectures now enable the control of power in a continuous manner as required by the application.

Figure 52:
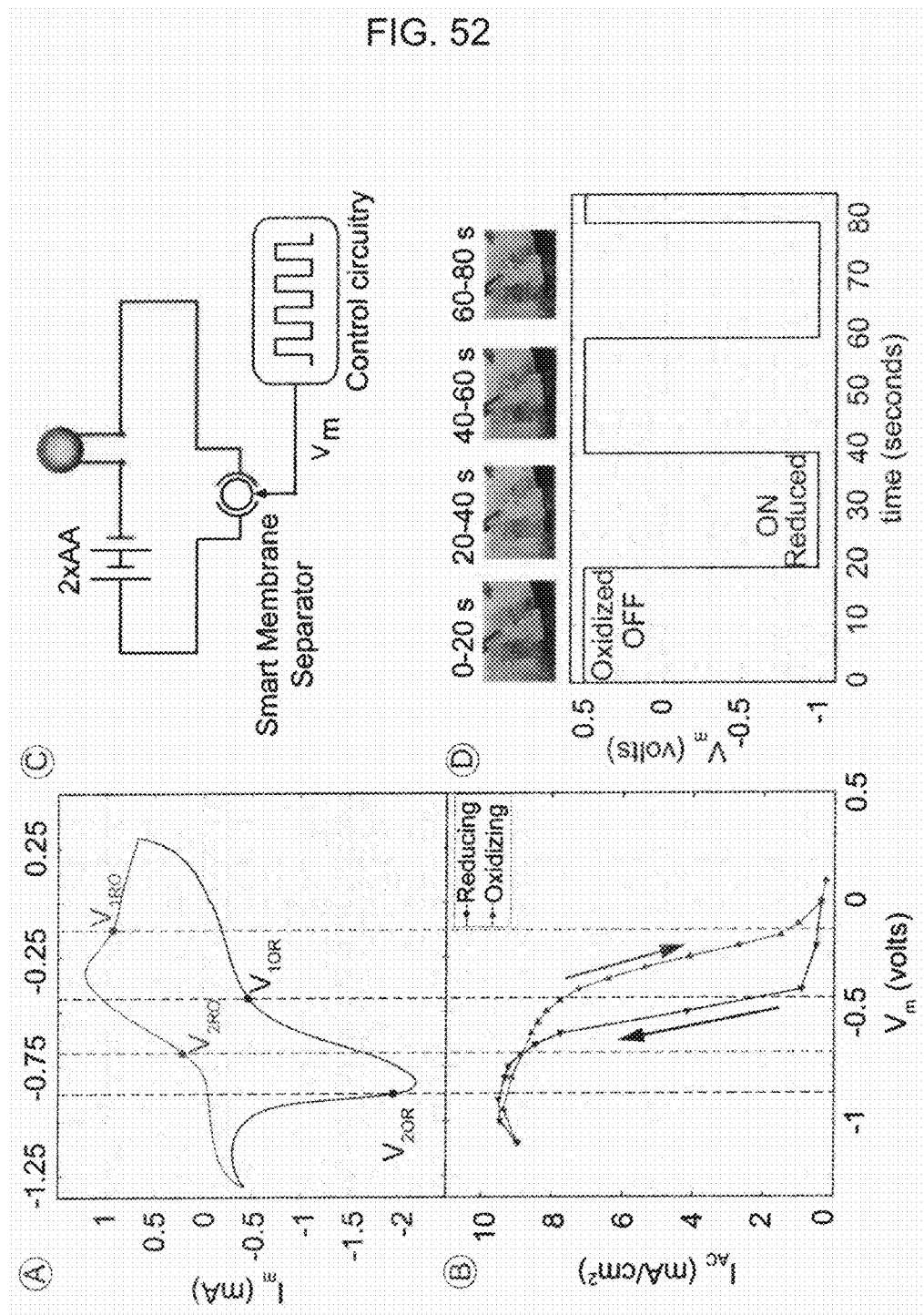
FIGS. 52A-D illustrate the hysteresis and application of a membrane of the present technology, according to the working examples.

To illustrate this use, the following examples use the smart membrane separator to control ionic currents in a bicameral device connected in a circuit as shown in FIG. 52C. The membrane (made in a similar fashion as the prior working examples) is placed as the septum in a bicameral device, of which both chambers are filled with a 500 mM LiCl aqueous solution. The only path between the two chambers is through the polymer membrane. With the polymer as the working electrode, an Ag/AgCl pellet is submerged in the chamber in which the polymer side of the membrane is exposed as the counter/reference electrode. An electrical/ionic circuit is created with two AA batteries and an LED bulb. The circuit is run through the ionic solution, such that the negative lead and positive lead are attached to separate Ag/AgCl pellets. The negative lead Ag/AgCl pellet is submerged in the chamber with the polymer side of the membrane exposed, and positive in the chamber with the backside of the membrane exposed. The circuit functions such that if ions are able to travel across the membrane, the circuit is closed and the AA batteries should light up the LED bulb, and if ions are unable to travel across the membrane, the circuit is open and the LED will not light up.

The CV of the membrane separator at smaller scan rates (50 mV/s) is shown in FIG. 52A, and its corresponding ionic redox transistor characteristics for $V_{AC}=\pm 100$ mV is shown in FIG. 52B. It is observed by comparing FIG. 52A and FIG. 52B that the transmembrane current begins to increase at the onset of reduction and reaches a maximum at the reduction peak. As the membrane is oxidized, the transmembrane current decreases at the onset of oxidation and reaches the minimum at the oxidation peak. The hysteresis observed in the ionic redox transistor characteristics is an artifact of the redox process and confirms the dependence of transmembrane ion transport on reversible redox processes. The peak anodic and cathodic potentials and corresponding currents can be tailored through nanostructuring, dopant selection, and electrolyte concentration. The potentials at which the membrane is regulated between ON and OFF states are referred to as $V_{1OR}$, $V_{2OR}$, $V_{2RO}$, and $V_{1RO}$. The transmembrane current may be controlled between $V_{1OR}$ and $V_{2OR}$ as it is turning ON, and between $V_{2RO}$ and $V_{1RO}$ as it is being turned OFF. Anything between these potentials in the given direction is the regulation region, which specifies the sensitivity of the membrane. The hysteresis observed in FIG. 52B as the membrane switched between OFF/ON and ON/OFF is a surprisingly unintended, yet desirable, outcome to eliminate flutter instabilities from noise when controlled by an electronic control unit (ECU).

The application of a smart membrane separator in a supercapacitor or a RFB is further illustrated below. A potential of ~2.8V is imposed across the smart membrane separator by 2-AA batteries and an LED is included in series to visually demonstrate the functionality of the smart membrane separator. For this demonstration, the areal density of PPy(DBS) on PCTE substrate was substantially thicker ($A_E$=2.0 C/cm$^2$) than in the characterization studies. This was required to minimize the leakage current in the OFF state for the higher transmembrane potential of 2.8V. The only component in the circuit that can switch the LED ON/OFF is the smart membrane separator and this is achieved by switching the redox state of the membrane using a control circuitry (PARSTAT 4000). The potential applied by this control circuitry is a square wave with $V_m$=0.5V to −1V and a frequency of 25 mHz. At 0.5V, the membrane is oxidized, allowing no current to flow through the circuit and the LED is OFF. As the potential is switched to −1V, the membrane reduces, and the LED instantly turns ON, emitting a visible bright green hue. Subsequently, upon changing the potential to 0.5V, the LED turns OFF, and this process continues as regulated by the control circuitry. In addition to this, high frequency switching and continuous control of the LED was performed. Continuous control is achieved by gradually varying the applied potential to the membrane from the control circuitry. These high frequency switching and continuous control experiments used a reduction potential of −1V and an oxidation potential of 0.5V to rapidly switch thick PPy(DBS) membrane between ON and OFF. Thus, these examples clearly show the application of a smart membrane separator as the gating device for controlling current and hence the power output in a circuit.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such A. A membrane comprising
   a membrane substrate defining a plurality of pores to allow ion transport therethrough;
   an ion-doped conductive polymer disposed on a surface of the membrane substrate; and
   a conductive material disposed between the membrane substrate and the ion-doped conductive polymer.

B. The membrane of Paragraph A, wherein the ion-doped conductive polymer comprises a plurality of ions and a conductive polymer.

C. The membrane of Paragraph B, wherein a mole ratio of the plurality of ions to the conductive polymer is from about 1:100 to about 5:1.

D. The membrane of Paragraph B or Paragraph C, wherein the conductive polymer comprises polypyrole, poly(3,4-ethylenedioxythiophene), polyacteylene, polyaniline, poly(p-phenylene vinylene), poly(fluorenes), polyphenylenes, polypyrenes, polyazulenes, polynaphthalenes, polycarbazoles, polyindoles, polyazepines, poly(thiophenes) poly(p-phenylene sulfide), polyfuran, or a combination of any two or more thereof.

E. The membrane of any one of Paragraphs B-D, wherein the plurality of ions comprise anions.

F. The membrane of Paragraph E, wherein the plurality of ions comprise dodecylbenzenesuflonate, polystyrene sulfonate, p-toluene sulfonate, $Cl^-$, $F^-$, $I^-$, $SO_4^{2-}$, or a mixture of any two or more thereof.

G. The membrane of any one of Paragraphs B-D, wherein the plurality of ions comprise cations.

H. The membrane of Paragraph G, wherein the plurality of ions comprise, $Na^+$, $K^+$, $Ca^{2+}$, $Mg^{2+}$, $Li^+$, or a mixture of any two or more thereof.

I. The membrane of any one of Paragraphs A-H, wherein the conductive material comprises a Group IIIA metal, Group IB metal, Group IIB metal, Group IIIB metal, Group IVB metal, Group VB metal, Group VIB metal, Group VIIB metal, Group VIIIB metal, graphite, carbon powder, pyrolytic carbon, carbon black, carbon fibers, carbon microfibers, carbon nanotubes, single walled carbon nanotubes, multi walled carbon nanotubes, fullerene carbons, graphene, or a combination of any two or more thereof.

J. The membrane of any one of Paragraphs A-I, wherein the conductive material comprises copper, silver, gold, copper, nickel, palladium, platinum, manganese, molybdenum, tungsten, iron, cobalt, rhodium, zinc, aluminum, or a combination of any two or more thereof.

K. The membrane of any one of Paragraphs A-J, wherein the membrane substrate defines a plurality of pores with a number average diameter from 10 nanometers to 10 microns.

L. The membrane of any one of Paragraphs A-K, wherein the membrane substrate defines a plurality of pores with a number average diameter from 1 micron to 10 microns.

M. The membrane of any one of Paragraphs A-K, wherein the membrane substrate defines a plurality of pores with a number average diameter from 10 nanometers to 900 nanometers.

N. The membrane of any one of Paragraphs A-M, wherein the membrane substrate has a thickness between about 10 nm to about 750 μm.

O. The membrane of any one of Paragraphs A-N, wherein the conductive material has a thickness from about 0.1 nanometers to about 100 nanometers.

P. The membrane of any one of Paragraphs A-O, wherein the membrane has an areal density from about 0.01 $C/cm^2$ to about 100 $C/cm^2$.

Q. The membrane of any one of Paragraphs A-P, wherein the membrane further comprises at least one electrical lead disposed on the surface of the membrane bearing the ion-doped conductive polymer.

R. The membrane of any one of Paragraphs A-Q, wherein the ion-doped conducting polymer comprises dodecylbenzenesuflonate doped polypyrole.

S. An electrochemical cell comprising:
an anode;
a cathode;
a separator positioned between the anode and cathode, the separator comprising the membrane of any one of Paragraphs A-R; and
an electrolyte.

T. The electrochemical cell of Paragraph S, wherein the electrolyte comprises a biological fluid.

U. The electrochemical cell of Paragraph T, wherein the biological fluid comprises one or more of blood, lymph, and cytosol.

V. The electrochemical cell of any one of Paragraphs S-U, wherein the electrolyte comprises ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, or a combination of any two or more thereof.

W. The electrochemical cell of any one of Paragraphs S-V, wherein the electrolyte comprises a lithium salt, a sodium salt, a potassium salt, a magnesium salt, a calcium salt, or mixtures of any two or more thereof.

X. The electrochemical cell of any one of Paragraphs S-W, wherein the electrolyte comprises $LiClO_4$, $LiPF_6$, $LiBF_4$, lithium(trifluoromethylsulfonyl)imide, lithium bis(perfluoroethylsulfonyl)imide, lithium bis(oxalato)borate, or a mixture of any two or more thereof.

Y. The electrochemical cell of any one of Paragraphs S-X, wherein the membrane comprises at least two electrical leads communicatively coupled to a controller, optionally where at least one of the electrical leads comprises the conductive material of the membrane.

Z. The electrochemical cell of Paragraph Y, wherein the controller comprises a potentiostat.

AA. The electrochemical cell of Paragraph Y or Paragraph Z, wherein the controller comprises a bipotentiostat.

AB. The electrochemical cell of any one of Paragraphs Y-AA, wherein the controller is further communicatively coupled to the anode and the cathode.

AC. The electrochemical cell of any one of Paragraphs Y-AB, wherein the controller is configured to apply at least one of an oxidizing or reducing voltage across the membrane to cause a change in an impedance of the membrane.

AD. The electrochemical cell of any one of Paragraphs S-AC, wherein the electrochemical cell is configured as one or more of a redox flow battery, a supercapacitor, a lithium ion battery, a sodium ion battery, and a magnesium ion battery.

AE. An energy storage device, comprising:
a positive current collector;
a cathode positioned on the positive current collector;
a negative current collector;
an anode positioned on the negative current collector; and
a separator positioned between the anode and cathode, the separator comprising the membrane of any one of Paragraphs A-R.

AF. The energy storage device of Paragraph AE, further comprising a controller communicatively coupled to the separator, the controller configured to apply at least one of an oxidizing or reducing voltage across the separator to cause a change in an impedance of the ion-doped conductive polymer, the change in impedance configured to control a quantity of ions transferable through the separator.

AG. A method of forming a membrane of any one of Paragraphs A-R, the method comprising:
depositing a conductive material on a membrane substrate; and depositing an ion-doped conductive polymer on the conductive material.

AH. A method of preventing thermal runaway in an electrochemical cell wherein the electrochemical cell comprises an anode, a cathode and a separator positioned therebetween, the separator comprising a membrane of any one of Paragraphs A-R and having an initial impedance to allow an initial quantity of cations or anions to pass therethrough, the method comprising:
  detecting at least one of a temperature of the electrochemical cell and a current across the separator;
  upon at least one of the temperature exceeding a predetermined temperature threshold and the current increasing over a predetermined current threshold, applying a predetermined reducing or oxidizing voltage across the anion-doped conductive polymer, the predetermined reducing or oxidizing voltage causing the initial impedance to increase to a first impedance, the first impedance allowing a first quantity of cations or anions to pass through the membrane, the first quantity of cations or anions less than the initial quantity of cations or anions; and
  maintaining the predetermined reducing or oxidizing voltage until the at least one the temperature drops below the predetermined temperature threshold and the current drops below the predetermined current threshold.

AI. The method of Paragraph AH, further comprising:
  upon at least one of the temperature dropping below the predetermined temperature threshold and the current dropping below the predetermined current threshold, applying a predetermined reducing or oxidizing voltage across the anion-doped conductive polymer for a predetermined time, the predetermined reducing or oxidizing voltage causing the first impedance to decrease to a second impedance, the second impedance allowing a second quantity of cations or anions to pass through the membrane, the second quantity of cations or anions greater than the first quantity of cations or anions.

AJ. The method of Paragraph AI, wherein the second impedance is equal to the initial impedance, and wherein the second quantity of cations is equal to the initial quantity of cations.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are set forth in the following claims.

What is claimed is:

1. An electrochemical cell comprising:
  an anode;
  a cathode;
  an electrolyte; and
  a separator positioned between the anode and cathode, the separator comprising a membrane comprising:
    a membrane substrate defining a plurality of pores to allow ion transport therethrough;
    an ion-doped conductive polymer disposed on a surface of the membrane substrate, wherein the ion-doped conductive polymer comprises a plurality of ions and a conductive polymer and wherein a mole ratio of the plurality of ions to monomeric units of the conductive polymer is from about 1:100 to about 5:1; and
    a conductive material disposed between the membrane substrate and the ion-doped conductive polymer;
    wherein the membrane comprises at least two electrical leads communicatively coupled to a controller; and
    wherein the controller is configured to apply at least one of an oxidizing or reducing voltage to the membrane to cause a change in an impedance of the membrane.

2. The electrochemical cell of claim 1, wherein the electrolyte comprises ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, a lithium salt, a sodium salt, a potassium salt, a magnesium salt, a calcium salt, $LiClO_4$, $LiPF_6$, $LiBF_4$, lithium(trifluoromethylsulfonyl)imide, lithium bis(perfluoroethylsulfonyl)imide, lithium bis(oxalato)borate, or a combination of any two or more thereof.

3. The electrochemical cell of claim 1, wherein the controller comprises a bipotentiostat.

4. The electrochemical cell of claim 3, wherein the controller is further communicatively coupled to the anode and the cathode.

5. A method of preventing thermal runaway in an electrochemical cell wherein the electrochemical cell is of claim 1, the membrane of the electrochemical cell having an initial impedance to allow an initial quantity of cations or anions to pass therethrough, the method comprising:
detecting at least one of a temperature of the electrochemical cell and a current across the separator;
upon at least one of the temperature exceeding a predetermined temperature threshold and the current increasing over a predetermined current threshold, applying a predetermined reducing or oxidizing voltage across the anion-doped conductive polymer, the predetermined reducing or oxidizing voltage causing the initial impedance to increase to a first impedance, the first impedance allowing a first quantity of cations or anions to pass through the membrane, the first quantity of cations or anions less than the initial quantity of cations or anions;
maintaining the predetermined reducing or oxidizing voltage until the at least one of the temperature drops below the predetermined temperature threshold and the current drops below the predetermined current threshold.

6. The method of claim 5, further comprising:
upon at least one of the temperature dropping below the predetermined temperature threshold and the current dropping below the predetermined current threshold, applying a predetermined reducing or oxidizing voltage across the anion-doped conductive polymer for a predetermined time, the predetermined reducing or oxidizing voltage causing the first impedance to decrease to a second impedance, the second impedance allowing a second quantity of cations or anions to pass through the membrane, the second quantity of cations or anions greater than the first quantity of cations or anions.

7. The method of claim 6, wherein the second impedance is equal to the initial impedance, and wherein the second quantity of cations is equal to the initial quantity of cations.

8. The electrochemical cell of claim 1, wherein the ion-doped conductive polymer comprises polypyrole, poly(3,4-ethylenedioxythiophene), polyacteylene, polyaniline, poly(p-phenylene vinylene), poly(fluorenes), polyphenylenes, polypyrenes, polyazulenes, polynaphthalenes, polycarbazoles, polyindoles, polyazepines, poly(thiophenes) poly(p-phenylene sulfide), polyfuran, or a combination of any two or more thereof.

9. The electrochemical cell of claim 1, wherein the plurality of ions comprise dodecylbenzenesuflonate, polystyrene sulfonate, p-toluene sulfonate, $Cl^-$, $F^-$, $I^-$, $SO_4^{2-}$, Na+, K+, $Ca^{2+}$, $Mg^{2+}$, Li+, or a mixture of any two or more thereof.

10. The electrochemical cell of claim 1, wherein the conductive material comprises a Group IIIA metal, Group IB metal, Group IIB metal, Group IIIB metal, Group IVB metal, Group VB metal, Group VIB metal, Group VIIB metal, Group VIIIB metal, graphite, carbon powder, pyrolytic carbon, carbon black, carbon fibers, carbon microfibers, carbon nanotubes, single walled carbon nanotubes, multi walled carbon nanotubes, fullerene carbons, graphene, or a combination of any two or more thereof.

11. The electrochemical cell claim 1, wherein the conductive material comprises copper, silver, gold, copper, nickel, palladium, platinum, manganese, molybdenum, tungsten, iron, cobalt, rhodium, zinc, aluminum, or a combination of any two or more thereof.

12. The electrochemical cell of claim 1, wherein the membrane substrate defines a plurality of pores with a number average diameter from 10 nanometers to 10 microns.

13. The electrochemical cell of claim 1, wherein the membrane substrate has a thickness between about 10 nm to about 750 μm.

14. The electrochemical cell of claim 1, wherein the conductive material has a thickness from about 0.1 nanometers to about 100 nanometers.

15. The electrochemical cell of claim 1, wherein the membrane has an areal density from about 0.01 $C/cm^2$ to about 100 $C/cm^2$.

16. The electrochemical cell of claim 1, wherein the membrane further comprises at least one electrical lead disposed on the surface of the membrane bearing the ion-doped conductive polymer.

17. The electrochemical cell of claim 1, wherein the ion-doped conductive polymer comprises dodecylbenzenesuflonate doped polypyrole.

* * * * *

UNITED STATES PATENT AND TRADEMARK OFFICE
CERTIFICATE OF CORRECTION

PATENT NO. : 10,886,516 B2
APPLICATION NO. : 15/760095
DATED : January 5, 2021
INVENTOR(S) : Vishnu Baba Sundaresan et al.

Page 1 of 1

It is certified that error appears in the above-identified patent and that said Letters Patent is hereby corrected as shown below:

In the Claims

In Claim 17, Column 46, Line 50, "suflonate" should be changed to --sulfonate--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*